US012563574B2

(12) United States Patent
Tang et al.

(10) Patent No.: US 12,563,574 B2
(45) Date of Patent: Feb. 24, 2026

(54) APPARATUS AND METHOD FOR COMMUNICATING TWO STAGE DCI

(71) Applicant: HUAWEI TECHNOLOGIES CO., LTD., Shenzhen (CN)

(72) Inventors: Hao Tang, Shenzhen (CN); Jianglei Ma, Kanata (CA); Xiaoyan Bi, Shenzhen (CN); Peiying Zhu, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 18/318,275

(22) Filed: May 16, 2023

(65) Prior Publication Data

US 2023/0422271 A1 Dec. 28, 2023

Related U.S. Application Data

(63) Continuation of application No. PCT/CN2020/138984, filed on Dec. 24, 2020.

(51) Int. Cl.
*H04W 72/23* (2023.01)
*H04W 72/1273* (2023.01)
*H04W 72/232* (2023.01)

(52) U.S. Cl.
CPC ..... *H04W 72/232* (2023.01); *H04W 72/1273* (2013.01)

(58) Field of Classification Search
CPC ... H04L 1/1896; H04L 5/0044; H04L 5/0053; H04L 5/0094; H04W 72/1273; H04W 72/232; H04W 72/23
See application file for complete search history.

(56) References Cited

U.S. PATENT DOCUMENTS

| | | | |
|---|---|---|---|
| 2018/0227886 A1 | 8/2018 | Chou et al. | |
| 2019/0268977 A1* | 8/2019 | Garcia-Polanco | H05B 3/62 |
| 2019/0379491 A1* | 12/2019 | Kilinc | H04L 1/1835 |
| 2020/0396760 A1* | 12/2020 | Yi | H04W 72/23 |
| 2021/0037551 A1* | 2/2021 | Khoshnevisan | H04L 5/0044 |
| 2021/0337525 A1* | 10/2021 | Rahman | H04W 16/28 |
| 2022/0070899 A1* | 3/2022 | Huang | H04W 72/23 |

(Continued)

FOREIGN PATENT DOCUMENTS

| | | |
|---|---|---|
| CN | 107371272 A | 11/2017 |
| CN | 108400830 A | 8/2018 |
| CN | 108512631 A | 9/2018 |

OTHER PUBLICATIONS

3GPP TSG RAN WG1 Meeting #90, R1-1712447,"NR-PDCCH for supporting URLLC", ZTE,Prague, Czechia,Aug. 21-25, 2017,total 7 pages.

(Continued)

*Primary Examiner* — Andrew Lee
(74) *Attorney, Agent, or Firm* — Slater Matsil, LLP

(57) ABSTRACT

A two-stage DCI framework is provided in which the first stage DCI is carried by PDCCH, second stage DCI is carried by PDSCH. The first stage DCI is blind decoded. The second stage DCI is indicated by the first stage DCI and therefor no blind decoding is necessary. The size of the second stage DCI can be very flexible, can indicate scheduling information for one carrier, multiple carriers, multi transmission for one carrier. The first stage DCI can be compact in size to enhance reliability.

20 Claims, 28 Drawing Sheets

(56) References Cited

U.S. PATENT DOCUMENTS

| | | | | |
|---|---|---|---|---|
| 2022/0086840 A1* | 3/2022 | Gurelli | ................. | H04W 72/23 |
| 2022/0116973 A1* | 4/2022 | Jung | .................... | H04L 5/0094 |
| 2022/0191838 A1* | 6/2022 | Huang | ................. | H04W 72/23 |
| 2023/0144165 A1* | 5/2023 | Xu | ........................ | H04L 1/1887 |
| | | | | 370/329 |
| 2023/0362968 A1* | 11/2023 | Xi | ........................ | H04W 72/53 |

OTHER PUBLICATIONS

3GPP TSG-RAN WG1 Meeting #89, R1-1708717,"Discussion on two-stage DCI for NR",ITRI,Hangzhou,P.R. China May 15-19, 2017,total 4 pages.

Ericsson, "Summary of e-mail discussions on downlink control signaling," TSG-RAN WG1 NR AdHoc, R1-1701036, Spokane, WA, USA, Jan. 16-20, 2017, 18 pages.

Huawei, et al., "Codebook based transmission for UL MIMO," 3GPP TSG RAN WG1 Meeting #90bis, R1-1718237, Prague, Czech Republic, Oct. 9-13, 2017, 10 pages.

"Physical channels and modulation", 33rd Generation Partnership Project; Technical Specification Group Radio Access Network; NR; (Release 15), 3GPP TS 38.211 V15.8.0; Dec. 2019, 97 pages.

"Physical channels and modulation", 3rd Generation Partnership Project; Technical Specification Group Radio Access Network; NR; (Release 16), 3GPP TS 38.211 V16.2.0, Jun. 2020, 131 pages.

"Multiplexing and channel coding", 3rd Generation Partnership Project; Technical Specification Group Radio Access Network; NR; (Release 15), 3GPP TS 38.212 V15.8.0, Dec. 2019, 101 pages.

"Multiplexing and channel coding", 3rd Generation Partnership Project; Technical Specification Group Radio Access Network; NR; (Release 16), 3GPP TS 38.212 V16.2.0, Jun. 2020, 151 pages.

"Physical layer procedures for control", 3rd Generation Partnership Project; Technical Specification Group Radio Access Network; NR; (Release 15), 3GPP TS 38.213 V15.8.0, Dec. 2019, 109 pages.

"Physical layer procedures for control", 3rd Generation Partnership Project; Technical Specification Group Radio Access Network; NR; (Release 16), 3GPP TS 38.213 V16.2.0, Jun. 2020, 176 pages.

"Physical layer procedures for data", 3rd Generation Partnership Project; Technical Specification Group Radio Access Network; NR; (Release 15), 3GPP TS 38.214 V15.8.0, Dec. 2019, 106 pages.

"Physical layer procedures for data", 3rd Generation Partnership Project; Technical Specification Group Radio Access Network; NR; (Release 16), 3GPP TS 38.214 V16.2.0, Jun. 2020, 163 pages.

"Radio Resource Control (RRC) protocol specification", 3rd Generation Partnership Project; Technical Specification Group Radio Access Network; NR; (Release 15), 3GPP TS 38.331 V15.8.0, Dec. 2019, 532 pages.

"Radio Resource Control (RRC) protocol specification", 3rd Generation Partnership Project; Technical Specification Group Radio Access Network; NR; (Release 16), 3GPP TS 38.331 V16.2.0, Sep. 2020, 921 pages.

* cited by examiner 110,170 or 172

Operating System Module

Transmitting Module

Receiving Module

Processing Module

Machine Learning Module

TDM of 1st and 2nd stage DCI          FDM of 1st and 2nd stage DCI

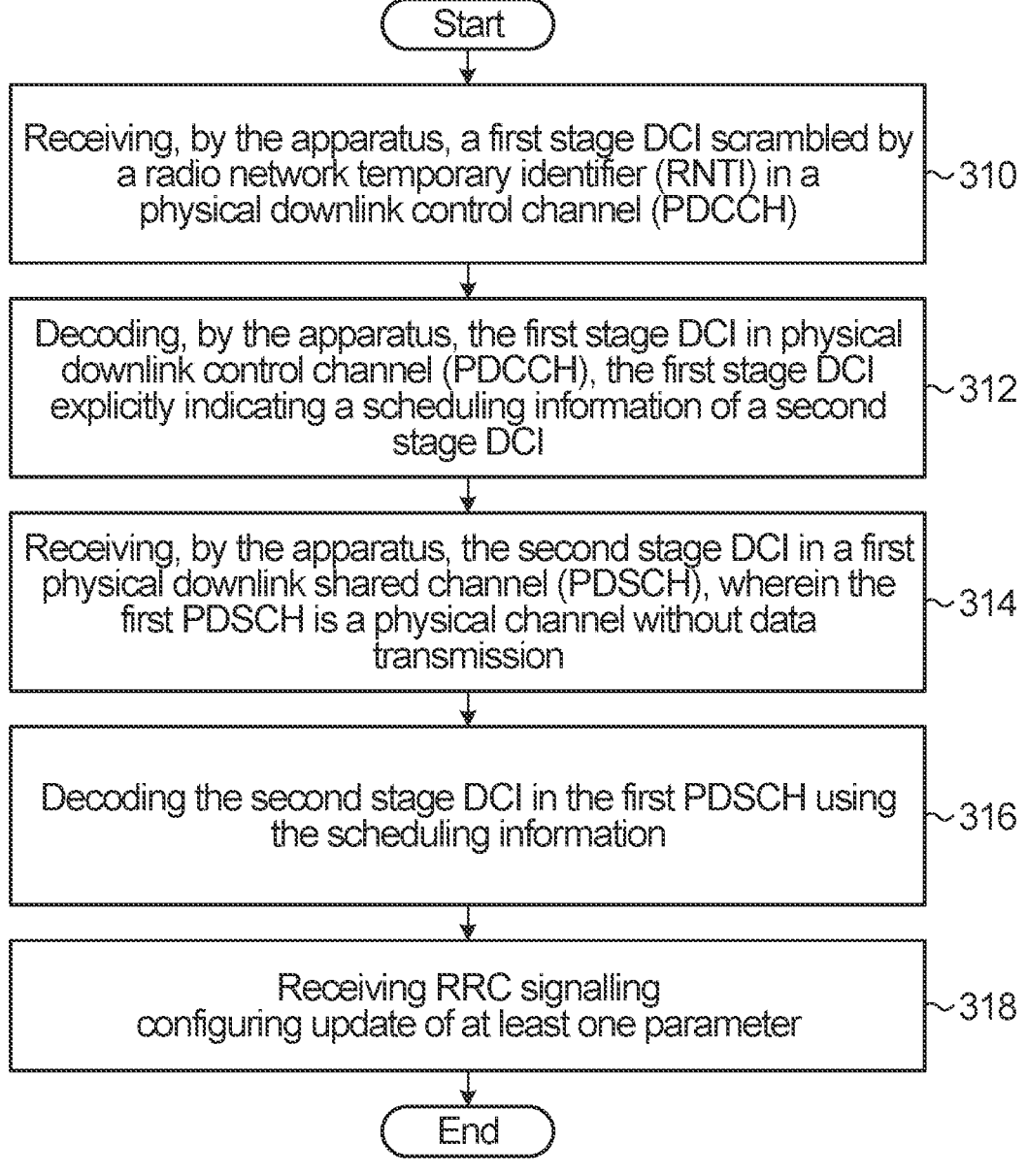

Start

Receiving, by the apparatus, a first stage DCI scrambled by a radio network temporary identifier (RNTI) in a physical downlink control channel (PDCCH)  ~310

Decoding, by the apparatus, the first stage DCI in physical downlink control channel (PDCCH), the first stage DCI explicitly indicating a scheduling information of a second stage DCI  ~312

Receiving, by the apparatus, the second stage DCI in a first physical downlink shared channel (PDSCH), wherein the first PDSCH is a physical channel without data transmission  ~314

Decoding the second stage DCI in the first PDSCH using the scheduling information  ~316

Receiving RRC signalling configuring update of at least one parameter  ~318

End

FIG. 7B

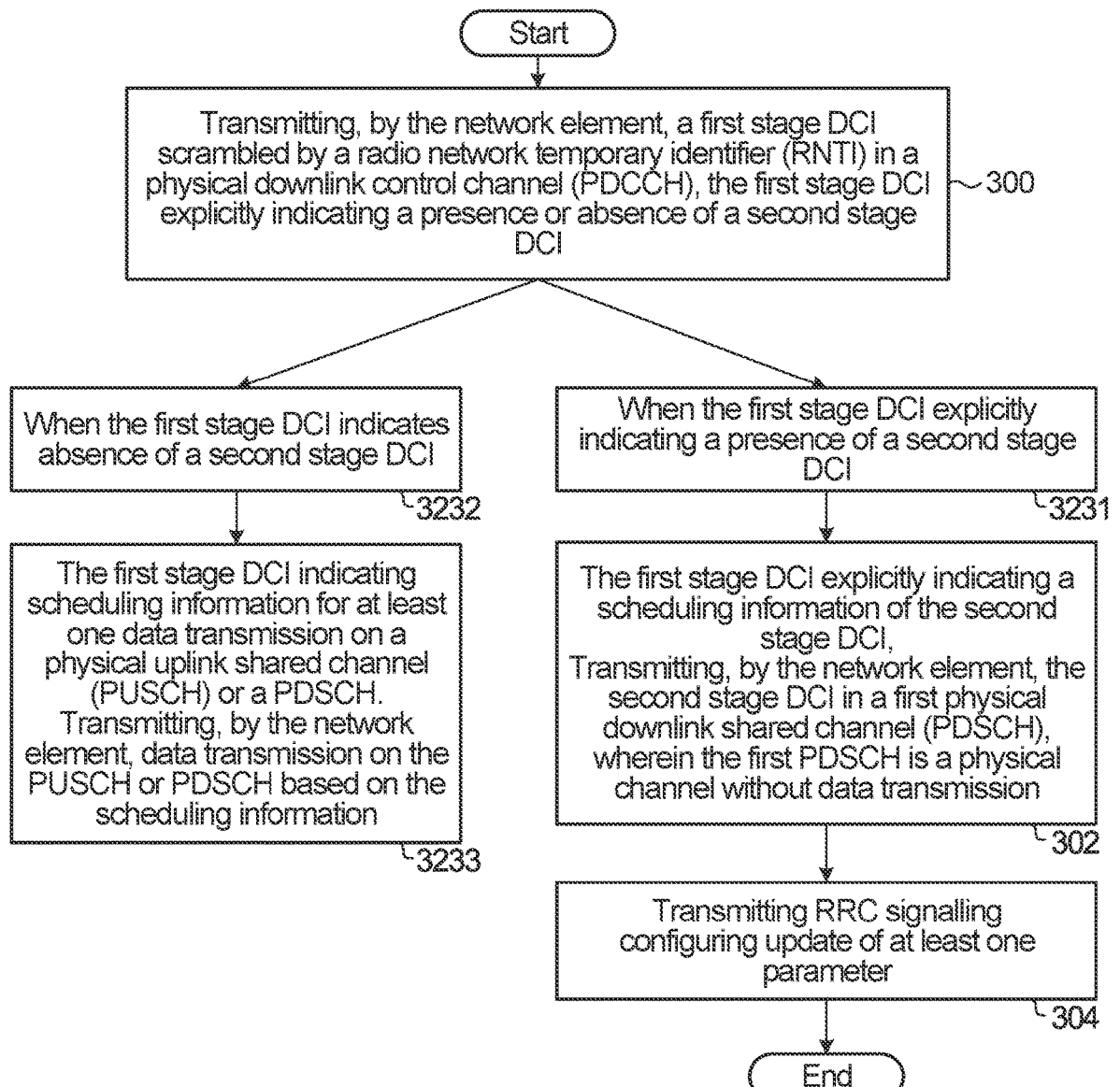

Start

Transmitting, by the network element, a first stage DCI scrambled by a radio network temporary identifier (RNTI) in a physical downlink control channel (PDCCH), the first stage DCI explicitly indicating a presence or absence of a second stage DCI ~300

When the first stage DCI indicates absence of a second stage DCI ⌐3232

When the first stage DCI explicitly indicating a presence of a second stage DCI ⌐3231

The first stage DCI indicating scheduling information for at least one data transmission on a physical uplink shared channel (PUSCH) or a PDSCH. Transmitting, by the network element, data transmission on the PUSCH or PDSCH based on the scheduling information ⌐3233

The first stage DCI explicitly indicating a scheduling information of the second stage DCI, Transmitting, by the network element, the second stage DCI in a first physical downlink shared channel (PDSCH), wherein the first PDSCH is a physical channel without data transmission ⌐302

Transmitting RRC signalling configuring update of at least one parameter ⌐304

End

FIG. 7D

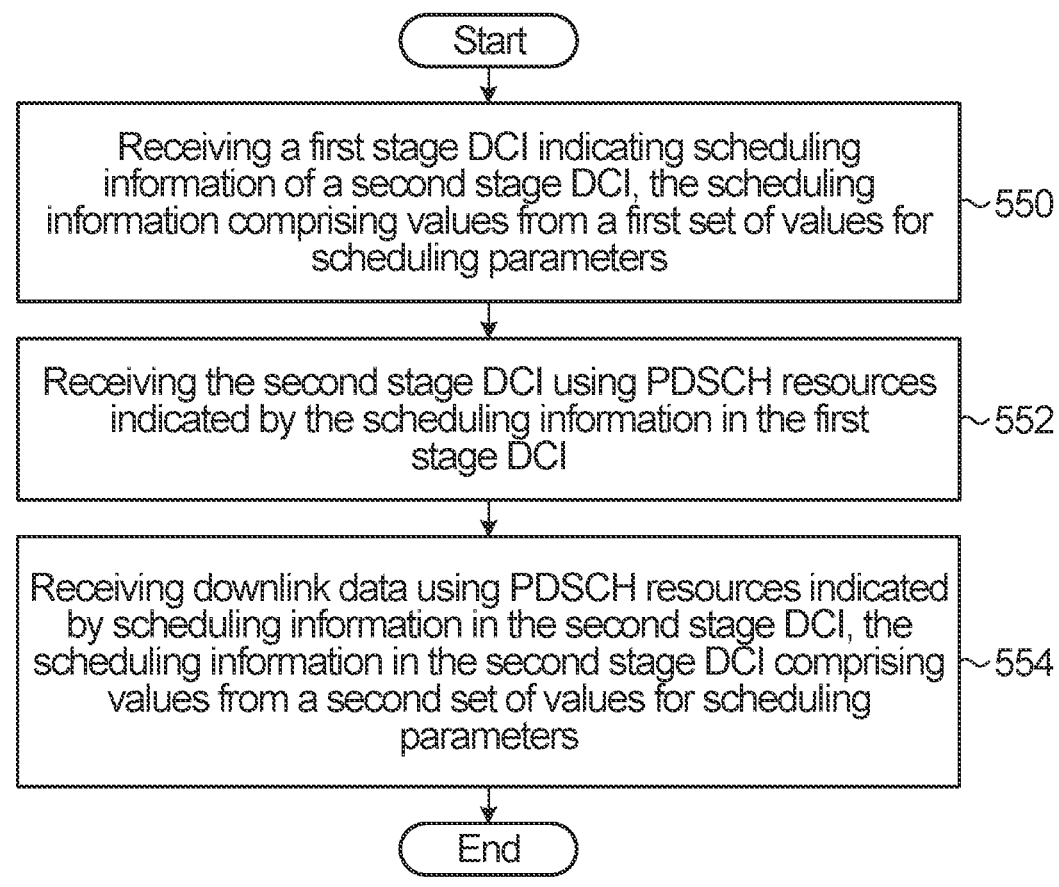

Start

Receiving a first stage DCI indicating scheduling information of a second stage DCI, the scheduling information comprising values from a first set of values for scheduling parameters ~550

Receiving the second stage DCI using PDSCH resources indicated by the scheduling information in the first stage DCI ~552

Receiving downlink data using PDSCH resources indicated by scheduling information in the second stage DCI, the scheduling information in the second stage DCI comprising values from a second set of values for scheduling parameters ~554

End

FIG. 9B

Shared DMRS

Front-loaded DMRS

End-loaded DMRS

Shared DMRS for low PARP WF

Front-loaded DMRS

910

End-loaded DMRS

912

No shared DMRS for low PARP WF

1050

Frequency-domain repetition

1060

Time-domain repetition

1100

Alt-1: Dynamic reTx

1150

Alt-1: semi-static reTx

1

APPARATUS AND METHOD FOR COMMUNICATING TWO STAGE DCI

CROSS-REFERENCE TO RELATED APPLICATION

This application is a continuation of International Application No. PCT/CN2020/138984, filed on Dec. 24, 2020, the disclosure of which is hereby incorporated by reference in its entirety.

FIELD

The application relates to wireless communications generally, and more specific to methods and apparatus for transmitting and receiving downlink control information (DCI).

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources, typically referred to as "time-frequency resources".

Two devices that wirelessly communicate with each other over time-frequency resources need not necessarily be a UE and a base station. For example, two UEs may wirelessly communicate with each other over a sidelink using device-to-device (D2D) communication. As another example, two network devices (e.g. a terrestrial base station and a non-terrestrial base station, such as a drone) may wirelessly communicate with each other over a backhaul link. When devices wirelessly communicate with each other, the wireless communication may be performed control information transmission which is dynamically indicated to the UE, e.g. in the physical layer in a control channel. An example of control information that is dynamically indicated is information sent in physical layer control signaling, e.g. downlink control information (DCI).

In 3GPP New Radio (NR) Release-15, there are 8 DCI formats as shown in Table 1 below. For each DCI format, a user equipment (UE) needs to know the DCI size, and performs DCI detection using blind decoding. A large number of DCI formats and DCI sizes will increase the UE implementation complexity. For example, a UE needs to perform DCI size alignment for these DCI formats. In NR, the total number of different DCI sizes configured to monitor is no more than 4 for a cell, and the total number of different DCI sizes with Cell-Radio Network Temporary Identifier (C-RNTI) is no more than 3.

TABLE 1

| DCI formats | |
|---|---|
| DCI format | Usage |
| 0_0 | Scheduling of PUSCH in one cell |
| 0_1 | Scheduling of PUSCH in one cell |

TABLE 1-continued

| DCI formats | |
|---|---|
| DCI format | Usage |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In addition, when introducing new features in 3GPP NR Release 16, new DCI formats are introduced, e.g. DCI format 0_2 and 1_2 for ultra reliable low latency communications (URLLC) scheduling, which further increases the complexity of UE blind decoding. Furthermore, for carrier aggregation (CA) and dual connectivity (DC), the number of blind decodings for the UE to perform is increased with the number of active carriers.

SUMMARY

According to one aspect of the present disclosure, there is provided a method in an apparatus for receiving downlink control information (DCI), the method comprising: receiving, by the apparatus, a first stage DCI in a physical downlink control channel (PDCCH), the first stage DCI explicitly indicating a presence or absence of a second stage DCI; and when the first stage DCI indicates presence of the second stage DCI, the first stage DCI explicitly indicating a scheduling information of the second stage DCI, and receiving, by the apparatus, the second stage DCI in a first physical downlink shared channel (PDSCH), wherein the first PDSCH is a physical channel without data transmission.

The provided approach for the two stage DCI framework includes the first stage DCI explicitly indicating a scheduling information of a second stage DCI if the first stage DCI indicating presence of the second stage DCI, thus only blind decoding for the first stage DCI, and blind detection is not needed for the second stage DCI, thus reduce the number of blind decoding. Also the provided approach allows for a compact first stage DCI, and more flexibility in terms of the size and contents of the second stage DCI based on whether the first stage DCI indicating presence or absence of the second stage DCI. A compact first stage DCI can enhance the reliability of the first stage DCI, for example by increasing the successful decoding probability. For example, for the same number of REs for the PDCCH carrying the first stage DCI, smaller size of the first stage DCI results in lower coding rate for the DCI, thus improving successful decoding probability.

Optionally, the method further comprises: when the first stage DCI indicates absence of a second stage DCI, the first stage DCI indicating scheduling information for at least one data transmission on a physical uplink shared channel (PUSCH) or a PDSCH.

Advantageously, with this approach, a unified compact design for the first stage DCI can be used to schedule a second stage DCI or UE data. When the size of UE data is small or the channel between the UE and BS is not good, BS can use a simplified DCI, e.g. the first stage DCI, to schedule the UE data, thus the scheduling information in the first stage DCI is enough to indicate the data transmission, and reduce decoding overhead.

Optionally, the second stage DCI indicating a scheduling information further for indicating at least one data transmission on a PUSCH and/or a PDSCH; fields of the second stage DCI indicating of a scheduling information in the first stage DCI for at least one data transmission on a PUSCH and/or a PDSCH is simplified relative to fields of the second stage DCI indicating of scheduling information in the second stage DCI.

Optionally, when the first stage DCI indicates presence of a second stage DCI, the first stage DCI does not include retransmission information and/or does not include multiple input multiple output (MIMO) information for the second stage DCI; when the first stage DCI indicates absence of a second stage DCI, scheduling information for the at least one data transmission on a PUSCH and/or a PDSCH does not include retransmission related information for the at least one data transmission.

Advantageously, not including retransmission information and/or MIMO related information allows for an even more compact first stage DCI format.

Optionally, wherein the first stage DCI has at least one of the following fields: a field for explicitly indicating a presence or absence of a second stage DCI; a field for indicating frequency domain resource assignment for second stage DCI or data transmission; a field for indicating time domain resource assignment for second stage DCI or data transmission; a field for indicating a virtual resource block (VRB)-to-physical resource block (PRB) mapping or Frequency hopping; an indication of modulation and coding scheme (MCS); a field for indicating a carrier for the second stage DCI; and a flag for differentiating between UL and DL data scheduling.

Optionally, the first stage DCI includes at least one indicator indicating partial retransmission information, remaining retransmission information being radio resource control (RRC) configured or predefined.

Advantageously, using partial retransmission information will increase the size of the first stage DCI, but not as much as including full retransmission information; the partial retransmission information is enough to enable UE data retransmission. Retransmission information that is expected to change slowly can be sent via RRC or be predefined. As such, the first stage DCI is still relatively compact.

Optionally, when the first stage DCI indicates the presence of a second stage DCI, the partial retransmission information is ignored, and when the first stage DCI indicates the absence of a second stage DCI, the partial retransmission information is in respect of the at least one data transmission scheduled by the first stage DCI.

Optionally, when the first stage DCI indicates the presence of a second stage DCI, the partial retransmission information is in respect of the second stage DCI, and when the first stage DCI indicates the absence of a second stage DCI, the partial retransmission information is in respect of the at least one data transmission scheduled by the first stage DCI.

Optionally, the partial retransmission information comprises a subset of new data indicator (NDI), redundancy version (RV), hybrid automatic repeat request (HARQ) process number, downlink allocation index (DAI), transmit power control (TPC) for PUCCH, PUCCH resource, HARQ-ACK timing.

Optionally, the first stage DCI is received on a first carrier, the scheduling information of the second stage DCI, indicating a second carrier for the second stage DCI; the second stage DCI, schedules resources for data transmission on one or multiple carriers.

Advantageously, this allows for flexibility in terms of the carrier used for the second stage DCI and data transmissions.

Optionally, the method further comprises: receiving RRC signalling to configure whether retransmission for the second stage DCI is enabled or not.

Optionally, the method further comprises: when the RRC signalling configures retransmission for second stage DCI is enabled, receiving RRC signalling indicating whether the retransmission for second stage DCI is based on ACK/NACK feedback or not.

Optionally, the method further comprises: the apparatus using a time location of initial transmission of the second stage DCI as a reference to determine a time location of a time domain resource allocation of PDSCH for UE data or a time domain resource location of PUSCH for UE data or a time domain resource allocation of physical uplink control channel (PUCCH) for HARQ feedback and/or channel state information (CSI) feedback.

Optionally, the method further comprises: after failing to decode the second stage DCI, the apparatus buffering data downlink signal on possible time and frequency resources for UE data.

Optionally, the method further comprises: when the RRC signalling indicates retransmission for second stage DCI is not based on ACK/NACK feedback, receiving RRC signalling configuring a retransmission pattern, including the number of retransmissions, redundancy version for a retransmission, time/frequency location of a retransmission, carrier for a retransmission.

Optionally, the method further comprises: when the RRC signalling indicates retransmission for second stage DCI is based on ACK/NACK feedback, receiving a DCI dynamically scheduling a retransmission of the second stage DCI; transmitting ACK/NCK feedback for the second stage DCI using resources that are scheduled by the first stage DCI, or using resources that are RRC configured or predefined.

Optionally, the method further comprises: when the RRC signalling indicates retransmission for second stage DCI is based on ACK/NACK feedback, after transmitting a NACK feedback for the second stage DCI, receiving a retransmission of the second stage DCI on transmission resources that are RRC configured or predefined or indicated by the first stage DCI which scheduled transmission of the second stage DCI.

Optionally, the method further comprises: when the RRC signalling indicates retransmission for second stage DCI is based on ACK/NACK feedback, after transmitting a NACK feedback for the second stage DCI, receiving a retransmission of the second stage DCI on transmission resources that are based on time and frequency resources used for initial transmission of the second stage DCI indicated by the first stage DCI.

Optionally, the method further comprises: receiving, by the apparatus, a DCI, the DCI including an identifier of DCI format indicating whether the DCI has a one stage DCI format or a first stage DCI format, the one stage DCI format and the first stage DCI format having a same size; wherein a DCI having the one stage DCI format is always not associated with a second stage DCI and includes scheduling information for uplink data transmission or downlink data transmission; when the identifier of DCI format indicates the DCI has the first stage DCI format, the DCI is said first stage DCI.

Using the same size for first stage DCI and one stage DCI (e.g. fallback DCI) reduces the amount of blind decoding.

Optionally, the identifier of DCI format is defined as follows: one value of the identifier of DCI format indicates the DCI is a one stage DCI scheduling downlink data; one value of the identifier of DCI format indicates the DCI is a one stage DCI scheduling uplink data; one value of the identifier of DCI format indicates the DCI is a first stage DCI; or the identifier of DCI format is defined as follows: one value of the identifier of DCI format indicates the DCI is a one stage DCI scheduling downlink data; one value of the identifier of DCI format indicates the DCI is a one stage DCI scheduling uplink data; one value of the identifier of DCI format indicates the DCI is a first stage DCI, and that the DCI includes downlink scheduling information when a second stage DCI is not present, one value of the identifier of DCI format indicates the DCI is a first stage DCI, and that the DCI includes uplink scheduling information when a second stage DCI is not present.

Optionally, the method further comprises: determining whether to monitor one stage DCI and whether to monitor first stage DCI based on one of: RRC signaling; service type; transmission type; power saving mode; DCI indication; waveform type; based on determining to monitor one stage DCI, receiving a DCI having a one stage DCI format, wherein the DCI having the one stage DCI is always not associated with a second stage DCI and includes scheduling information for uplink transmission or downlink transmission.

With this approach, advantageously, depending on specific scenarios, BS sends one-stage DCI to enhance reliability or two-stage DCI to improve performance, e.g. throughput. In addition, depending on the scenario, the UE is not always required to monitor both one-stage DCI and two-stage DCI, reducing the number of blind decodings.

According to another aspect of the present disclosure, there is provided a method in a network device for transmitting downlink control information (DCI), the method comprising: transmitting, by the network device, a first stage DCI in a physical downlink control channel (PDCCH), the first stage DCI explicitly indicating a presence or absence of a second stage DCI; and when the first stage DCI indicates presence of the second stage DCI, the first stage DCI explicitly indicating a scheduling information of the second stage DCI, and transmitting, by the network device, the second stage DCI in a first physical downlink shared channel (PDSCH), wherein the first PDSCH is a physical channel without data transmission.

Optionally, the method further comprises: when the first stage DCI indicates absence of a second stage DCI, the first stage DCI indicating scheduling information for at least one data transmission on a physical uplink shared channel (PUSCH) or a PDSCH.

Optionally, the second stage DCI indicating a scheduling information further for indicating at least one data transmission on a PUSCH and/or a PDSCH; fields of the second stage DCI indicating of a scheduling information in the first stage DCI for at least one data transmission on a PUSCH and/or a PDSCH are simplified relative to fields of the second stage DCI indicating of scheduling information in the second stage DCI.

Optionally, when the first stage DCI indicates presence of a second stage DCI, the first stage DCI does not include retransmission information and/or does not include multiple input multiple output (MIMO) information for the second stage DCI; when the first stage DCI indicates absence of a second stage DCI, scheduling information for the at least one data transmission on a PUSCH and/or a PDSCH does not include retransmission related information for the at least one data transmission.

Optionally, the first stage DCI has at least one of the following fields: a field for explicitly indicating a presence or absence of a second stage DCI; a field for indicating frequency domain resource assignment for second stage DCI or data transmission; a field for indicating time domain resource assignment for second stage DCI or data transmission; a field for indicating a virtual resource block (VRB)-to-physical resource block (PRB) mapping or Frequency hopping; an indication of modulation and coding scheme (MCS); a field for indicating a carrier for the second stage DCI; and a flag for differentiating between UL and DL data scheduling.

Optionally, the first stage DCI includes at least one indicator indicating partial retransmission information, remaining retransmission information being radio resource control (RRC) configured or predefined.

Optionally, when the first stage DCI indicates the presence of a second stage DCI, the partial retransmission information is in respect of the second stage DCI, and when the first stage DCI indicates the absence of a second stage DCI, the partial retransmission information is in respect of the at least one data transmission scheduled by the first stage DCI.

Optionally, the partial retransmission information comprises a subset of new data indicator (NDI), redundancy version (RV), hybrid automatic repeat request (HARQ) process number, downlink allocation index (DAI), transmit power control (TPC) for PUCCH, PUCCH resource, HARQ-ACK timing.

Optionally, the first stage DCI is transmitted on a first carrier, the scheduling information of the second stage DCI, indicating a second carrier for the second stage DCI; the second stage DCI, schedules resources for data transmission on one or multiple carriers.

Optionally, the method further comprises: transmitting RRC signalling to configure whether retransmission for the second stage DCI is enabled or not.

Optionally, the method further comprises: when the RRC signalling configures retransmission for second stage DCI is enabled, transmitting RRC signalling indicating whether the retransmission for second stage DCI is based on ACK/NACK feedback or not.

Optionally, the method further comprises: when the RRC signalling indicates retransmission for second stage DCI is not based on ACK/NACK feedback, transmitting RRC signalling configuring a retransmission pattern, including the number of retransmissions, redundancy version for a retransmission, time/frequency location of a retransmission, carrier for a retransmission.

Optionally, the method further comprises: when the RRC signalling indicates retransmission for second stage DCI is based on ACK/NACK feedback, transmitting a DCI dynamically scheduling a retransmission of the second stage DCI; receiving ACK/NCK feedback for the second stage DCI using resources that are scheduled by the first stage DCI, or using resources that are RRC configured or predefined.

Optionally, the method further comprises: when the RRC signalling indicates retransmission for second stage DCI is based on ACK/NACK feedback, after receiving a NACK feedback for the second stage DCI, transmitting a retransmission of the second stage DCI on transmission resources that are RRC configured or predefined or indicated by the first stage DCI which scheduled transmission of the second stage DCI.

Optionally, the method further comprises: when the RRC signalling indicates retransmission for second stage DCI is based on ACK/NACK feedback, after receiving a NACK feedback for the second stage DCI, transmitting a retransmission of the second stage DCI on transmission resources that are based on time and frequency resources used for initial transmission of the second stage DCI indicated by the first stage DCI.

Optionally, the method further comprises: transmitting, by the network device, a DCI, the DCI including an identifier of DCI format indicating whether the DCI has a one stage DCI format or a first stage DCI format, the one stage DCI format and the first stage DCI format having a same size; wherein a DCI having the one stage DCI format is always not associated with a second stage DCI and includes scheduling information for uplink data transmission or downlink data transmission; when the identifier of DCI format indicates the DCI has the first stage DCI format, the DCI is said first stage DCI.

Optionally, the identifier of DCI format is defined as follows: one value of the identifier of DCI format indicates the DCI is a one stage DCI scheduling downlink data; one value of the identifier of DCI format indicates the DCI is a one stage DCI scheduling uplink data; one value of the identifier of DCI format indicates the DCI is a first stage DCI; or the identifier of DCI format is defined as follows: one value of the identifier of DCI format indicates the DCI is a one stage DCI scheduling downlink data; one value of the identifier of DCI format indicates the DCI is a one stage DCI scheduling uplink data; one value of the identifier of DCI format indicates the DCI is a first stage DCI, and that the DCI includes downlink scheduling information when a second stage DCI is not present, one value of the identifier of DCI format indicates the DCI is a first stage DCI, and that the DCI includes uplink scheduling information when a second stage DCI is not present.

Optionally, the method further comprises: determining whether to transmit one stage DCI and whether to transmit first stage DCI based on one of: a determination made by the network device and conveyed to an apparatus through RRC signaling; service type; transmission type; power saving mode; a determination made by the network device and conveyed to an apparatus through DCI indication; waveform type; based on determining to transmit one stage DCI, transmitting a DCI having a one stage DCI format, wherein the DCI having the one stage DCI is always not associated with a second stage DCI and includes scheduling information for uplink transmission or downlink transmission.

According to another aspect of the present disclosure, there is provided an apparatus comprising: at least one processor; and a memory storing processor-executable instructions that, when executed, cause the processor to: receiving a first stage DCI in a physical downlink control channel (PDCCH), the first stage DCI explicitly indicating a presence or absence of a second stage DCI; and when the first stage DCI indicates presence of the second stage DCI, the first stage DCI explicitly indicating a scheduling information of the second stage DCI, and receive the second stage DCI in a first physical downlink shared channel (PDSCH), wherein the first PDSCH is a physical channel without data transmission.

According to another aspect of the present disclosure, there is provided a network device comprising: at least one processor; and a memory storing processor-executable instructions that, when executed, cause the processor to: transmit a first stage DCI in a physical downlink control channel (PDCCH), the first stage DCI explicitly indicating a presence or absence of a second stage DCI; and when the first stage DCI indicates presence of the second stage DCI, the first stage DCI explicitly indicating a scheduling information of the second stage DCI, and transmit the second stage DCI in a first physical downlink shared channel (PDSCH), wherein the first PDSCH is a physical channel without data transmission.

BRIEF DESCRIPTION OF THE DRAWINGS

Embodiments of the disclosure will now be described with reference to the attached drawings in which:

FIG. 7B is a flowchart of a method of two stage DCI reception;

FIG. 7D is a flowchart of another embodiment for two stage DCI performing in a network device (e.g. base station);

FIGS. 9A and 9B show flowcharts illustrating methods of using different parameter sets for PDSCH used for second stage DCI vs. downlink data;

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

In future networks, such as 6G, it is expected more UE requirements and more UE capabilities will be introduced, for example, an extreme power saving requirement, and UEs with and without artificial intelligence (AI). As a consequence, if the same design principle of 5G NR is followed for DCI, there will be a significant number of DCI formats/sizes in 6G, which will lead to a significant burden on the UEs in performing blind decoding. The introduction of new DCI formats is complicated by DCI size alignments and may not be forward compatible. In addition, the number of blind decodings for the UE to perform is increased with the number of active carriers. Therefore, it would be advantageous to be able to reduce the number of blind decodings that the UEs need to perform.

Figure 1:
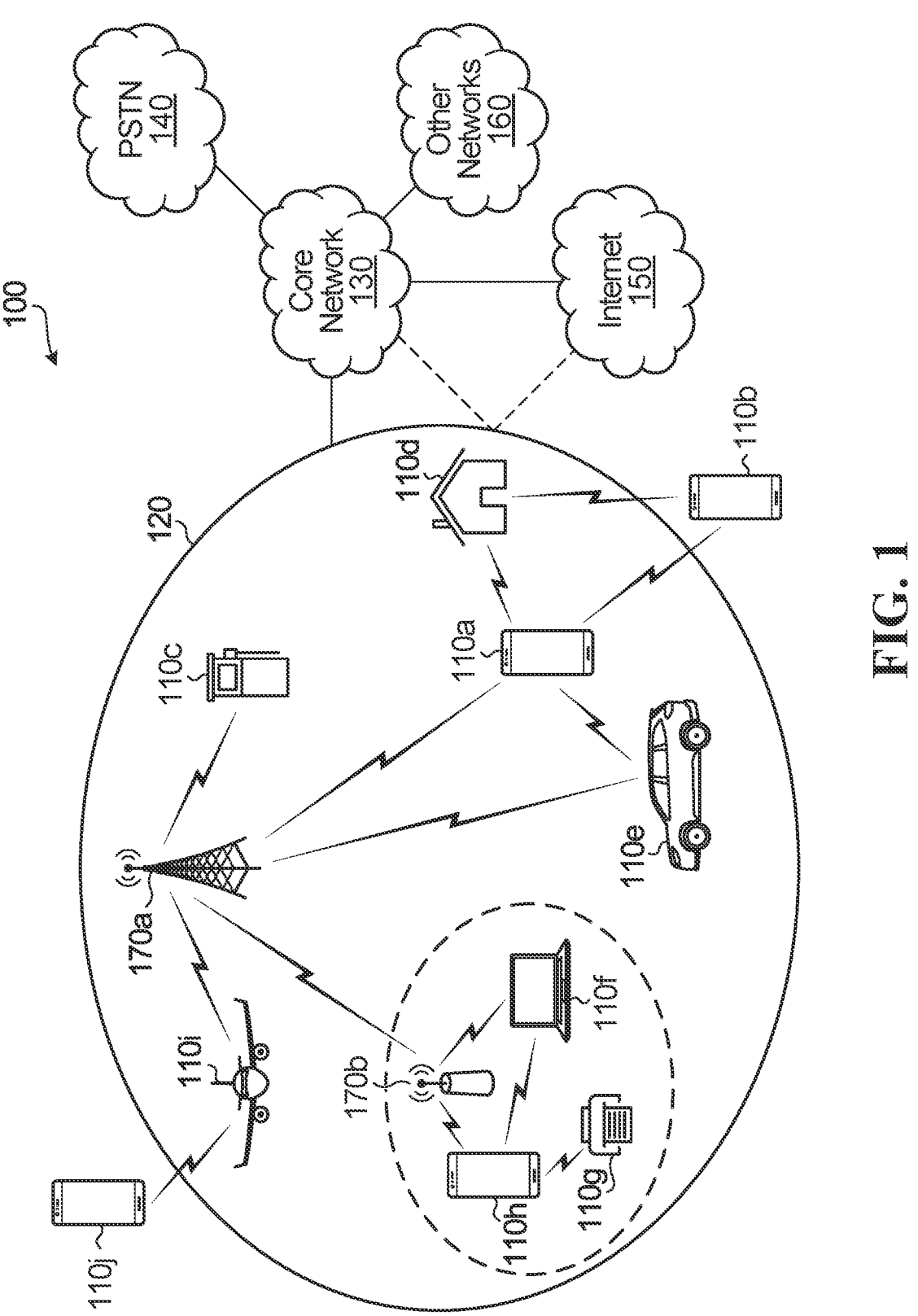
FIG. 1 is a block diagram of a communication system.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another or connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
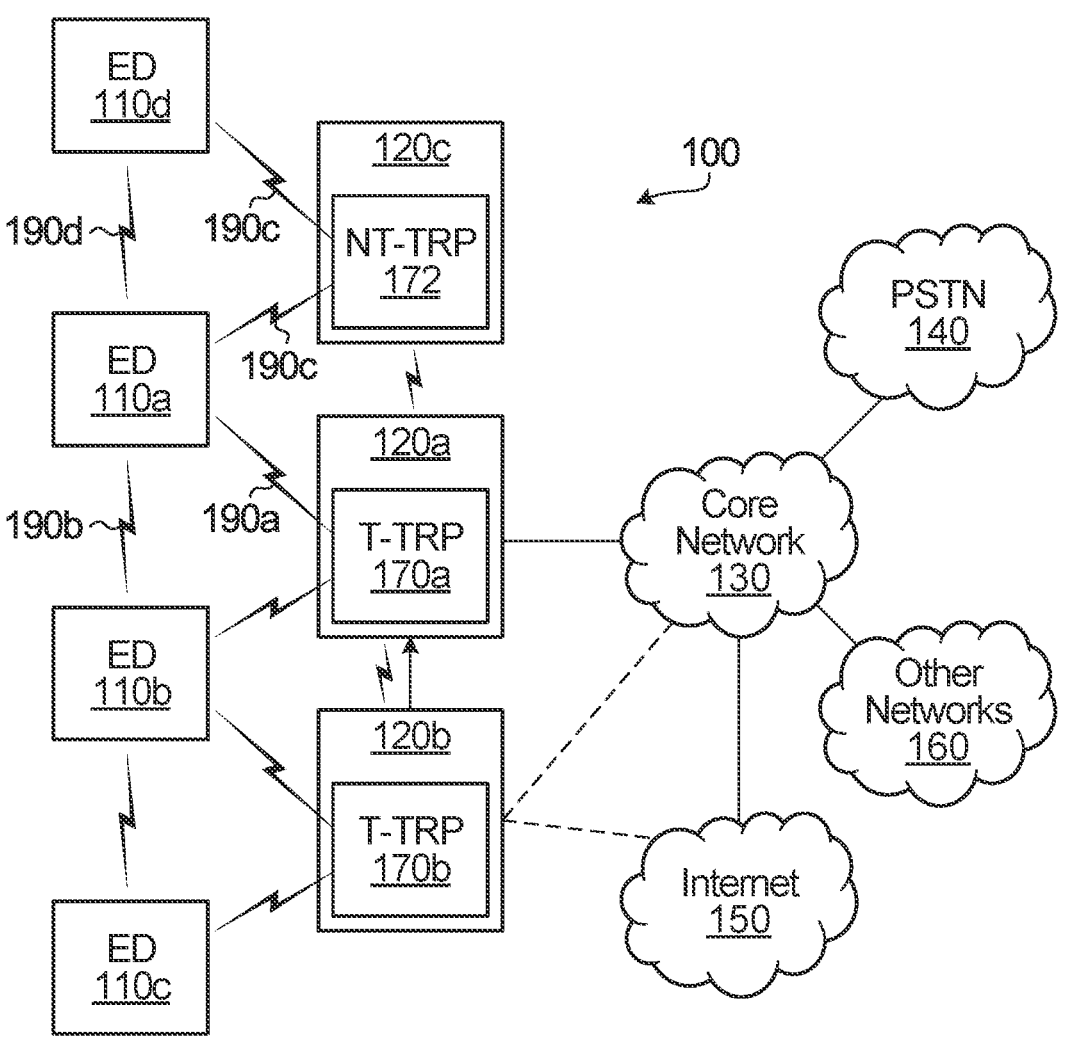
FIG. 2 is a block diagram of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such.

Figure 3:
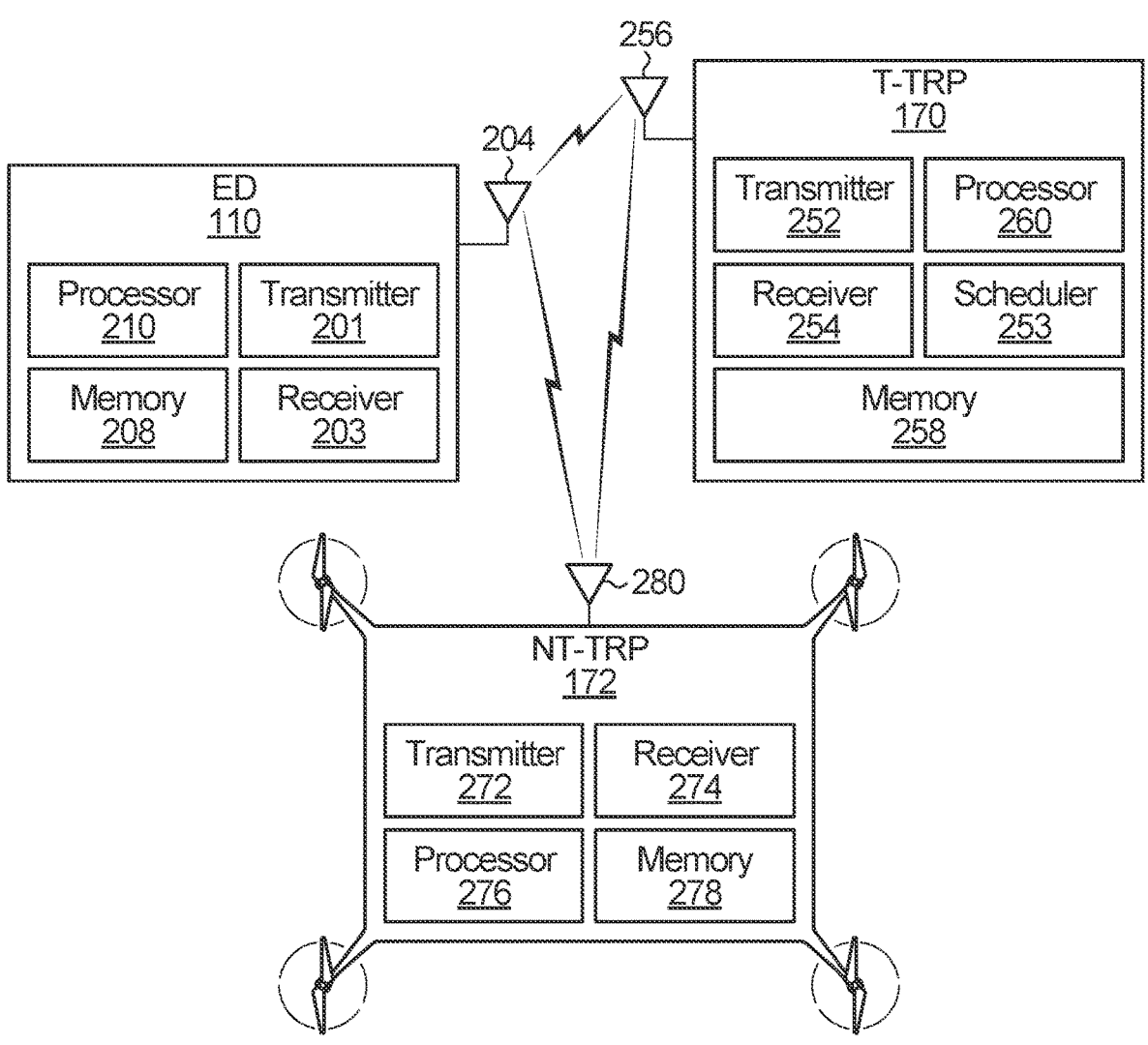
FIG. 3 is a block diagram of a communication system showing a basic component structure of an electronic device (ED) and a base station.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
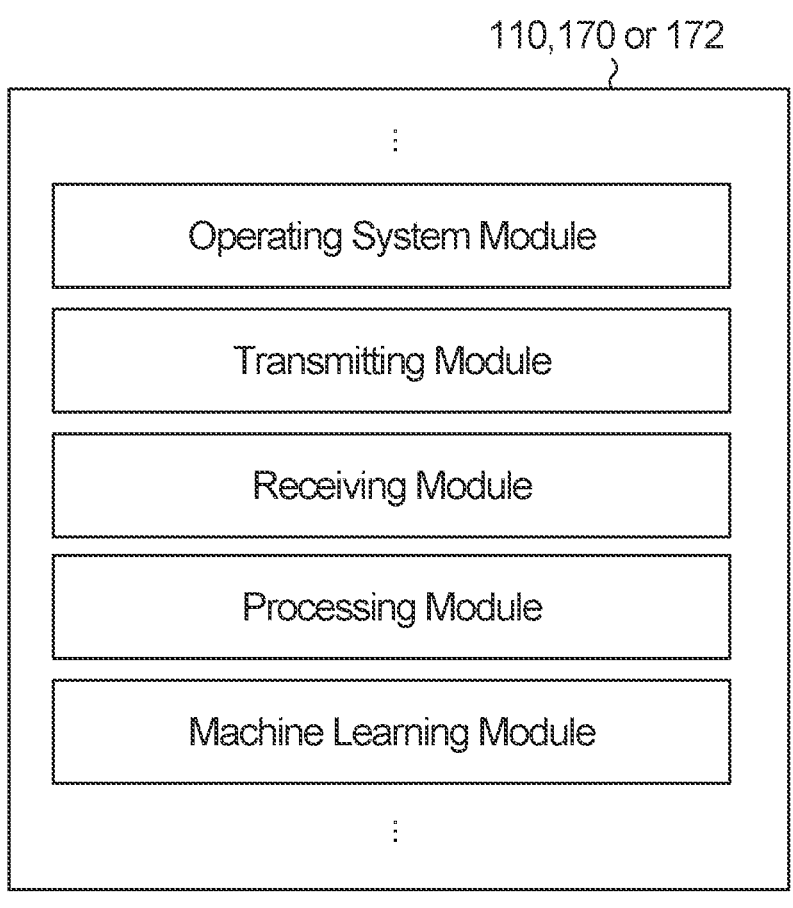
FIG. 4 is a block diagram of modules that may be used to implement or perform one or more of the steps of embodiments of the application.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Cell/Carrier/Bandwidth Parts (BWPs)/Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g. a carrier may have a bandwidth of 20 MHz and consist of one BWP, or a carrier may have a bandwidth of 80 MHz and consist of two adjacent contiguous BWPs, etc. In other embodiments, a BWP may have one or more carriers, e.g. a BWP may have a bandwidth of 40 MHz and consists of two adjacent contiguous carriers, where each carrier has a bandwidth of 20 MHz. In some embodiments, a BWP may comprise non-contiguous spectrum resources which consists of non-contiguous multiple carriers, where the first carrier of the non-contiguous multiple carriers may be in mmW band, the second carrier may be in a low band (such as 2 GHz band), the third carrier (if it exists) may be in THz band, and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage $\beta/2$ of the total mean transmitted power, for example, the value of $\beta/2$ is taken as 0.5%.

The carrier, the BWP, or the occupied bandwidth may be signaled by a network device (e.g. base station) dynamically, e.g. in physical layer control signaling such as DCI, or semi-statically, e.g. in radio resource control (RRC) signaling or in the medium access control (MAC) layer, or be predefined based on the application scenario; or be determined by the UE as a function of other parameters that are known by the UE, or may be fixed, e.g. by a standard.

Integrated Communications with Sensing, Artificial Intelligence (AI) and/or Machine Learning (ML)

Going to the future wireless network, the number of the new devices could be increased exponentially with diverse functionalities. Also, a lot more new applications and use cases than 5G may emerge with more diverse quality of service demands. These will result in new key performance indications (KPIs) for the future wireless network (for an example, 6G network) that can be extremely challenging, so the sensing technologies, and AI technologies, especially MI (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and Sensing & positioning, etc. For MAC layer, AI/ML communication to utilize the AI/ML capability with learning, prediction and make decision to solve the complicate optimization problems with better strategy and optimal solution, for an example, to optimize the functionality in MAC, e.g. intelligent TRP management, intelligent beam management, intelligent channel resource allocation, intelligent power control, intelligent spectrum utilization, intelligent MCS, intelligent HARQ strategy, intelligent Tx/Rx mode adaption, etc.

AI/ML architectures usually involves multiple nodes, the multiple nodes can be organized in two modes, i.e., centralized and distributed, both of which can be deployed in access network, core network, or an edge computing system or third network. The centralized training and computing architecture is restricted by huge communication overhead and strict UE data privacy. Distributed training and computing architecture comprises several framework, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For an example, terrestrial networks based sensing and non-terrestrial networks based sensing will involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinator are nodes in a network that can assist in the sensing operation. These nodes can be stand-alone nodes dedicated to just sensing operations or other nodes (for example TRP 170, ED 110, or core network node) doing the sensing operations in parallel with communication transmissions. New protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to Terahertz carrier frequency, from space, outdoor to indoor scenario, and from text, voice to video. These data are collecting, processing and usage are performed in a unified framework or a different framework.

Two-Stage DCI Framework

A DCI transports downlink control information for one or more cells/carriers/BWPs. DCI structure includes one stage DCI and two stage DCI. In one stage DCI structure, the DCI has a single part and is carried on a physical channel, e.g. PDCCH, a UE receives the physical channel and decodes the DCI in the physical channel, then receives or transmits data according to the control information in the DCI. For instance, in 3GPP TS 38.212v15.8.0, DCI formats 0_0, 0_1, 1_0, 1_1, 2_0, 2_1, 2_2 and 2_3 are one stage DCIs.

In a two stage DCI structure, the DCI structure includes two parts, i.e. first stage DCI and corresponding second stage DCI. The first stage DCI and the second stage DCI are transmitted in different physical channels, e.g. the first stage DCI is carried on a PDCCH and the second stage DCI is carried on a PDSCH, wherein the second stage DCI is not multiplexed with UE DL data, i.e. the second stage DCI is transmitted on a PDSCH without DL-SCH. The first stage DCI indicates control information for the second stage DCI, including time/frequency/spatial resources of the second stage DCI. Optionally, the first stage DCI can indicate the presence of the second stage DCI. If the second stage DCI is present, a UE needs to receive both the first stage and the second stage DCI to get the control information for data transmission. For the contents of the first stage DCI and second stage DCI, the first stage DCI includes the control information for the second stage DCI and the second stage DCI includes the control information for the UE data; or the first stage DCI includes the control information for the second stage DCI and partial control information for the UE data, and the second stage DCI includes partial or whole control information for the UE data. If the second stage DCI is not present, which may be indicated by the first stage DCI, a UE receives the first stage DCI to get the control information for data transmission.

In accordance with an embodiment of the application, a two stage DCI framework is provided. The two stage framework involves the use of a first stage DCI that is transmitted by the network device, for example by a base station, for reception by UE. The first stage DCI is carried by a physical downlink control channel (PDCCH). The two stage framework also involves the use of a second stage DCI that is transmitted by the network device for reception by UE. The second stage DCI is carried by a physical downlink shared channel (PDSCH) without data transmission, or the second stage DCI is carried in a specific physical channel (e.g. a specific downlink data channel, or a specific downlink control channel) only for the second stage DCI transmission.

The second stage DCI is transmitted on PDSCH without downlink shared channel (DL-SCH), where the DL-SCH is a transport channel used for the transmission of downlink data. That is to say the physical resources of the PDSCH used to transmit the second stage DCI are used for a transmission including the second stage DCI without multiplexing with other downlink data. For example, where the unit of transmission on the PDSCH is a physical resource block (PRB) in frequency-domain and a slot in time-domain, an entire resource block in a slot is available for second stage DCI transmission. This allows maximum flexibility in terms of the size of the second stage DCI, without the constraints on the amount of DCI that could be transmitted that would be introduced if multiplexing with downlink data was employed. This also avoids the complexity of rate matching for downlink data if the downlink data is multiplexed with DCI.

The UE receives the first stage DCI (for example by receiving a physical channel carrying the first stage DCI) and performs decoding (e.g. blind decoding) to decode the first stage DCI. Scheduling information for the second stage DCI, within the PDSCH, is explicitly indicated by the first stage DCI. The result is that the second stage DCI can be received and decoded by the UE without the need to perform blind decoding, based on the scheduling information in the first stage DCI.

As compared to scheduling a PDSCH carrying downlink data, in some embodiments more robust scheduling information is used to schedule a PDSCH carrying second stage DCI, increasing the likelihood of that the receiving UE can successfully decode the second stage DCI. Detailed examples are provided below.

Because the second stage DCI is not limited by constraints that may exist for PDCCH transmissions, the size of the second stage DCI is very flexible, and may be used to indicate scheduling information for one carrier, multiple carriers, multi-transmissions for one carrier. Detailed examples are provided below.

Figure 5A:
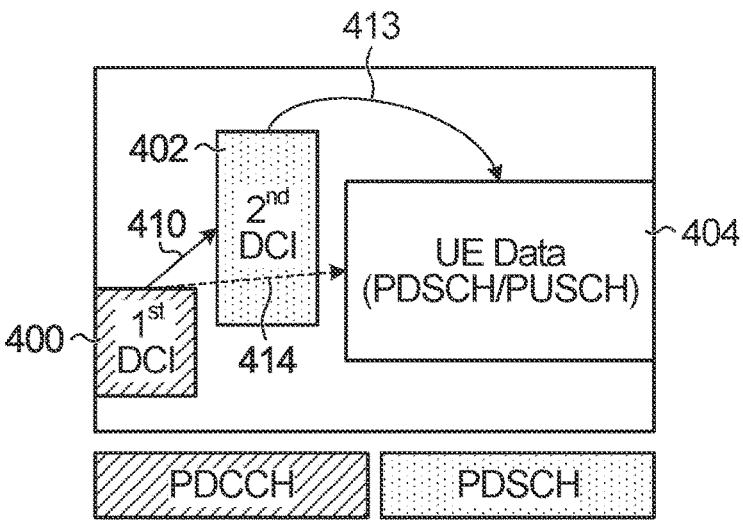
FIG. 5A shows time frequency resources for a two stage DCI.

An example of the resources that might be used for the two stage DCI is shown in FIG. 5A. In FIG. 5A, time domain (e.g. orthogonal frequency division multiplexing (OFDM) symbol durations) is in the horizontal axis, and frequency domain (e.g. OFDM subcarriers) is in the vertical direction. Shown is a first stage DCI 400 transmitted using a PDCCH, where the PDCCH includes one or more control channel elements (CCEs) or enhanced CCEs, and a second stage DCI 402 transmitted on a PDSCH using at least one of one or more PRBs, one or multiple transport block(s), and one or more symbols, the PDSCH uses for transmitting the second stage DCI 402 only without any UE data transmission. One example of PDCCH and PDSCH structure can refer to the following FIG. 6. The first stage DCI 400 includes a scheduling information of the second stage DCI 402, depicted graphically by arrow 410. Also shown is UE data 404, which may include uplink data on a physical uplink shared channel (PUSCH) and/or downlink data on a PDSCH and/or a sidelink channel scheduled by the second stage DCI.

In some embodiments, scheduling information of the second stage DCI indicates parameters of at least one of a time resource, a frequency resource and a spatial resource of the second stage DCI. The first stage DCI may also indicate at least modulation order of the second stage DCI, coding rate of the second stage DCI, partial or full scheduling information for a data transmission.

The second stage DCI may include scheduling information for data channel, e.g. PDSCH for DL scheduling and/or PUSCH for uplink (UL) scheduling. Referring to FIG. 5A, for this case, arrow 410 represents the indication of the time and/or frequency and/or spatial resources and/or modulation order and/or coding rate of the second stage DCI, and arrow 413 represents the scheduling information for data transmission, e.g. DL scheduling for PDSCH and/or UL scheduling for PUSCH and/or sidelink resources for UE transmission or reception.

In some embodiments, the first stage DCI indicates scheduling information of the second stage DCI, and also includes partial scheduling information for a data transmission, such as one or more of time/frequency/spatial resource allocation, modulation order, coding rate, HARQ information, UE feedback resources, or power control for data. The second stage DCI includes additional detailed scheduling information for data, e.g. the information not indicated by first stage DCI, or an update to the information indicated by first stage DCI for data. Referring to FIG. 5A, for this case, arrow 410 represents the indication of the time and/or frequency and/or spatial resources and/or modulation order and/or coding rate of the second stage DCI. Arrow 414 represents partial scheduling information for data transmission. Arrow 413 represents the detailed scheduling information for data, e.g. DL scheduling for PDSCH and/or UL scheduling for PUSCH.

The first stage DCI is blind decoded by the UE. No blind decoding is required for the second stage DCI because the scheduling information of the second stage DCI is explicitly indicated by the first stage DCI.

A transport block defines the basic information bits unit transmitted in PDSCH/PUSCH. For PDSCH carrying downlink data, e.g. information bits from MAC layer, a MAC protocol data unit (PDU) is mapped to a TB. For PDSCH carrying the second stage DCI, the DCI is mapped to a TB. The transport block size (TBS) is defined as the size (number of bits) of a TB. Depending on definition, the TB size may include or exclude the CRC bits. While no TB from a medium access control (MAC) layer is transmitted in the PDSCH carrying the second stage DCI, the size of the second stage DCI may be determined in a manner similar to how TB size for DL-SCH transmitted using the PDSCH is calculated/determined. The TB size may be calculated, for example, based on the available resource elements (REs) for PDSCH, modulation order, coding rate, the number of layers, etc. See for example, Section 5.1.3.2 of 3GPP TS 38.214 which includes a detailed breakdown of an example method of TB size calculation. Therefore, by assigning flexible RBs and symbols for the PDSCH, and using various coding rates for the DCI, the size of second stage DCI is very flexible, enabling DCI size to be specified differently for different uses, for example, different UEs, different services, different scenarios, etc., thus can achieve personalized DCI size requirements.

In some embodiments, the second stage DCI may indicate at least one of the following for scheduling data transmission for a UE:

scheduling information for one PDSCH in one carrier/ BWP;

scheduling information for multiple PDSCH in one carrier/BWP;

scheduling information for one PUSCH in one carrier/ BWP;

scheduling information for multiple PUSCH in one carrier/BWP;

scheduling information for one PDSCH and one PUSCH in one carrier/BWP;

scheduling information for one PDSCH and multiple PUSCH in one carrier/BWP;

scheduling information for multiple PDSCH and one PUSCH in one carrier/BWP;

scheduling information for multiple PDSCH and multiple PDSCH in one carrier/BWP;

scheduling information for sidelink in one carrier/BWP;

partial scheduling information for at least one PUSCH and/or at least one PDSCH in one carrier/BWP, wherein the partial scheduling information is an update to scheduling information in the first stage DCI;

partial scheduling information for at least one PUSCH and/or at least one PDSCH, wherein remaining scheduling information for the at least one PUSCH and/or at least one PDSCH is included in the first stage DCI;

configuration information related to an artificial intelligence (AI)/machine learning (ML) function;

configuration information related to a non-AI/ML function;

Therefore, the two-stage DCI mechanism can be used to achieve a unified design for UEs with different AI/ML capabilities. The design is unified in the sense that the same DCI format for the first stage DCI can be used, while the scheduling information in the second stage DCI is flexible, and can be used to configure AI/ML functions. For example, for scheduling information included scheduling information in second stage DCI, which may include one or more of frequency/time domain resource allocation, modulation order, coding scheme, new data indicator, redundancy version, HARQ related information, transmit power control, PUCCH resource indicator, antenna port(s), transmission configuration indication, code block group indicator, preemption indication, cancellation indication, availability indicator, resource pool index, etc. (others could refer to Section 7.3.1 DCI formats in 3GPP TS 38.212-g20), the second stage DCI can include a dynamic indication whether the information is for a non-AI mode or an AI mode. When the AI mode has multiple AI types, the second stage DCI can include a dynamic indication indicating one of the multiple AI type. When an AI mode applies, the value in the scheduling information field is used as an input to an AI inference engine to determine the meaning.

For the time and frequency resources of first stage DCI and second stage DCI, they can be time division multiplexed and/or frequency division multiplexed, however in general, the first stage DCI will need to be decoded before the second stage DCI is decoded, as the UE is not aware of the second stage DCI until the first stage DCI is decoded. FIG. 5A shows a first example, generally indicated at 410 (which shows the same resource usage as FIG. 5A), where first and second stage DCIs 400,402 are time division multiplexed. In some embodiments, where the frequency resource is the same for the first and second stage DCIs, the scheduling information of the second stage DCI included in the first stage DCI does not include information about a frequency resource.

Figure 5B:
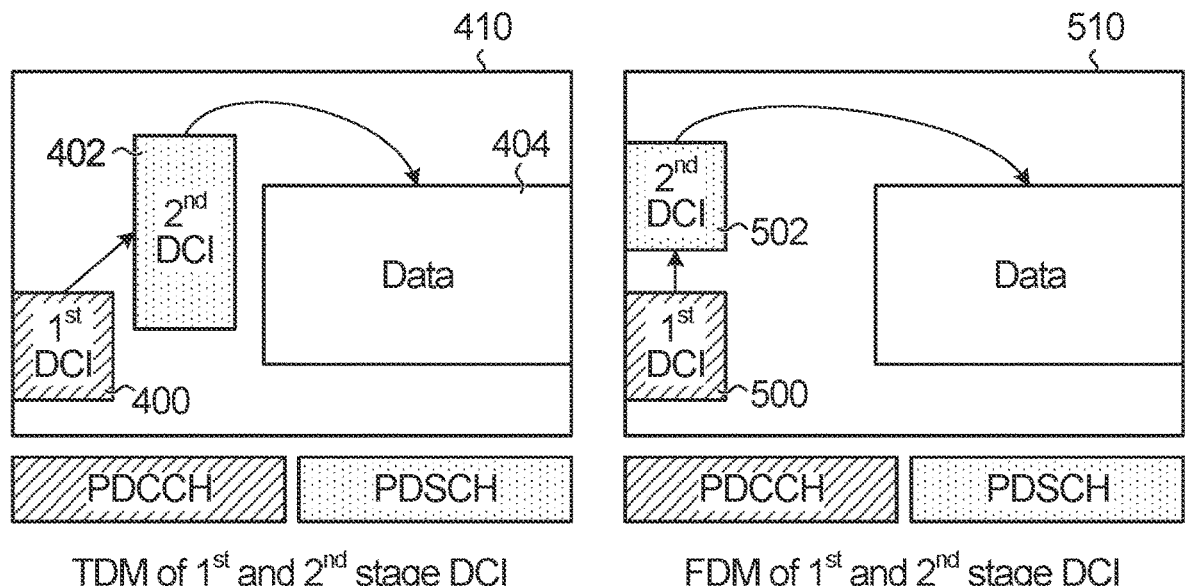
FIG. 5B shows time division multiplexing and frequency division multiplexing for a two stage DCI.

FIG. 5B shows a second example, generally indicated at 510, where first and second stage DCIs 500,502 are frequency division multiplexed. In this example, the first and second stage DCIs 500,502 are received at the same time or in overlapping frequency resources, the first stage DCI 500 is decoded first, since the UE is not aware of the second stage DCI until having decoded the first stage DCI. In some embodiments, where the time resource is the same for the first and second stage DCIs, the scheduling information of the second stage DCI included in the first stage DCI does not include information about a time resource.

For all of the embodiments described herein, it is assumed that the first stage DCI is carried by a PDCCH and the second stage DCI is carried by a PDSCH. PDCCH is the physical channel that carries control information. PDSCH is the physical channel that carries DL-SCH originating from a higher layer and/or control information. The PDCCH transmission of the first stage DCI may include of one or more control-channel elements (CCEs), or enhanced CCEs. The PDSCH transmission of the second stage DCI may occupy at least one of one or more PRBs in the frequency-domain, one or more TBs and one or more symbols in the time-domain. The processing procedure is similar to the downlink data processing.

Figure 6:
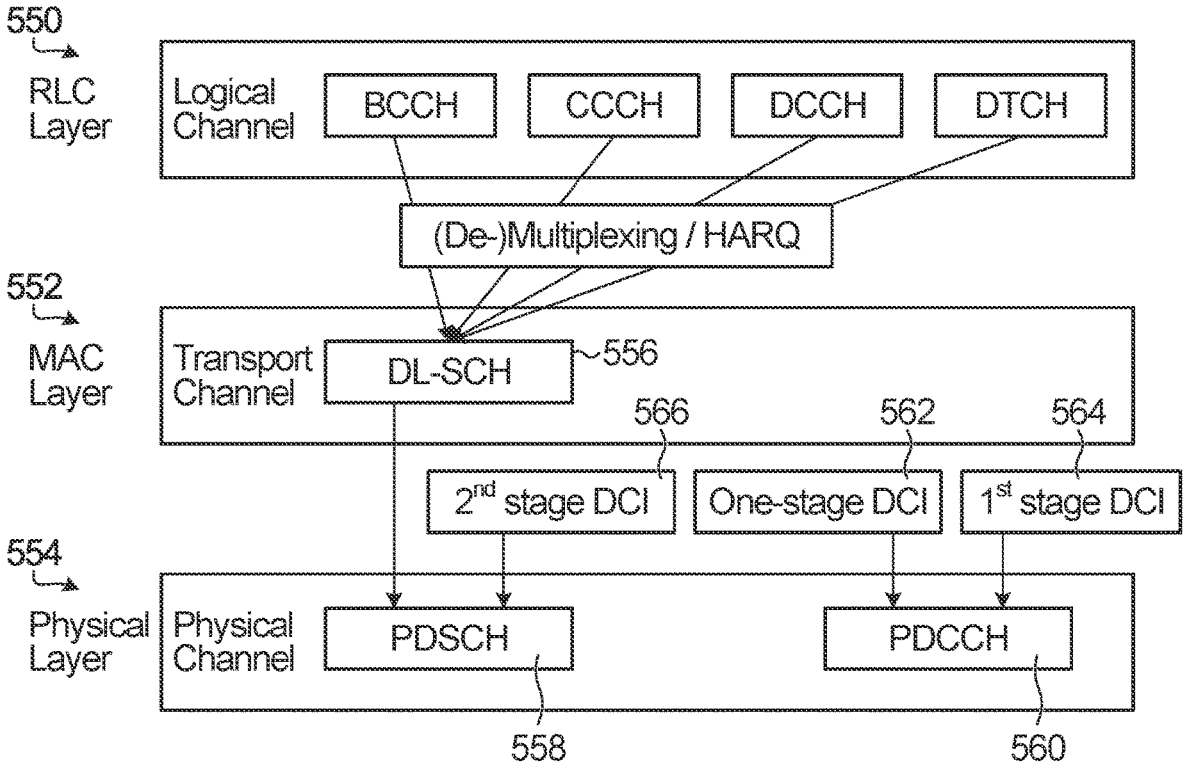
FIG. 6 shows a protocol stack showing how the two stage DCI is transmitted.

Details of protocol stack are now described, the following discussion are equally applicable to the above PDCCH and PDSCH of any of the 5A and 5B. It should understood that the PDCCH and PDSCH as disclosed herein, are not limited by the PDCCH and PDSCH of any of the 5A and 5B. Referring now to FIG. 6, shown is an example of a protocol stack that includes RLC (radio link control) layer 550, MAC layer 552 and physical layer 554. RLC operates per logical channel, MAC operates per transport channel (e.g. downlink-shared channel (DL-SCH)) and physical layer operates per physical channel (e.g. PDSCH, PDCCH).

PDSCH 558 is the physical channel that carries the DL-SCH originating from a higher layer, i.e. there is a particular transport channel is mapped to PDSCH. For example, DL-SCH 556 is shown mapped to PDSCH 558.

PDCCH 560 is the physical channel that carries control information, e.g. DCI, and PDCCH has no corresponding transport channel. With the provided methods, one stage DCI 562 and first stage DCI 564 are carried by PDCCH 560, second stage DCI 566 is carried by PDSCH 558, but as noted above there is no multiplexing between the DCI and the downlink data on PDSCH 558. While the PDSCH is generally used to transmit transport blocks including downlink data from a DL-SCH, when a transport block transmitted on the PDSCH is carrying the second stage DCI, the PDSCH does not carry DL-SCH.

Figure 7A:
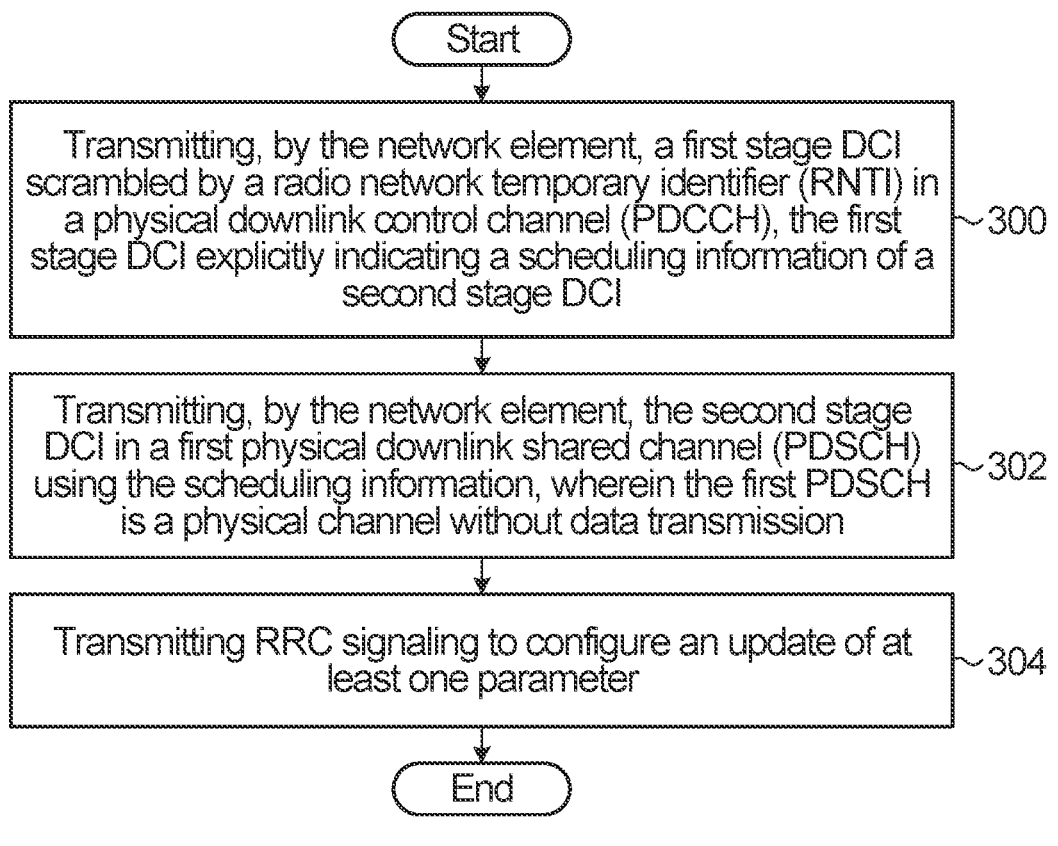
FIG. 7A is a flowchart of a method of two stage DCI transmission.

Combining the above FIGS. 5A and 5B, FIG. 7A is a flowchart of a method of two stage DCI transmission by a network element, e.g based on the two stage DCI structure shown in any one of FIGS. 5A and 5B. The method of FIG. 7A will be described as being performed by a network element having at least one processor, a computer readable storage medium, a transmitter and a receiver. In some implementations, the computer readable storage medium is operatively coupled to the at least one processor and stores programming for execution by the at least one processor. The programming may include instructions to perform the method of FIG. 7A. In some implementations, the network element is a BS or TRP, such as the T-TRP 170 or the NT-TRP 172 of FIGS. 1 to 3, for example. The method begins in block 300 with transmitting, by the network element, a first stage DCI scrambled by a radio network temporary identifier (RNTI) in a physical downlink control channel (PDCCH), the first stage DCI explicitly indicating a scheduling information of a second stage DCI.

The method continues in block 302 with transmitting, by the network element, the second stage DCI in a first physical downlink shared channel (PDSCH), wherein the first PDSCH is a physical channel without data transmission. The first stage DCI is blind decoded by the UE. No blind decoding is required for the second stage DCI because the scheduling information of the second stage DCI is explicitly indicated by the first stage DCI. The second stage DCI has at least one second stage DCI format, and the network device indicates the at least one second stage DCI format based on at least one of the first stage DCI and the second DCI. Optionally, the method includes block 304 which involves transmitting RRC signalling to configure an update of at least one parameter.

Combining the above FIGS. 5A and 5B, FIG. 7B is a flowchart of a method of two stage DCI reception. The method of FIG. 7B will be described as being performed by an apparatus having at least one processor, a computer readable storage medium, a transmitter and a receiver. In some implementations, the computer readable storage medium is operatively coupled to the at least one processor and stores programming for execution by the at least one processor. The programming may include instructions to perform the method of FIG. 7B. In some implementations, the apparatus is a UE or ED, such as the ED 110 of FIGS. 1 to 3, for example. The method begins in block 310 with receiving, by the apparatus, a first stage DCI scrambled by a radio network temporary identifier (RNTI) in a physical downlink control channel (PDCCH).

In some embodiments, the CRC of the first stage DCI is scrambled by at least one of the following:

an apparatus (e.g UE) specific RNTI, N bits of the scheduling information in the first stage DCI or in the second stage DCI indicating the at least one second stage DCI format;

a specific group common RNTI, the apparatus (e.g UE) obtains the at least one second stage DCI format based on the specific group common RNTI;

a unified group common RNTI, the codeword of the second DCI scrambled by a specific group RNTI, and the apparatus (e.g UE) obtains the at least one second stage DCI format based on the specific group RNTI;

a unified group common RNTI, N bits of the scheduling information in the first stage DCI or in the second stage DCI indicating the at least one second stage DCI format.

In some embodiments, when the CRC of first stage DCI is scrambled by UE-specific RNTI (e.g. C-RNTI or CS-RNTI or MCS-C-RNTI or SP-CSI-RNTI), and N bits of the scheduling information in the first stage DCI or in the second stage DCI indicating the at least one second stage DCI format.

In some embodiments, the CRC of the first stage DCI is scrambled by a specific group common RNTI, which allows the first stage DCI to be sent to a group of apparatus (e.g UEs). Depending on the purpose of the first stage DCI, different specific group common RNTI may be used, and the group common RNTI also serves to indicate an associated second stage DCI format.

The following is a set of examples of specific group common RNTIs:

for slot format indication (SFI), the first stage DCI is scrambled by SFI-RNTI;

for pre-emption indication, the first stage DCI is scrambled by interruption (INT)-RNTI;

for transit power control (TPC) commands for PUSCH, the first stage DCI is scrambled by TPC-PUSCH-RNTI;

Other purposes of specific group-common DCI are listed in section 7.3.1.3 in TS 38.212 g20.

For different purposes, the size of first stage DCI is the same when CRC is scrambled by a specific group common RNTI. No explicit second stage DCI format indication needs to be included in the first and second stage DCI, since the second stage DCI format is determined according to the specific group common RNTI. The number of information bits in the second stage DCI for a format associated with a specific group common RNTI may be configured by RRC signaling. An example mapping from group common RNTI used for CRC scrambling to second stage DCI format is provided in Table 1 below.

TABLE 1

Mapping from Group common RNTI to Second Stage DCI Format

| RNTI scrambled for first stage DCI | second stage DCI format |
|---|---|
| SFI-RNTI | 3-1 (notifying the slot format) |
| INT-RNTI | 3-2 (pre-emption indication) |
| TPC-PUSCH-RNTI or TPC-PUCCH-RNTI | 3-3 (power control for PUSCH or PUCCH) |
| TPC-SRS-RNTI | 3-4 (power control for SRS) |

In some embodiments, for different purposes of the group common DCI, the first stage DCI is scrambled the same group common RNTI, and therefore, the group common RNTI cannot function to indicate the second stage DCI format. A group common RNTI that is not limited to a specific purpose, or that has multiple purposes, is also referred to herein a unified group common RNTI. In some such embodiments, N bits in the first stage DCI are included that function as a second stage DCI format indicator.

In addition, or alternatively, in some embodiments, in situations where a unified group common RNTI is used to scramble the CRC of the first stage DCI for reception by a group of UEs, for each different second stage DCI format, there is a specific group common RNTI that is used for PDSCH scrambling. In this case, a codeword transmitted on the PDSCH carrying the second stage DCI is scrambled by the specific group common RNTI corresponding to the second stage DCI format. Scrambling for the PDSCH carrying the second stage DCI could ensure the reliability of the second stage DCI. In this case, the UE performs blind decoding of the PDSCH with different RNTI. For example, when the first stage DCI is scrambled with a unified group common RNTI, the PDSCH is scrambled by SFI-RNTI to indicate the format of the second stage DCI is for slot format indication. For example, when the first stage DCI is scrambled with a unified group common RNTI, the PDSCH is scrambled by SFI-RNTI to indicate the format of the second stage DCI is for slot format indication.

For example, when the first stage DCI is scrambled with a unified group common RNTI, the PDSCH is scrambled by TPC-PUCCH-RNTI to indicate the format of the second stage DCI is for PUCCH power control.

Alternatively, in some situations where the first stage DCI is scrambled by a unified group common DCI, a second stage DCI format indicator field is included in the second stage DCI to indicate the format, for example in the first N bits of the second stage DCI.

Referring to FIG. 7B, the method continues in block 312 with decoding, by the apparatus, the first stage DCI in physical downlink control channel (PDCCH), the first stage DCI explicitly indicating a scheduling information of a second stage DCI.

In some embodiments, the first stage DCI explicitly indicating a scheduling information of a second stage DCI includes parameters of at least one of a time resource, a frequency resource and a spatial resource of the second stage DCI. The first stage DCI may also indicate at least modulation order of the second stage DCI, coding rate of the second stage DCI, partial or full scheduling information for a data transmission. In some embodiments, the first stage DCI indicates scheduling information of the second stage DCI, and also includes partial scheduling information for a data transmission, such as one or more of time/frequency/spatial resource allocation, modulation order, coding rate, HARQ information, UE feedback resources, or power control for data.

Referring to FIG. 7B again, the method continues in block 314 with receiving, by the apparatus, the second stage DCI in a first physical downlink shared channel (PDSCH), wherein the first PDSCH is a physical channel without data transmission.

In some embodiments, scheduling information of the second stage DCI indicates parameters of at least one of a time resource, a frequency resource and a spatial resource of the second stage DCI. The first stage DCI may also indicate at least modulation order of the second stage DCI, coding rate of the second stage DCI, partial or full scheduling information for a data transmission. The second stage DCI may include scheduling information for data channel, e.g. PDSCH for DL scheduling and/or PUSCH for uplink (UL) scheduling, for an example, the indication of the time and/or frequency and/or spatial resources and/or modulation order and/or coding rate of the second stage DCI. For another example, the scheduling information for data transmission, e.g. DL scheduling for PDSCH and/or UL scheduling for PUSCH and/or sidelink resources for UE transmission or reception. In some embodiments, the first stage DCI indicates scheduling information of the second stage DCI, and also includes partial scheduling information for a data transmission, such as one or more of time/frequency/spatial resource allocation, modulation order, coding rate, new data indicator, HARQ information, redundancy version, UE feedback resources, transmit power control, PUCCH resource indicator, antenna port(s), transmission configuration indication, code block group indicator, Pre-emption indication, cancellation indication, availability indicator, resource pool index, or power control for data. The second stage DCI includes additional detailed scheduling information for data, e.g. the information not indicated by first stage DCI, or an update to the information indicated by first stage DCI for data. In some embodiments, the second stage DCI may indicate at least one of the following for scheduling data transmission for a UE: scheduling information for one PDSCH in one carrier/BWP; scheduling information for multiple PDSCH in one carrier/BWP; scheduling information for one PUSCH in one carrier/BWP; scheduling information for multiple PUSCH in one carrier/BWP; scheduling information for one PDSCH and one PUSCH in one carrier/BWP; scheduling information for one PDSCH and multiple PUSCH in one carrier/BWP; scheduling information for multiple PDSCH and one PUSCH in one carrier/BWP; scheduling information for multiple PDSCH and multiple PDSCH in one carrier/BWP; scheduling information for sidelink in one carrier/BWP; partial scheduling information for at least one PUSCH and/or at least one PDSCH in one carrier/BWP, wherein the partial scheduling information is an update to scheduling information in the first stage DCI; partial scheduling information for at least one PUSCH and/or at least one PDSCH, wherein remaining scheduling information for the at least one PUSCH and/or at least one PDSCH is included in the first stage DCI; configuration information related to an artificial intelligence (AI)/machine learning (ML) function; configuration information related to a non-AI/ML function.

For the scheduling information in the second stage DCI, more information/configurations/functionalities may be supported as discussed below, e.g AI/ML mode, non-AI/ML mode, or sensing mode. In some embodiments, the second stage DCI can include a dynamic indication whether an AI mode applies to the scheduling information fields, or a non-AI mode applies. For example, a 1 bit AI indicator field can be used for this purpose. In some embodiments, for some of the scheduling information fields included in the second stage DCI, a respective AI indicator field may be included for each scheduling information field of the multiple fields. Alternatively, a given AI indicator field may apply to multiple scheduling information fields included in the second stage DCI. When an AI mode applies to a scheduling information field, the value of the field does not indicate the scheduling information directly, but rather serves as an input to an AI inference engine that calculates a meaning of the scheduling information. On the other hand, when an AI mode does not apply to a scheduling information field, the value of the field can be mapped directly to a meaning of the scheduling information field, for example using table lookup.

An example of the definition of a one-bit field to indicate whether a scheduling information field is for an AI mode or not is provided in the Table 2 below.

TABLE 2

| AI Indicator Field | |
|---|---|
| AI Indicator | AI Mode |
| 0 | Non-AI mode |
| 1 | AI mode |

In a specific example, the second stage includes a modulation and coding scheme (MCS) field, and the second stage DCI indicates whether the MCS field in the DCI is for an AI mode or a non-AI mode. If it is for the non-AI processing mode, the MCS field consists M1 bits (e.g. 5 bits as in NR) to indicate the modulation order and coding rate from a list of options; otherwise, the MCS field consists M2 bits to indicate an input of an AI inference engine at the UE side, where M2 (e.g. 3 bits) could be different than M1. The UE uses the value of the M2 bits as the AI input to infer the exact value of modulation order and coding rate.

In this case, the total number of bits in the second stage DCI used to indicate the MCS includes either 1+M1 bits or 1+M2 bits defined as follows:

AI indicator: 1 bit MCS:
        M1 bits if indicated as non-AI mode; the M1 bits may be used to select an MCS from a MCS table;
        M2 bits if indicated as AI mode; the M2 bits are input to an AI inference engine at the UE side to determine the MCS.

The value of M1 and M2 can be same or different

A similar approach can be used for other types of scheduling information. Advantageously, by allowing dynamic switching between AI mode and non-AI mode, if the base station notices that using AI mode is not efficient or effective, the base station can switch to the traditional method, and/or indicate a retraining procedure, maintaining the UE performance.

In some embodiments, for multiple (more than one) control information fields (for example multiple scheduling information) fields in a second stage DCI, the second stage DCI can indicate one of:

non-AI mode applies to the at least two scheduling information fields;

AI mode applies to one of the at least two scheduling information fields and non-AI mode applies to another of the at least two scheduling information fields;

separate AI mode applies to each of the at least two scheduling information fields;

joint AI mode applies to the at least two scheduling fields collectively.

This can be used for fields relating to resource assignment (RA). For instance, for a first field comprising a time domain resource assignment (e.g. a field named "time-domain resource assignment") and a second field comprising frequency domain resource assignment (e.g. a field named "frequency domain resource assignment") in the second stage DCI, a set of X bits can be used to indicate whether joint AI applies to the two fields, separate AI applies to the two fields, or AI applies to one field but not the other, or AI applies to neither field.

When separate AI applies, each input is processed by a respective AI inference engine/module. When joint AI applies, a single or multiple inputs to an inference engine, or a pair of jointly optimized inference engines/modules is used to generate values/meanings for multiple types of scheduling information. The single input may include bits from one or both of the fields in the DCI. For example, if the DCI includes an N1 bit field for a first control information field, and an N2 bit field for a second control information field, the N1 bits and N2 bits together can be viewed as an N1+N2 bit field, and the N bits for joint AI may be N bits from the N1+N2 bit field. On the other hand, when separate AI applies, the N1 bit field and the N2 bit field have separate functions, wherein the N1 bit field does not indicate the control information associated to the N2 bit field. An example is shown in Table 3 below where a 3-bit field is used for this purpose.

For joint AI mode, the BS uses N bits to indicate the AI input for time and frequency resource assignment at UE side. After receiving the second stage DCI, the UE uses the value of the N bits as the AI input to infer the exact time and frequency resources assigned by BS. For separate AI indication, N1 bits are used for the UE to infer the time domain resources by AI at UE side, and N2 bits are used for the UE to infer the frequency domain resources by AI at UE side.

For non-AI mode for frequency domain resource assignment, the resource block (RB) or resource block group (RBG) locations are indicated to the UE in the second stage DCI. For non-AI mode for time domain resource assignment, the allocated symbols are indicated to the UE. This may involve, for example, use of a time resource assignment table.

A benefit of this approach is a unified design for UEs with different AI capabilities and implementations.

For some scheduling information to be transmitted using DCI, the value changes slowly, and a dynamic indication its presence can save bits. In some embodiments, for at least one scheduling information field, there is an associated indicator field that indicates the presence or absence of the scheduling information field. If the indicator field indicates the associated scheduling information field is present, then the UE obtains this and uses the value in the field. If the indicator indicates the associated scheduling information field is not present, this could have various meanings such as:

Use a predefined value for the scheduling information field;

Use an RRC configured value for the scheduling information field;

Use a value of the scheduling information field from the previous DCI.

A few specific examples follow below, but it should be understood this approach could be applied to any field in the second stage DCI.

For example, in some embodiments, the second stage DCI may include a field to indicate whether the DCI includes scheduling information for two TBs, or one TB in which case scheduling information for a second TB is omitted. The field can be viewed as a presence indicator for scheduling information for the second TB. In a specific example, the DCI includes the following:

2 TBs presence indicator: ibit (0: only 1 TB; 1: 2 TBs);

One set of parameters {MCS, new data indicator (NDI), redundancy version (RV)} if the value of 2 TBs presence indicator is 0; and Two sets of parameters {MCS, NDI, RV} if the value of 2 TBs presence indicator is 1.

For example, in some embodiments, the second stage DCI may include a field "carrier indicator" that indicates the carrier being scheduled, and the second stage DCI includes an indicator field that indicates whether this field is present or not.

For example, in some embodiments, the second stage DCI may include a field "TPC" comprising transmit power control information, and the second stage DCI includes an indicator field that indicates whether this field is present or not.

For example, in some embodiments, the second stage DCI may include a field "PUCCH resource indicator", and the second stage DCI includes an indicator field that indicates whether this field is present or not.

For example, in some embodiments, the second stage DCI may include a field "BWP indicator" to indicate bandwidth part, and the second stage DCI includes an indicator field that indicates whether this field is present or not. In a specific example, the second stage DCI includes the following for BWP:

Presence indicator: 1 bit (0: no BWP indicator present; 1: BWP indicator present)

0 bits if the value of "BWP indicator" is 0. The scheduled BWP index is the same as current active BWP 2 bits to indicate BWP if the value of "BWP indicator" is 1.

By adding the presence indicator in the second stage DCI, for most of time when the scheduling information is not changed, the amount of overhead is reduced.

In some embodiment, the scheduling information can indicate sensing related information. For a BS with sensing capability, sensing will assist communication. For example, sensing could provide useful information to the BS, such as UE locations, doppler, beam directions, and images. When

TABLE 3

Indication of Joint AI Mode for multiple fields

| Bit field | AI indicator | Time/Frequency domain RA |
|---|---|---|
| 000 | Joint AI for time-frequency domain RA | N bits |
| 001 | Separate AI for time and frequency domain RA | N1 bits for time RA, N2 bits for frequency RA |
| 010 | AI for time domain RA, non-AI for frequency domain RA | N1 bits for time RA, M2 bits (resource block group (RBG), resource indication value (RIV) for frequency RA |
| 011 | Non-AI for time domain RA, AI for frequency domain RA | M1 bits (time RA table) for time RA, N2 bits for frequency RA |
| 100 | Non-AI for time domain RA, non-AI for frequency domain RA | M1 bits for time RA, M2 bits for frequency RA |
| 101 | Reserved | Reserved |
| 110 | Reserved | Reserved |
| 111 | Reserved | Reserved | the BS can sense such information, it may be that less feedback information from the UE is required. In some embodiments, the BS sensing capability, for example, in terms of whether sensing is enabled or disabled at the BS, is indicated to the UE, e.g. by master information block (MIB), system information (SI), radio resource control (RRC) signaling, medium access control (MAC)-control entity (CE), DCI.

In some embodiments, the contents or the number of bits of the uplink control information (UCI) sent by the UE depends on whether sensing is enabled. Channel state information (CSI) is one type of UCI, which includes several types: PMI (precoding matrix indication), RI (rank indication), LI (layer indicator), CQI (channel quality information), CRI (CSI-RS resource indicator), SSBRI (SS/PBCH (physical broadcast channel) Resource Block Indicator), RSRP (reference signal received power).

When sensing is not enabled, UE measures and reports some CSI types to BS; when sensing is enabled, UE measures and reports less CSI types to the BS, e.g. a subset the CSI types sent when sensing is not enabled. In a specific example, a UE measures and reports PMI, RI, CQI when sensing is not enabled; and UE measures and reports PMI, RI when sensing is enabled, and CQI is obtained by sensing capability.

In some embodiments, for at least one CSI type, the number of bits reported by the UE are different for when sensing is enabled compared to when sensing is not enabled. When sensing is enabled, fewer of bits are used for reporting. Examples for CSI-RS Resource indicator (CRI), synchronization signal block resource indicator (SSBRI), reference signal receive power (RSRP), and Differential RSRP is shown in the below Table 4, where $K_{s1}^{CSI-RS}$ and $K_{s2}^{CSI-RS}$ is the number of CSI-RS resources in the corresponding resource set s1 and s2, $K_s^{SSB}$ is the configured number of SS/PBCH blocks in the resource set.

TABLE 4

| | Bitwidths for CSI Fields for Sensing Not Enabled and Sensing Enabled | |
| --- | --- | --- |
| Field | Bitwidth (without sensing) | Bitwidth (with sensing) |
| CRI | $\lceil log2(K_{s1}^{CSI-RS})\rceil$ | $\lceil log2(K_{s2}^{CSI-RS})\rceil$ |
| SSBRI | $\lceil log2(K_s^{SSB})\rceil$ | $\lceil log2(K_s^{SSB} - N)\rceil$ |
| RSRP | 7 | <7 (e.g. 5) |
| Differential RSRP | 4 | <4 (e.g. 2) |

In some embodiments, the second stage DCI includes one or more bits, for example a "CSI request" field, to indicate the CSI report type, including without sensing or with sensing, and to trigger the CSI report.

Referring to FIG. 7B, the method continues in block 316 with decoding, by the apparatus, the second stage DCI in the first PDSCH. The first stage DCI is blind decoded by the UE. The second stage DCI has at least one second stage DCI format, and the apparatus obtains the at least one second stage DCI format based on at least one of the first stage DCI and the second DCI. No blind decoding is required for the second stage DCI because the scheduling information of the second stage DCI is explicitly indicated by the first stage DCI.

In some embodiments, for the second stage DCI, there are multiple DCI formats. Each second stage DCI format is used for specific purpose. A specific example set of formats is as follows:

Format 2-1 is a format for scheduling one UL transmission in one carrier; for example, this can be used to schedule one PUSCH in one carrier;

Format 2-2 is a format for scheduling one DL transmission in one carrier; for example, this can be used to schedule one PDSCH in one carrier Format 2-3 is a format for scheduling multiple UL transmissions in one carrier, or scheduling multiple UL transmissions in multiple carriers, for example for scheduling N carriers and one UL transmission for each carrier; for example, this can be used to schedule multiple PUSCH with separate modulation and coding scheme (MCS)/new data indicator (NDI)/redundancy version (RV) in one carrier or in multiple carriers;

Format 2-4 is a format for scheduling multiple DL transmissions in one carrier, or scheduling multiple DL transmissions in multiple carriers, for example for scheduling N carriers and one DL transmission for each carrier; for example, this can be used to scheduling multiple PDSCH with separate MCS/NDI/RV in one carrier or in multiple carriers;

Format 2-5 is a format for scheduling one DL and one UL transmission in one carrier, or one DL transmission in a carrier and one UL transmission in another carrier; for example, this can be used to schedule one PDSCH and one PUSCH in one carrier or in multiple carriers;

Format 2-6 is a format for scheduling one DL and multiple UL transmissions, or one UL and multiple DL transmissions, or multiple DL and multiple UL transmissions in one carrier or in multiple carriers; for example, this can be used to schedule one/multiple PDSCH and one/multiple PUSCH in one carrier or in multiple carriers;

Format 2-7 is a format for scheduling sidelink in one carrier or multiple carriers; and Format 2-8 is a format that includes UE data 1 and scheduling information for UE data 2. For example, the information bits in the DCI includes two parts: part 1 consisting of downlink data, e.g. for a downlink ultra reliable low latency (URLLC) service; part 2 consisting of DL/UL scheduling information, e.g. for another data packet.

In some embodiment, the above second stage formats 2-1 to 2-8 is predefined like the following Table 5. In one option, the BS and UE can store Table 5, and BS schedule one or more format and send them in bits field of the first DCI or the second DCI, when UE receives the format and looks up the Table 5 to obtain the information of format usage. In another option, only less of the second DCI formats 2-1 to 2-8 is applied based on actual requirement, e.g, only format 2-7 used for the apparatus in sidelink, the BS can explicitly indicating the usage information to the apparatus, don't need to look up a table. The second stage formats 2-1 to 2-8 are the examples for some usage, there is no limitation to define more usages for second stage formats based on communication requirement in future communication system.

TABLE 5

| The second stage DCI formats | |
| --- | --- |
| second stage DCI format | Usage |
| 2-1 | Scheduling one PUSCH in one carrier |
| 2-2 | Scheduling one PDSCH in one carrier |
| 2-3 | Scheduling multiple PUSCH with separate MCS/NDI/RV in one carrier or in multiple carriers |

TABLE 5-continued

| The second stage DCI formats | |
| --- | --- |
| second stage DCI format | Usage |
| 2-4 | Scheduling multiple PDSCH with separate MCS/NDI/RV in one carrier or in multiple carriers |
| 2-5 | Scheduling one PDSCH and one PUSCH in one carrier or in multiple carriers |
| 2-6 | Scheduling one/multiple PDSCH and one/multiple PUSCH in one carrier or in multiple carriers |
| 2-7 | Scheduling sidelink in one carrier or multiple carriers |
| 2-8 | Including scheduling information and UE data |

Taking above second stage formats 2-1 to 2-8 as examples, N-bit second stage DCI Format indicator can used to indicate the second stage formats 2-1 to 2-8. In some embodiments, N bits, for example the first N bits, of the second stage DCI are used to indicate the second stage DCI format. The procedure performed by the receiving UE is as follows: after UE obtains the first stage DCI by blind decoding, the UE obtains from the first DCI the scheduling information for the PDSCH transport block carrying the second stage DCI. The UE then decodes the transport block and obtains the information bits for the second stage DCI. The UE then uses the N bits of the second stage DCI to determine the used second stage DCI format. Based on the used second stage DCI format, the UE can then determine other DCI fields according to the used second stage DCI format. The value of N may depend on the number of available second stage DCI formats (assuming the total number is M), $N \geq \lceil \log 2(M) \rceil$. For example, if M=7, then N can be set to 3, and the first 3 bits of the second stage DCI is the field comprising the second stage DCI format indicator. An example mapping between second stage DCI format indicator, and second stage DCI format is shown in Table 6 below for the case where N=3, and there are 8 second stage DCI formats.

TABLE 6

| Second Stage DCI Formats | |
| --- | --- |
| second stage DCI format indicator | format |
| 000 | 2-1 |
| 001 | 2-2 |
| 010 | 2-3 |
| 011 | 2-4 |
| 100 | 2-5 |
| 101 | 2-6 |
| 110 | 2-7 |
| 111 | 2-8 |

In some embodiments, the above described approach in which the N bits of the second stage DCI to indicate the second stage DCI format, is used when the CRC of first stage DCI is scrambled by apparatus (UE)-specific RNTI (e.g. C-RNTI or CS-RNTI or MCS-C-RNTI or SP-CSI-RNTI).

Referring to FIG. 7B, the method continues in block 318 with receiving RRC signaling to configure update of at least one parameter, this can be an optional step. Some parameters may be dynamically configured by RRC. Examples include: waveform type: e.g. OFDM or SC-FDM;

CSI and beam management framework: e.g. whether enabling AI for CSI measurement and feedback, CSI-RS pattern, CSI-RS position;

Demodulation reference symbol (DMRS) resource configuration: DMRS pattern, DMRS position, additional DMRS position;

PDCCH monitor occasions: PDCCH monitor periodicity, symbol locations, timer for power saving;

AI training period: starting or ending occasion for AI training; and

AI executing period: starting or ending occasion for AI execution.

In some embodiments, for each of at least one parameter configured by RRC, the second stage DCI includes an indication of whether a parameter configured by RRC is being updated by the second stage DCI. For a value being updated, the second stage DCI includes the updated parameter value. For example, one bit may be used for a parameter to indicate whether the value is updated. A benefit of this approach is that when the configured RRC parameter is no longer the best value for the UE, the second stage DCI can be used to update the value to achieve the best performance for the UE.

The above described embodiments have the following advantages:

support flexible functionalities with the second stage DCI;

unified AI and non-AI indication, dynamic switching between AI and non-AI mode;

dynamic indication of joint AI or separate AI for multiple modules;

dynamic indication of the presence of some fields which are slowly changed; and flexible spectrum (carrier/BWP) scheduling, flexible multiple transmission (DL/UL/SL/unlicensed/NTN) scheduling.

Based on the embodiment of in FIGS. 7A and 7B, the PDCCH and PDSCH structure can refer to above FIG. 6. Also the first stage DCI and the second stage DCI can be transmitted in TDM or FDM which disclosed in the above embodiments of FIG. 5A and FIG. 5B.

Figure 11:
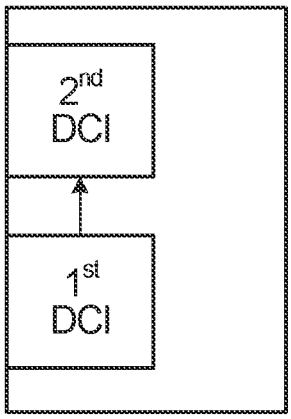
FIG. 11 shows an example of frequency division multiplexing between first stage DCI and second stage DCI.

In some embodiments, the first and second stage DCI are frequency domain multiplexed (FDM), meaning that the occupied symbols for first and second stage DCI are partial/completely overlapped but occupied frequency resources are different. An example is shown in FIG. 11. In FIG. 11, time is on the horizontal axis for example representing OFDM symbols, and frequency is in the vertical axis.

If the same occupied symbols are used for the first and second stage DCI, which is predefined or RRC configured, then there is no need for an indication of the time-domain location of second stage DCI in the first stage DCI. On the other hand, if different occupied symbols of the first and second stage DCI is to be supported, the first stage DCI may indicate symbol locations of the second stage DCI within a same PDCCH monitoring occasion or same slot.

Figure 12:
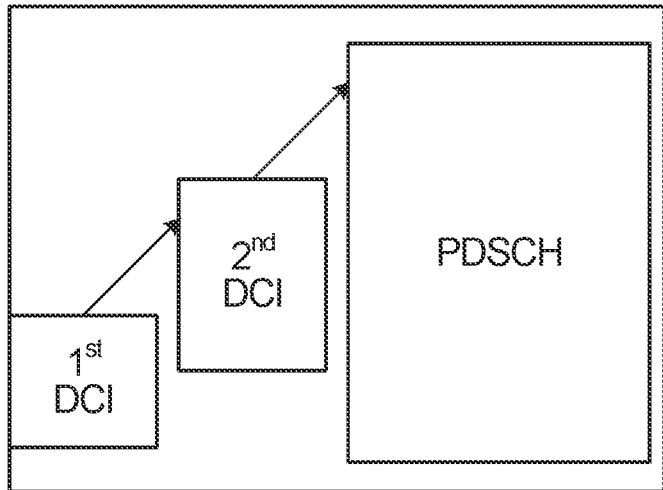
FIG. 12 shows an example of time division multiplexing between first stage DCI and second stage DCI.

In some embodiments, the first and second stage DCI are time domain multiplexed (TDM), meaning that the occupied symbols for first and second stage DCI are not partially/whole overlapped in time. An example is shown in FIG. 12. For such embodiments, the symbol location(s) of the second stage DCI is indicated by the first stage DCI.

Based on the TDM example of FIG. 12, or the FDM example of FIG. 11, reference signal (e.g DMRS) has different DMRS pattern and DMRS position. In the following description the expression "front-loaded DMRS" means that the DMRS is before the data channel, or in the front several symbols of the data channel; also, the expression "end-loaded DMRS" means the DMRS is after the data channel or in the last several symbols of the data channel.

Figure 13:
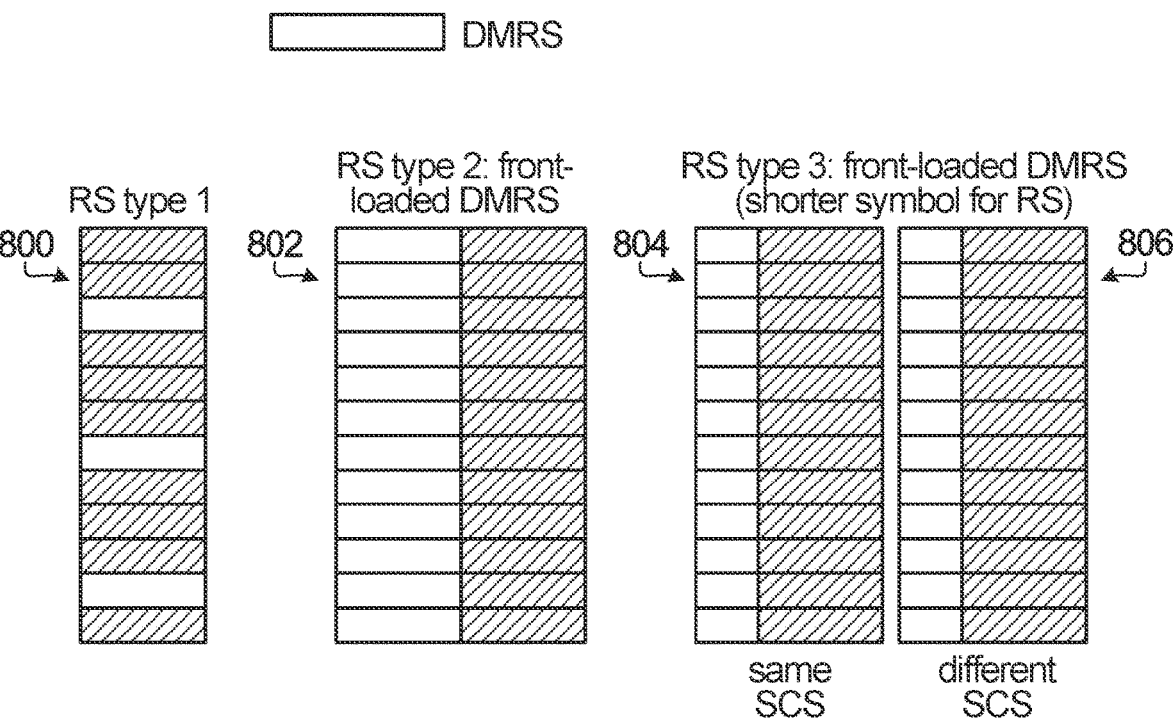
FIG. 13 shows examples of demodulation reference symbols designs.

For the DMRS pattern of the first stage DCI, the second stage DCI, UE data (PDSCH/PUSCH), there are 3 types, examples of which are shown in FIG. 13:

Type 1: resource elements (RE) for DMRS and RE for DCI/UE data are frequency domain multiplexed in one resource block (RB). For example, REs for DMRS may be included in the symbol with density ¼. An example is shown in FIG. 13, generally indicated at 800;

Type 2: time domain multiplexing between resource elements for DMRS and RE for DCI/UE data. The symbol length for DMRS and DCI/UE data are the same. An example is shown in FIG. 13, generally indicated at 802;

Type 3: time domain multiplexing between DMRS and RE for DCI/UE data, and shorter symbols length for DMRS, where the subcarrier spacing (SCS) of the DMRS and RE for DCI/UE data can be same or different. A first example is shown in FIG. 13, generally indicated at 804 where the same subcarrier spacing is used, and a second example is shown in FIG. 13, generally indicated at 806 where different same subcarrier spacings are.

The DMRS types of the one-stage DCI, first stage DCI, second stage DCI, UE data (PDSCH/PUSCH) can be:

Same available DMRS types for all types of DCI, including one-stage DCI, first stage and second stage DCI. UE data has different DMRS types.

Same available DMRS types for DCI which is carried by PDCCH, i.e. one-stage DCI and first stage DCI. For second stage DCI which is carried by PDSCH, the available DMRS types can be different from those of the DCI carried by PDCCH, e.g. can be same as PDSCH for UE data.

In some embodiments, the DMRS of the second stage DCI is also used for UE data. In other words, the DMRS used for channel estimation for UE data includes the DMRS of the second stage DCI.

Figure 14:
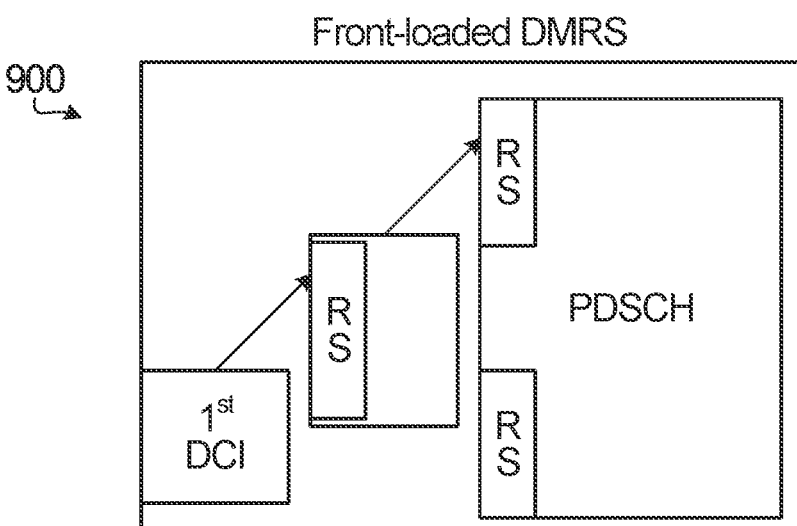
FIG. 14 is an example of front loaded DMRS shared between DCI and data.
Figure 14:
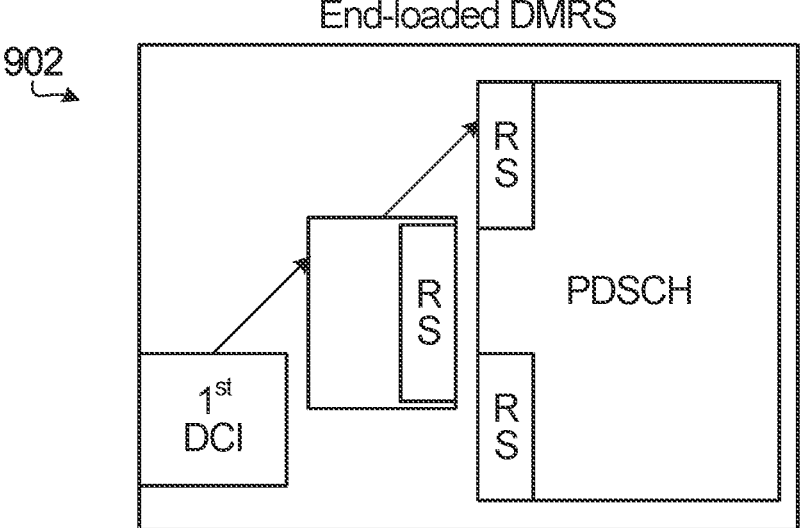

A first example is shown in FIG. 14, generally indicated at 900. In this example, there is a front-loaded DMRS for the second stage DCI and front loaded DMRS for the PDSCH. Channel estimation for the PDSCH is based on the front-loaded DMRS for the second stage DCI and the front loaded DRMS for the PDSCH. A corresponding example for end-loaded DMRS for the second stage DCI is indicated at 902. This approach is better for sharing with the PDSCH because the end-loaded DMRS is less out of date relative to the data transmission.

As shown in FIG. 14, in the overlapped frequency region of the second stage DCI and the PDSCH, on the front symbols of the PDSCH, there are REs comprising DMRS, (or fewer REs comprising DMRS); in this overlapped frequency region, use is made of the DMRS for the second stage DCI is used. In the non-overlapped frequency region of second stage DCI and the PDSCH, there are REs comprising front-loaded DMRS for the PDSCH.

Figure 15:
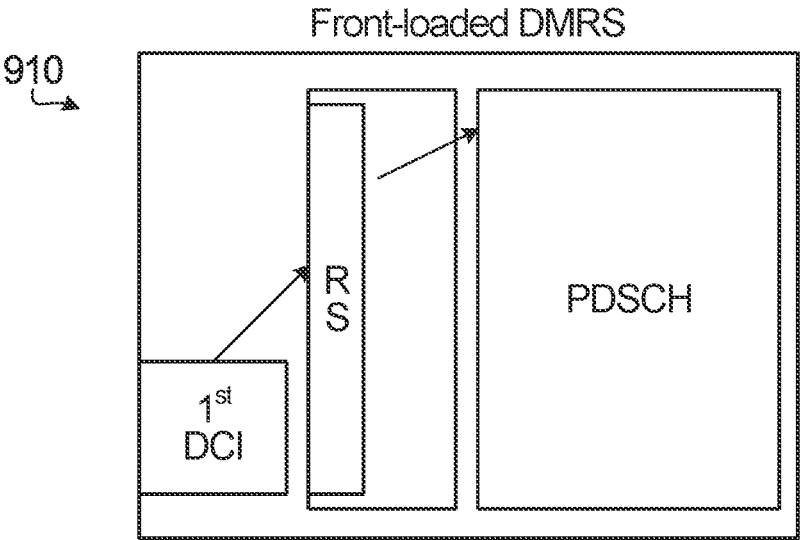
FIG. 15 is an example of front loaded DMRS shared between DCI and data suitable for low peak average power ratio (PAPR) waveforms.
Figure 15:
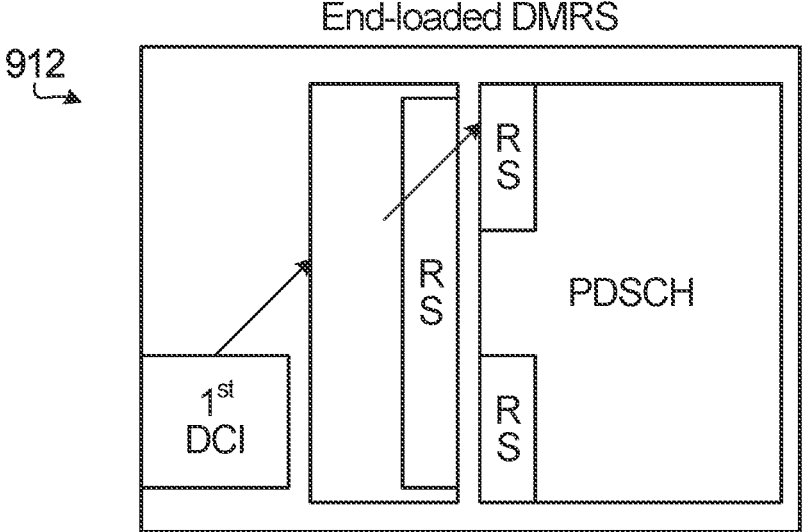

Further examples of shared DMRS for second stage DCI and PDSCH that are suitable for applications with a low peak average power ratio (PAPR) waveform are shown in FIG. 15. In these example, in the second stage DCI, the REs for DMRS are time domain multiplexed with the REs for DCI. The second stage DCI occupies the same PRB locations as the scheduled PDSCH transmission. There is a front-loaded DMRS for the DCI in the example generally indicted at 910, and an end-loaded DMRS for the DCI in the example generally indicated at 912.

Figure 16:
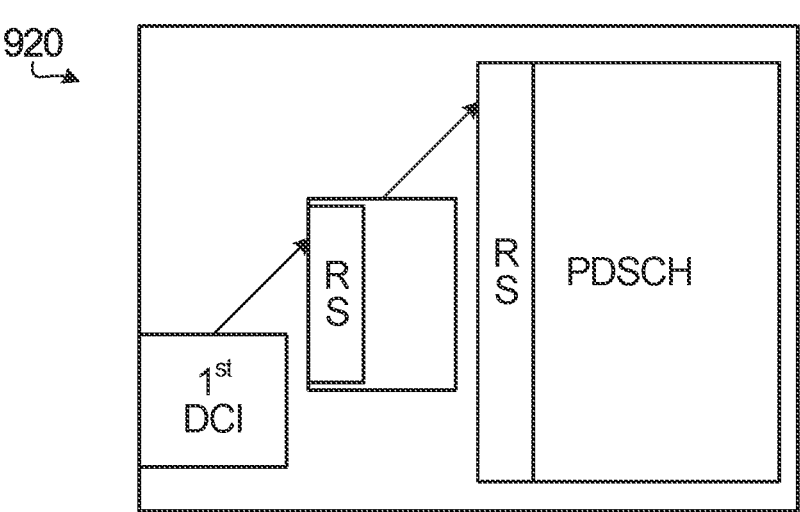
FIG. 16 is an example of front loaded DMRS in both the second stage DCI and data, with no sharing of the DMRS.

Alternatively, there can be no sharing of the DMRS between DCI and PDSCH. There may be a separate configuration of DMRS for the second stage DCI and PDSCH for UE data. For example, for a low PAPR waveform, there may be separate DMRS for the second stage DCI and PDSCH. An example is shown in FIG. 16, generally indicated at 920.

These embodiments provide details of possible DMRS types for the first stage DCI, second stage DCI and PDSCH for UE data.

Based on the embodiment of in FIGS. 7A and 7B, in some embodiments, two stage DCI is used in systems employing a single carrier. In some embodiments, two stage DCI is used in systems employing carrier aggregation (CA) or dual carrier (DC) to reduce the number of UE blind decodings and reduce the scheduling overhead.

In the embodiment of two stage DCI used CA or DC, a UE performs recovers a first stage DCI in one carrier, as in other embodiments described above. For example, the UE may monitor primary component carrier (PCC) for a first stage DCI using blind detection. As before, the first stage DCI indicates the scheduling information of the second stage DCI. However, in this embodiment, the second stage DCI could be in the same carrier as the first stage DCI, or in a different carrier (e.g. a secondary component carrier), and the second stage DCI indicates scheduling information for one or multiple carriers. The scheduling information for each carrier could be DL, or UL, or DL and UL or sidelink. The scheduling information for each carrier could be for one transmission or for multiple transmissions (e.g. multiple slot scheduling with same or different TBs for each slot). In some embodiments, the second stage DCI may indicate whether scheduling information is present for a given carrier. In this case, for a given carrier, the second stage DCI includes scheduling information for the carrier when the indication indicates there is scheduling information for the carrier.

Figure 10:
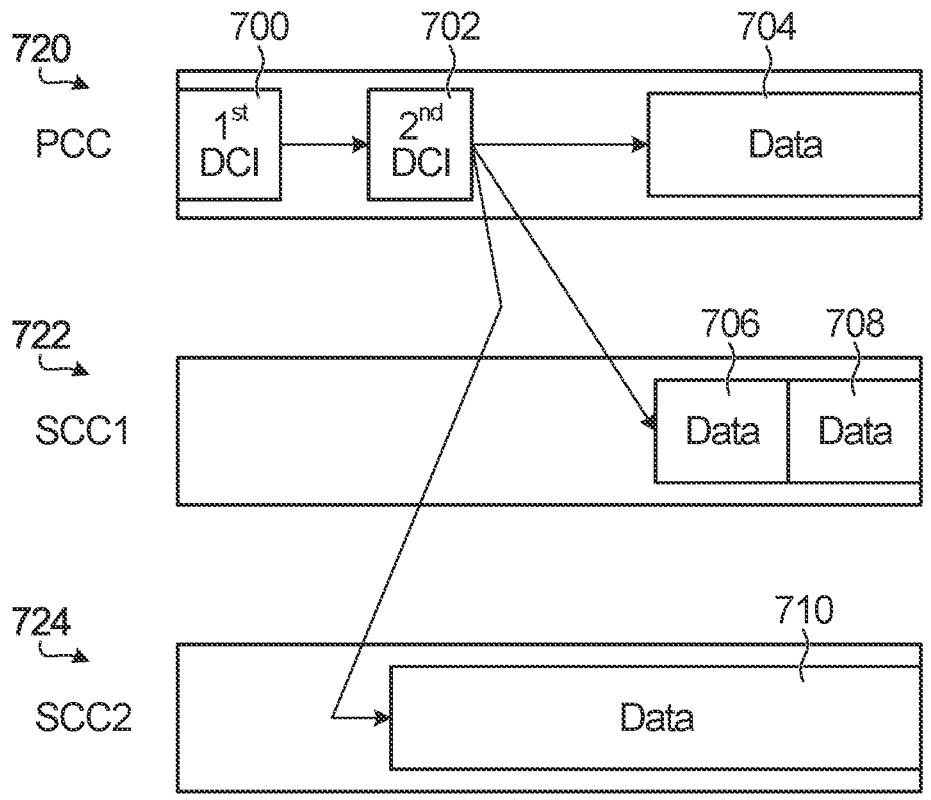
FIG. 10 shows time frequency resources for a two stage DCI applied for scheduling over multiple carriers.

An example is shown in FIG. 10. Shown is a first stage DCI 700 on a PCC 722 and a second stage DCI 702 also on the PCC 722. The first stage DCI 700 includes an indication of the time frequency resources of the second stage DCI 702. While in the example, the second stage DCI is on the same carrier as the first stage DCI, alternatively it could be on a different carrier, and this would be indicated in the first stage DCI. The second stage DCI 702 includes scheduling information for scheduling data transmission 704 communicated on PCC 702, scheduling information for scheduling data transmissions 706,708 communicated on a second carrier SCC1 722, and scheduling information for scheduling data transmission 710 communicated on a third carrier SCC2 724.

The use of the two-stage DCI in this manner can reduce the number of blind decodings for CA/DC. If the number of carriers is increased, the number of blind decodings is not correspondingly increased.

Referring to the FIGS. 5A, 5B, and 10, in some embodiment scheduling multiple PDSCH and/or PUSCH can be performed in one carrier or multiple carrier (e.g CA and DC). In some embodiments, the information bits in the second stage DCI for scheduling multiple PDSCH and/or PUSCH are mapped in a predefined order. For example, a second stage DCI may schedule one PDSCH and one PUSCH in one carrier, and the information bits of second stage DCI are mapped in the order of downlink scheduling information and then uplink scheduling information, or vice versa.

In some embodiments, when scheduling for multiple carriers (e.g CA or DC), including DL/UL/sidelink/unlicensed/NTN scheduling, information is included to indicate the carriers being scheduled, and for each carrier how many UL or DL or SL transmissions are being scheduled. In a specific example, each carrier that can be scheduled has a carrier index, the following information may be transmitted to the UE in a predefined location, such as the first N bits of the second stage DCI:

To indicate the carrier(s) being scheduled:

One or more bits indicating a number of scheduled carriers;

For each carrier being scheduled, one or more bits indicating a carrier index.

In some embodiment, for each carrier, one or more bits to indicate how many of each type of transmission are being scheduled on that carrier; for example, for each carrier:

Number of DL transmissions

Number of UL transmissions

Number of Sidelink transmissions

Then, for each DL/UL/SL transmission, separate scheduling information is included in the second stage DCI. In some embodiments, for multiple DL schedulings, one copy of PUCCH related indication is included that is applicable to all of the DL schedulings, e.g. one TPC command for scheduled PUCCH, PUCCH resource indicator.

In some embodiments, the second stage DCI format is a format which includes first UE data for the UE (UE data 1) and includes scheduling information for second UE data for the UE not included in the second stage DCI (UE data 2). In this case, the information bits of the second stage DCI may include:

data size indicator: indicates the size of first UE data in the second stage DCI;

UE data: a number of UE data bits is indicated by the data size indicator, the bits are for a DL codeword included in the second stage DCI;

scheduling information: time/frequency/spatial resource allocation information for another one or two codewords not included in the second stage DCI.

In a specific example, the data size indicator is N1 bits, the UE data is N2 bits, and the scheduling information is N3 bits.

In some embodiment, PDSCH and/or PUSCH used for transmitting UE data using a transport block (TB) defining the basic information bits unit For PDSCH carrying UE data, e.g. information bits from MAC layer, a MAC PDU (Protocol Data Unit) is mapped to a TB; For PDSCH carrying the second stage DCI for example in accordance with any embodiment described herein, the DCI is mapped to a TB. The transport block size (TBS) is defined as the size (number of bits) of a TB. The TB is information bits before CRC and channel coding. Alternatively, a TB may be defined to also include the CRC. The codeword is the bits after channel coding of (TB+CRC).

In some embodiments, a number of information bits in the second stage DCI is the same as a TB size of the PDSCH used for the second stage DCI.

In some embodiments, if the number of information bits in a second stage DCI prior to padding is less than a total number bits of that can be carried by one or more TB(s) of the PDSCH to be used to carry the second stage DCI, a number of zero or one padding bits are generated and included in the second stage DCI until the number of bits of the second stage DCI equals that of the TB(s) of the PDSCH carrying the second stage DCI.

The following is an example of padding. The contents of the $2^{nd}$ stage DCI includes:

Format indication: 3 bits;

Time-domain resource allocation: 3 bits;

Frequency-domain resource allocation: 10 bits;

MCS: 5bits; and

HARQ information: 5bits such that the total number of bits of the $2^{nd}$ stage DCI is 26 bits.

For the PDSCH carrying second stage DCI, according to the scheduling information in the first stage DCI (for example set by allocated RB and symbol number, coding rate), the PDSCH can carry 30 information bits (i.e. size of the TB is 30 bits). Now 4 padding bits are included in the $2^{nd}$ stage DCI, to make the size of the second stage DCI the same as the TB.

In some embodiments, if the number of information bits in a second stage DCI prior to truncation is larger than a total number bits of that can be carried by one or more TB(s) of the PDSCH to be used to carry the second stage DCI, the number of information bits of the second stage DCI is reduced, for example by truncating the last few least significant bits, such that the size of the second stage DCI equals the size of TB(s) of the PDSCH carrying the second stage DCI.

Advantageously, with the provided approach, there can be a reduction in the number of blind decodings, since only blind decoding for the first stage DCI may need to be performed, blind detection is not needed for the second stage DCI, thus reduce the number of blind decoding. The approach also allows for a flexible DCI size for the second stage DCI, and enables more flexible scheduling, thus not only can achieve forward compatibility (limited/fixed size of first stage DCI), but also can achieve more flexible DCI size for the first stage DCI and the second stage DCI based on different requirements. In addition, in some embodiments, the number of formats and/or the number of sizes of the first stage DCI is limited to a small number and this leads to a small number of blind decodings being needed to recover the first stage DCI.

Figure 7C:
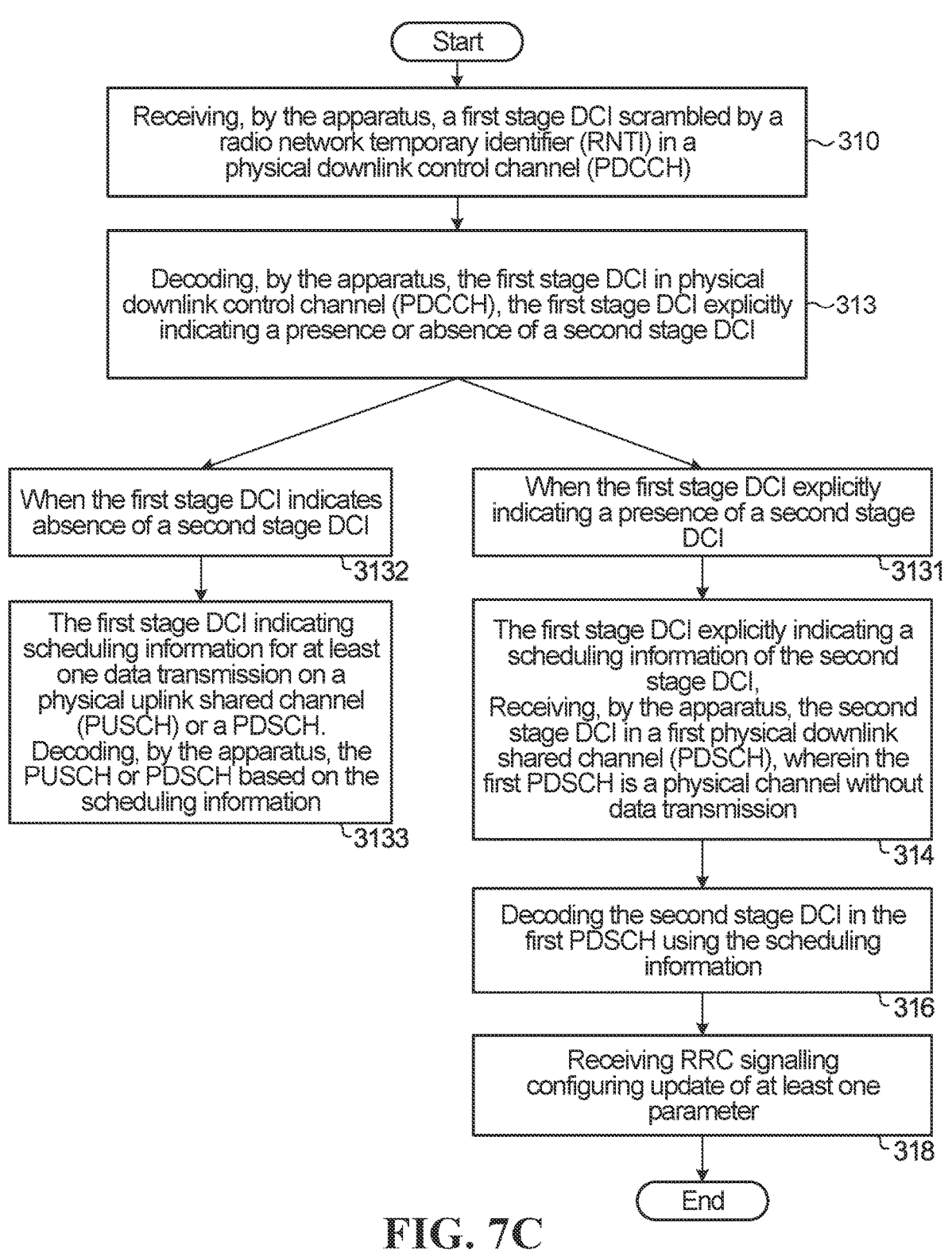
FIG. 7C is a flowchart of another embodiment for two stage DCI performing in an apparatus (e.g UE)

FIG. 7C is a flowchart of another embodiment for two stage DCI performed in an apparatus (e.g UE), according to an embodiment. The method of FIG. 7C will be described as being performed by an apparatus having at least one processor, a computer readable storage medium, a transmitter and a receiver. In some implementations, the computer readable storage medium is operatively coupled to the at least one processor and stores programming for execution by the at least one processor. The programming may include instructions to perform the method of FIG. 7C. In some implementations, the apparatus is a UE or ED, such as the ED 110 of FIGS. 1 to 3, for example. FIG. 7C shows a first branch for the case when the first stage DCI indicates absence of a second stage DCI, and a second branch for the case when the first stage DCI indicates presence of the second stage DCI. Comparing with the embodiment showing in FIG. 7B, block 313 in FIG. 7C replaces the block 312 in FIG. 7B. In block 313, the apparatus decodes the first stage DCI, the first stage DCI explicitly indicating a presence or absence of a second stage DCI. For example, a single bit in the first stage DCI may be used for this purpose.

When the first stage DCI indicates presence of a second stage DCI in block 3131, the first stage DCI explicitly indicates a scheduling information of the second stage DCI in block 314, and following functionality is the same as FIG. 7B. Typically, the second stage DCI will include scheduling for uplink transmission on PUSCH and/or downlink transmission on PDSCH.

On the other hand, when the first stage DCI indicates absence of a second stage DCI in block 3132, in some embodiments, the first stage DCI indicates scheduling information for an uplink data transmission on a PUSCH or a downlink transmission on a PDSCH at block 3133. In this case, the first stage DCI always includes scheduling information, and depending on the explicit indication of the presence or absence of the second stage DCI, the scheduling information is either for the second stage DCI, or for UE data that may be uplink data or downlink data.

FIG. 7D is a flowchart of another embodiment for two stage DCI, corresponding to that of FIG. 7C, but from the network element. The method of FIG. 7D will be described as being performed by an network element having at least one processor, a computer readable storage medium, a transmitter and a receiver. In some implementations, the computer readable storage medium is operatively coupled to the at least one processor and stores programming for execution by the at least one processor. The programming may include instructions to perform the method of FIG. 7D. In some implementations, the network element is a BS or TRP, such as the T-TRP 170 or the NT-TRP 172 of FIGS. 1 to 3, for example. FIG. 7D shows a first branch for the case when the first stage DCI indicates absence of a second stage DCI, and a second branch for the case when the first stage DCI indicates presence of the second stage DCI. Comparing with the embodiment showing in FIG. 7A, various steps are inserted between block 300 and block 302. When the first stage DCI indicates absence of a second stage DCI at block 3232, the first stage DCI includes scheduling information for at least one data transmission on a PUSCH or PDSCH, and the network element transmits data transmission on the PUSCH or PDSCH based on the scheduling information at block 3233.

On the other hand, when the first stage DCI indicates presence of the second stage DCI, at 3231, the network device goes on to perform blocks 302 and 304 as described previously.

For the embodiments described herein, there is an explicit indication of presence or absence of the second stage DCI. Alternatively, for the embodiments described herein, a first stage DCI will always be used to schedule a second stage DCI, i.e. the second stage DCI is always present, details have described in the above embodiment based on FIG. 7B. In this case, there is no need for the indication of presence or absence of the second stage DCI. This alternative may be used for any of the embodiments described herein. Referring to block 3131 and 3231, if the first stage DCI explicitly indicates a presence of a second stage DCI, in order to obtain a compact first stage DCI to enhance the reliability of the first stage DCI, also to obtain a more flexible size and contents of the second stage DCI, additional options for the first stage DCI and the second stage DCI are provided.

The first option of the first stage DCI may not include retransmission related information and MIMO related information. The first stage DCI indicates the presence of the corresponding second stage DCI in block 3131 and 3231. If the second stage DCI is present, the first stage DCI indicates the scheduling information for the second stage DCI. The second stage DCI indicates scheduling information for at least one data transmission on a PUSCH and/or a PDSCH. If the second stage DCI is not present, the first stage DCI indicates the scheduling information for UE data. In some embodiments, the fields of the second stage DCI indicating of a scheduling information in the first stage DCI for at least one data transmission on a PUSCH and/or a PDSCH is simplified relative to the fields of the second stage DCI indicating of scheduling information in the second stage DCI. The scheduling information in the first stage DCI may be relatively compact, compared to the flexible possibilities for scheduling using the second stage DCI. For example, there may be limited formats for the first stage DCI, with fewer or smaller fields. When a data packet to be transmitted is small, simplified scheduling information in a first stage DCI may be used, whereas when a larger data packet is to be transmitted, the more complex scheduling information that is available in the second stage DCI can be used. In some embodiments, if the data packet is smaller in size than a threshold, a first stage DCI including scheduling for UE data is used, and if the data packet is larger than the threshold, the first stage DCI is used to schedule a second stage DCI, and the second stage DCI schedules the UE data.

In this embodiment, in the first stage DCI, no retransmission related information is present; for example, there is no new data indicator (NDI), redundancy version (RV), hybrid automatic repeat request (HARQ) process number, HARQ timing, downlink assignment index (DAI). This means there is no retransmission information for the second stage DCI if present, and no retransmission information for the UE data scheduled in the first stage DCI if the second stage DCI is not present. In addition, no MIMO information is included in the first stage DCI, meaning that there is single layer transmission (or otherwise fixed transmission) for the scheduled second stage DCI or the scheduled UE data. With these limitations, the first stage DCI is very compact and has a fixed size with relatively few bits compared to the second stage DCI. A fixed number of resource elements can be used to transmit the first stage DCI. In some embodiments, compared to the second stage DCI, a lower coding rate is used for the first stage DCI to enhance the reliability of the first stage DCI.

In some embodiments, the first stage DCI includes some or all of the fields detailed below:

Carrier indicator: in some embodiments, the first and second stage DCI can be in different carriers; this field is used to indicate the carrier of the second stage DCI;

Presence of second stage DCI: this indicates the presence or absence of the second stage DCI, as detailed above;

Field or Flag for DL/UL grant differentiation: this bit only has meaning when the first stage DCI is used to schedule UE data, and is used to indicate whether the scheduling is uplink scheduling or downlink scheduling. In a specific example, this is a single bit, with a value of 1 for DL scheduling and 0 for UL scheduling;

Frequency domain resource assignment: for example, resource block locations of the second stage DCI or the UE data.

Time domain resource assignment: for example, symbol locations of the second stage DCI or the UE data.

Virtual resource block (VRB)-to-physical resource block (PRB) mapping or frequency hopping flag: if the scheduling information is for DL (second stage DCI or DL UE data), the field indicates VRB-to-PRB mapping; else if the scheduling information is for UL, the field is a frequency hopping flag;

Modulation and coding scheme (MCS): an indication of modulation and coding scheme for the second stage DCI or UE data;

Table 7 below is an example of a specific format for a compact first stage DCI for this option.

TABLE 7

| First Stage DCI Format without HARQ | | |
| --- | --- | --- |
| first stage DCI | bit | |
| Carrier indicator | 0 or 3 bits | second stage DCI can be in |

TABLE 7-continued

| First Stage DCI Format without HARQ | | |
|---|---|---|
| first stage DCI | bit | |
| | | different carriers |
| Presence of second stage DCI | 1 bit | |
| Flag for DL/UL grant differentiation | 0 or 1 bit | If first stage DCI is for DL UE data scheduling when the second stage DCI is not present, 0 bit; If first stage DCI is for DL/UL UE data scheduling when the second stage DCI is not present, 1 bit |
| Frequency domain resource assignment | 9 bits | Assuming one BWP = 24 RBs |
| Time domain resource assignment | 4 bits | |
| VRB-to-PRB mapping or Frequency hopping flag | 1 bit | |
| MCS | 5 bits | |
| | 20-24 bits | |

The second stage DCI may indicate at least one of the following for scheduling data transmission for a UE:

scheduling information for one PDSCH in one carrier/ BWP;

scheduling information for multiple PDSCH in one carrier/BWP;

scheduling information for one PUSCH in one carrier/ BWP;

scheduling information for multiple PUSCH in one carrier/BWP;

scheduling information for one PDSCH and one PUSCH in one carrier/BWP;

scheduling information for one PDSCH and multiple PUSCH in one carrier/BWP;

scheduling information for multiple PDSCH and one PUSCH in one carrier/BWP;

scheduling information for multiple PDSCH and multiple PDSCH in one carrier/BWP;

scheduling information for sidelink in one carrier/BWP;

partial scheduling information for at least one PUSCH and/or at least one PDSCH in one carrier/BWP, wherein the partial scheduling information is an update to scheduling information in the first stage DCI;

partial scheduling information for at least one PUSCH and/or at least one PDSCH, wherein remaining scheduling information for the at least one PUSCH and/or at least one PDSCH is included in the first stage DCI;

configuration information related to an artificial intelligence (AI)/machine learning (ML) function;

configuration information related to a non-AI/ML function;

The second option of the first stage DCI may include retransmission related information, but may not include MIMO related information. The first stage DCI indicates the presence of the corresponding second stage DCI in block 3131 and 3231. The first stage DCI includes partial retransmission related information. Partial retransmission related information includes less than all the information necessary for retransmission. The remaining retransmission related information is RRC configured or predefined. MIMO related information is not included. An advantage of this approach is that the size of the first stage DCI can still be kept small, including only some retransmission information.

In a specific example, the partial retransmission information includes NDI, RV, HARQ process number, and DAI.

Other retransmission related information, e.g. transmit power control (TPC), PUCCH resource, HARQ-ACK timing, is predefined or RRC configured to the UE.

In some embodiments, when the first stage DCI indicates the presence of a second stage DCI, the partial retransmission information is ignored, and when the first stage DCI indicates the absence of a second stage DCI, the partial retransmission information is in respect of the data transmission scheduled by the first stage DCI.

In some embodiments, when the first stage DCI indicates the presence of a second stage DCI, the partial retransmission information is in respect of the second stage DCI, and when the first stage DCI indicates the absence of a second stage DCI, the partial retransmission information is in respect of the data transmission scheduled by the first stage DCI.

In some embodiments, the first stage DCI includes some or all of the fields detailed below:

Carrier indicator for second stage DCI;

Presence of second stage DCI;

Flag for DL/UL grant differentiation;

Frequency domain resource assignment;

Time domain resource assignment: symbol locations of the second stage DCI or the UE data;

VRB-to-PRB mapping or Frequency hopping field;

MCS: modulation and coding rate for the second stage DCI or UE data;

NDI: New data indicator;

RV: Redundancy version;

HARQ process number; and

DAI: downlink assignment index to determine the HARQ codebook

Table 8 below is an example of a specific format for a first stage DCI for this option.

TABLE 8

| First Stage DCI Format with HARQ | | |
|---|---|---|
| first stage DCI | bit | |
| Carrier indicator | 0 or 3 bits | second stage DCI can be in different carriers |
| Presence of second stage DCI | 1 bit | |
| Flag for DL/UL grant differentiation | 0 or 1 bit | If first stage DCI is only for DL scheduling when the second stage DCI is not present, 0 bit; If is for DL/UL, 1 bit |
| Frequency domain resource assignment | 9 bits | Assuming one BWP = 24 RBs |
| Time domain resource assignment | 4 bits | |
| VRB-to-PRB mapping or Frequency hopping flag | 1 bit | |
| MCS | 5 bits | |
| NDI | 1 bit | If the second stage DCI is present, the bit is reserved or ignored by the UE |
| RV | 2 bits | If the second stage DCI is present, the bit is reserved or ignored by the UE |
| HARQ process number | 2-4 bits | If the second stage DCI is present, the bit is reserved or ignored by the UE |
| DAI | 2 bits | If the second stage DCI is present, the bit is reserved or ignored by the UE |
| | 27-33 bits | |

Scheduling Parameters for PDSCH Carrying Second Stage DCI vs. Data

Referring to FIGS. 5A, 5B, 6, 7A, 7B, 7C and 7D, a PDSCH carrying a second stage DCI can be viewed as being more important to the UE as compared to the PDSCH carrying downlink data. In some embodiments, the base station takes one or more steps to improve the robustness of the PDSCH carrying second stage DCI. This can involve, for example, using a lower modulation order, a lower coding rate, or a single layer transmission for the second stage DCI. For the PDSCH carrying downlink data, the BS may schedule with lower reliability requirement to achieve better performance, e.g. high throughput.

In some embodiments the available value(s) of scheduling parameters for scheduling a PDSCH carrying second stage DCI are different from the corresponding values for scheduling a PDSCH carrying downlink data. The available sets of values may be separately predefined or separately configured by the base station. A set of specific examples are detailed below.

Retransmission: There is no retransmission for the PDSCH carrying second stage DCI, so no hybrid automatic repeat request (HARQ) related information is included in first stage DCI (e.g. new data indicator (NDI), redundancy version (RV), HARQ process, downlink allocation index (DAI), HARQ timing, transmit power control (TPC) command for scheduled PUCCH, PUCCH resource indicator). On the other hand, to support retransmission for the PDSCH carrying downlink data, there is HARQ related information in the first stage DCI scheduling the PDSCH.

Modulation order: a fixed or smaller set of modulation orders may be available for PDSCH carrying second stage DCI vs. PDSCH carrying data. In a specific example, for the PDSCH carrying downlink data, available values include {2, 4, 6} or {2, 4, 6, 8}, and for the PDSCH carrying second stage DCI, a predefined modulation order, e.g. 1 or 2 is used, or smaller set (or a subset) than that of the PDSCH carrying downlink data, e.g. {2, 4} or {2, 4, 6}.

Coding rate: For the PDSCH carrying second stage DCI, a smaller set of coding rates may be available compared to the set available for PDSCH carrying downlink data. In some embodiments, the maximum value of the coding rate for the PDSCH carrying second stage DCI is smaller than that for the PDSCH carrying downlink data.

MIMO layer: The maximum value of allowed layers may be smaller for the PDSCH carrying second stage DCI. For example, 1 or 2 layers may be allowed for PDSCH carrying second stage DCI compared to 8 layers for PDSCH carrying downlink data.

Time/Frequency domain resource allocation: the bit length of the field of time/frequency domain resource allocation may be shorter in the DCI scheduling PDSCH carrying second stage DCI than that in the DCI scheduling PDSCH carrying downlink data.

Figure 8:
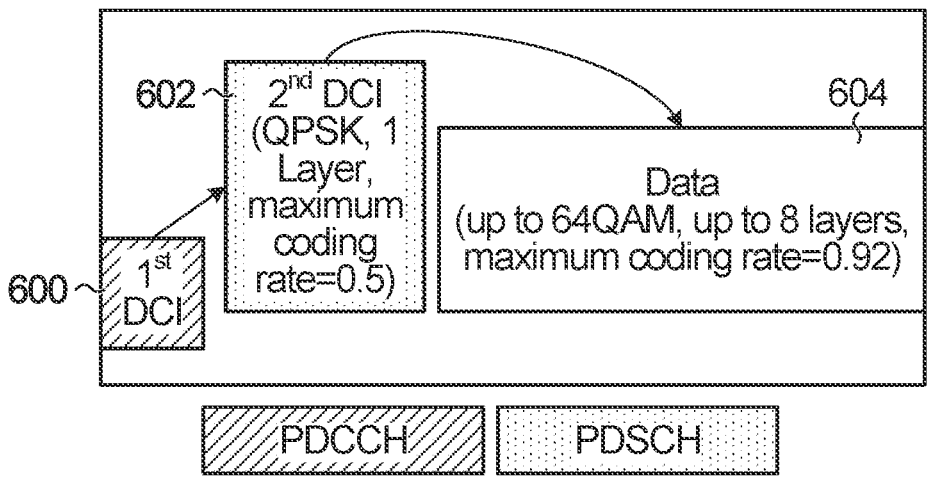
FIG. 8 shows the use of different parameter sets for PDSCH used for second stage DCI vs. downlink data.

An example is shown in FIG. 8, where the first stage DCI 600 schedules the second stage DCI 602 with QPSK, 1 layer, and maximum coding rate 0.5, and the second stage DCI 602 schedules data 604 with up to 64 QAM, up to 8 layers, and a maximum coding rate of 0.92.

Figure 9A:
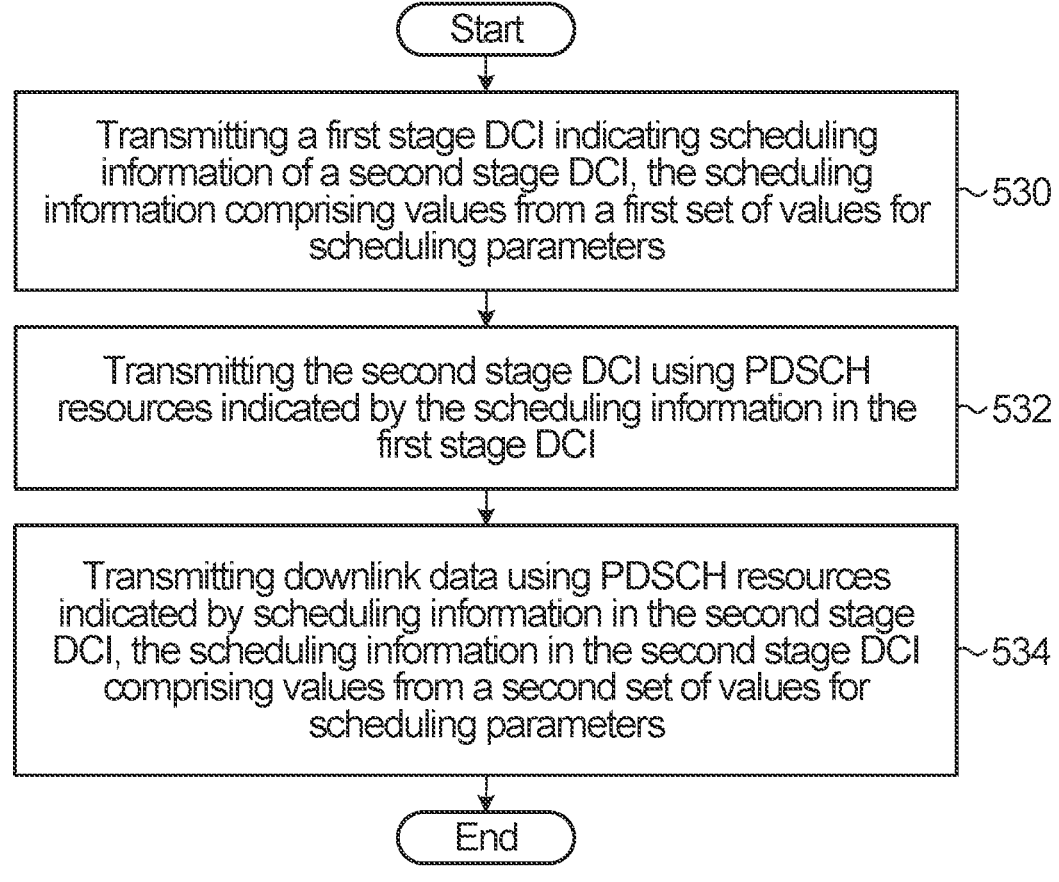

Referring to FIGS. 5A and 5B, FIG. 9A is a flowchart of a transmitter side method based on the above described embodiments. The method begins in block 530 with transmitting a first stage DCI indicating scheduling information of a second stage DCI, the scheduling information comprising values from a first set of values for scheduling parameters. The method continues in block 532 with transmitting the second stage DCI using PDSCH resources indicated by the scheduling information in the first stage DCI. The method continues in block 534 with transmitting downlink data using PDSCH resources indicated by scheduling information in the second stage DCI, the scheduling information in the second stage DCI comprising values from a second set of values for scheduling parameters.

FIG. 9B is a flowchart of a receiver side method based on the above described embodiments. The method begins in block 550 with receiving a first stage DCI in a PDCCH indicating scheduling information of a second stage DCI, the scheduling information comprising values from a first set of values for scheduling parameters. The method continues in block 552 with receiving the second stage DCI using PDSCH resources indicated by the scheduling information in the first stage DCI. The method continues in block 554 with receiving downlink data using PDSCH resources indicated by scheduling information in the second stage DCI, the scheduling information in the second stage DCI comprising values from a second set of values for scheduling parameters. The first/second set of values can be predefined or configured by the network device. For example, modulation order configuration of the first set values may be {2}, modulation order configuration of the second set values may be {2,4,6}

Embodiments of FIGS. 9A and 9B, one option is that the first set of values and the second set of values for indicating one or more of:

the first set of values and the second set of values are separately predefined or configured for indicating whether retransmission is enabled;

if retransmission is enabled in the first set of values retransmission related parameters configured in the set of values, retransmission related parameters can be at least one of HARQ related information including at least one of NDI, RV, HARQ process, DAI, HARQ timing, TPC command for scheduled PUCCH, PUCCH resource indicator;

the first set of values and the second set of values are separately predefined or configured for indicating modulation order options, one option, the first set of values is predefined or configured modulation order, e.g. 1 or 2, the second set of values is configured with any one of {2, 4} or {2, 4, 6} from an available set {2, 4, 6} or {2, 4, 6, 8}. Another option, the first set of values associating with modulation order is configured smaller set or a subset than the second set of values;

the first set of values and the second set of values are separately predefined or configured for indicating coding rate options, one option, the maximum value of the coding rate configured in the first set of values is smaller than the maximum value of the coding rate configured in the second set of values, e.g, the maximum value of the coding rate configured in the first set of values is 0.5, the maximum value of the coding rate configured in the second set of values is 0.95. Another option, coding rate can be flexible configured based on different requirement;

the first set of values and the second set of values are separately predefined or configured for indicating options for number of transport block (TB)s; one option, the first set of values associating with number of TB is fixed, e.g one TB, the second set of values associating with number of TB is flexible configured with one or more TBs; Another option, the first set of values and the second set of values associating with number of TB are flexible configured with one or more TBs;

the first set of values and the second set of values are separately predefined or configured for indicating options for number of MIMO layers; one option, the maximum number of MIMO layers (e. g number 2) configured in the first set of values is smaller than the maximum number of MIMO layers (e. g number 8) configured in the second set of values; another options, number of MIMO layers in the first set of values is predefined with number 1 or 2, number of MIMO layers in the second set of values is configured with any one of 1, 2, 4, 6, 8;

the first set of values and the second set of values are separately configured for indicating options for time/frequency domain resource allocation types, and/or locations. One option, the bit length of the time/frequency domain resource field associating with the first set of values configured shorter than the bit length of the time/frequency domain resource field associating with the second set of values. Another option, the bit length of the time/frequency domain resource field associating with the first set of values and the bit length of the time/frequency domain resource field associating with the second set of values are flexible configured based on different requirement.

Advantageously, with these embodiments, the first set of values for PDSCH carrying second stage DCI and the second set of values for PDSCH carrying downlink data, the available values of scheduling parameter(s) for scheduling these two PDSCH may be separately predefined or configured by a BS, ensuring the reliability of the second stage DCI and reducing the scheduling overhead in the first stage DCI.

Advantageously, the provided approaches support many second stage DCI formats for flexible scheduling. In addition, when the N bits of the second stage DCI are used to indicate the second stage DCI format, the UE can obtain this without the need to perform blind decoding.

One Stage DCI

In some embodiments, in addition to having a first stage DCI that is used for scheduling second stage DCI, for certain purposes, the base station may also use a one stage DCI, which is a standalone DCI that is not used to schedule a second stage DCI. A one stage DCI may be used, for example, for system information, paging, or random access. In these cases, the CRC of the one stage DCI is scrambled by SI-RNTI, P-RNTI, RA-RNT respectively. Examples of one stage DCI include fallback DCI in 5G NR, and DCI formats 0_0 and 1_0.

Figure 7E:
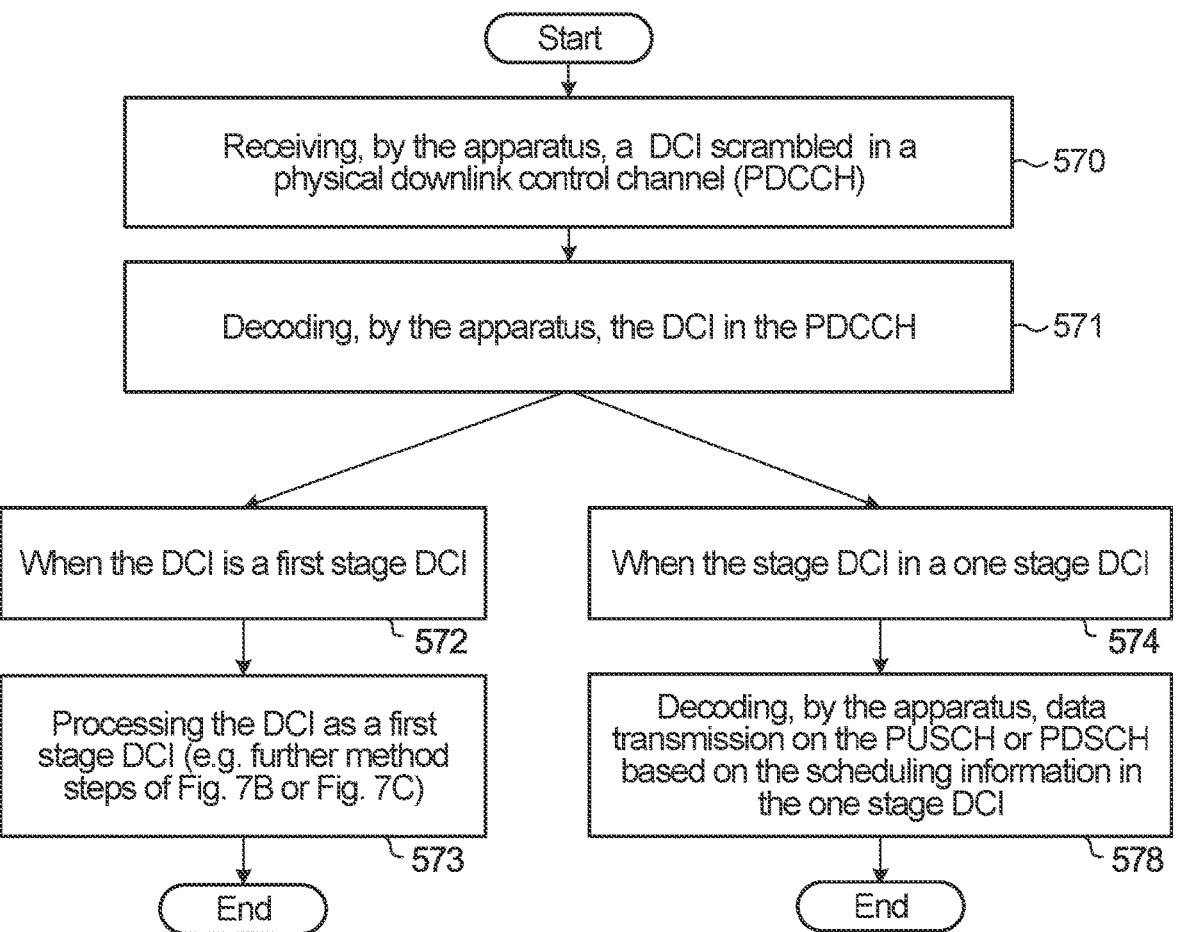
FIG. 7E is a flowchart of an embodiment combining a first stage DCI and one stage DCI.

FIG. 7E is a flowchart of DCI processing that accommodates both first stage DCI (possibly leading to second stage DCI), and one stage DCI in an apparatus, according to an embodiment. The method of FIG. 7E will be described as being performed by an apparatus having at least one processor, a computer readable storage medium, a transmitter and a receiver. In some implementations, the computer readable storage medium is operatively coupled to the at least one processor and stores programming for execution by the at least one processor. The programming may include instructions to perform the method of FIG. 7E. In some implementations, the apparatus is a UE or ED, such as the ED 110 of FIGS. 1 to 3, for example. The method begins in block 570 with receiving, by an apparatus, a DCI in a physical downlink control channel (PDCCH). Then the block 571 with decoding, by the apparatus, the DCI in the PDCCH. The received DCI is either a first stage DCI or a one stage DCI. This can be determined based on a format indication in the received DCI. However, alternatively, different resources or search spaces (e.g. different time frequency resources) are used to transmit one stage DCI vs.

first stage DCI, and the apparatus will know which type of DCI it is based on which resource or search space was used to transmit the DCI.

If the DCI is a first stage DCI in block 572, the DCI is processed as a first stage DCI in block 573. This can involve, for example, executing the further method steps of FIG. 7B or 7C. In various embodiments, the first stage DCI processing encompasses the methods of receiving and processing first stage DCI described herein.

If the DCI is a one stage DCI in block 574, then the one stage DCI includes basic scheduling information. In block 578, the apparatus decodes data transmission on the PUSCH or PDSCH based on the scheduling information in the one stage DCI. The one stage DCI does not include a presence indicator, and cannot be used to schedule a second stage DCI.

In some embodiments, the one stage DCI has the same size as the first stage DCI. In other embodiments, the one stage DCI may have a different size than the first stage DCI.

Depending on specific scenarios, the BS sends a one stage DCI to enhance reliability or two stage DCI to improve performance, e.g. throughput. For example, in a period of RRC ambiguity, the BS may send a one stage DCI. A first option provides same DCI size for one stage DCI and first stage DCI. In this embodiment, the one stage DCI has the same size as a first stage DCI. The one stage DCI includes basic scheduling information, e.g. fallback DCI (DCI format 0_0 and 1_0 in NR).

Because the size of the first stage DCI and the one stage DCI is the same, the number of blind decodings is not increased when the UE monitors both one stage DCI and first stage DCI. This assumes the same search space for the first stage DCI and the one stage DCI. If separate search spaces are used, then additional blind decodings will be needed to monitor both one stage DCI and first stage DCI.

In order to distinguish the one stage DCI and the first stage DCI when the same search space is used, in some embodiments, N bits, for example the first N bits, in the one stage and first stage DCI are used to indicate the DCI format. For example, as shown in the Table 9, an "Identifier for DCI formats" field indicates the DCI is DL one stage DCI (one stage DCI for scheduling DL UE data), or UL one stage DCI (one stage DCI for scheduling UL UE data), or first stage DCI. In the first two cases, there is no second stage DCI; the one stage DCI format does not even include an indication of the presence of the second stage DCI. In the last case, the second stage DCI will be present or not depending on the presence indicator in the first stage DCI.

TABLE 9

| Identifier for DCI Format | |
|---|---|
| Value of "Identifier for DCI formats" | DCI format |
| 00 | DL one stage DCI |
| 01 | UL one stage DCI |
| 10 | first stage DCI |
| 11 | Reserved |

In another example, as shown in the Table 10 below, an "Identifier for DCI formats" field indicates the DCI is DL one stage DCI, or UL one stage DCI, or first stage DCI with DL scheduling when second stage DCI is not present (meaning that there is a first stage DCI, and if the presence indicator indicates presence of second stage DCI, there is a second stage DCI, but if the presence indicator indicates absence of second stage DCI, the first stage DCI includes scheduling information for DL transmission), or first stage DCI with UL scheduling when second stage DCI is not present (meaning that there is a first stage DCI, and if the presence indicator indicates presence of second stage DCI, there is a second stage DCI, but if the presence indicator indicates absence of second stage DCI, the first stage DCI includes scheduling information for UL transmission),

TABLE 10

| Identifier for DCI Format | |
| --- | --- |
| Value of "Identifier for DCI formats" | DCI format |
| 00 | DL one stage DCI |
| 01 | UL one stage DCI |
| 10 | first stage DCI, DL scheduling when second stage DCI is not present |
| 11 | first stage DCI, UL scheduling when second stage DCI is not present |

Table 11 below shows example formats for one stage DCI formats DCI 0_0 DCI 1_0 and first stage DCI. All three formats include the field "identifier for DCI formats" to distinguish between them as discussed above. The first stage DCI includes the presence indicator as detailed above. In order that the three formats have the same size, the other formats include this bit, but it has no meaning.

TABLE 11

| Example One Stage and First Stage DCI Formats | | | |
| --- | --- | --- | --- |
| DCI 0_0 | DCI 1_0 | First Stage DCI | bit |
| Identifier for DCI formats | Identifier for DCI formats | Identifier for DCI formats | 2 bits 00: one stage DCI format: DCI 0_0 01: one stage DCI format: DCI 1_0 10: first stage DCI format (with second stage DCI presence indicator) |
| Not used | Not used | Presence Indicator | 1 bit |
| Frequency domain resource assignment | Frequency domain resource assignment | Frequency domain resource assignment | 9 bits (24 RBs) |
| Time domain resource assignment | Time domain resource assignment | Time domain resource assignment | 4 bits |
| Frequency hopping flag | VRB-to-PRB mapping | VRB-to-PRB mapping | 1 bit |
| MCS | MCS | MCS | 5 bits |
| NDI | NDI | NDI (or Reserved) | 1 bit |
| RV | RV | RV (or Reserved) | 2 bits |
| HARQ process number | HARQ process number | HARQ process number (or Reserved) | 4 bits |
| | DAI | DAI (or Reserved) | 2 bits |
| TPC command for scheduled PUSCH | TPC command for scheduled PUCCH | TPC command for scheduled PUCCH (or Reserved) | 2 bits |

Another option provides different DCI size for one stage DCI and first Stage DCI. In this embodiment, the one stage DCI may have a different size than a first stage DCI. As a result, irrespective of whether the same search spaces are used, separate blind decoding is necessary for the first stage DCI and one stage DCI. There is no need to include bits to distinguish between a first stage DCI and a one stage DCI, as this will be dictated by the respective blind decodings.

Figure 17:
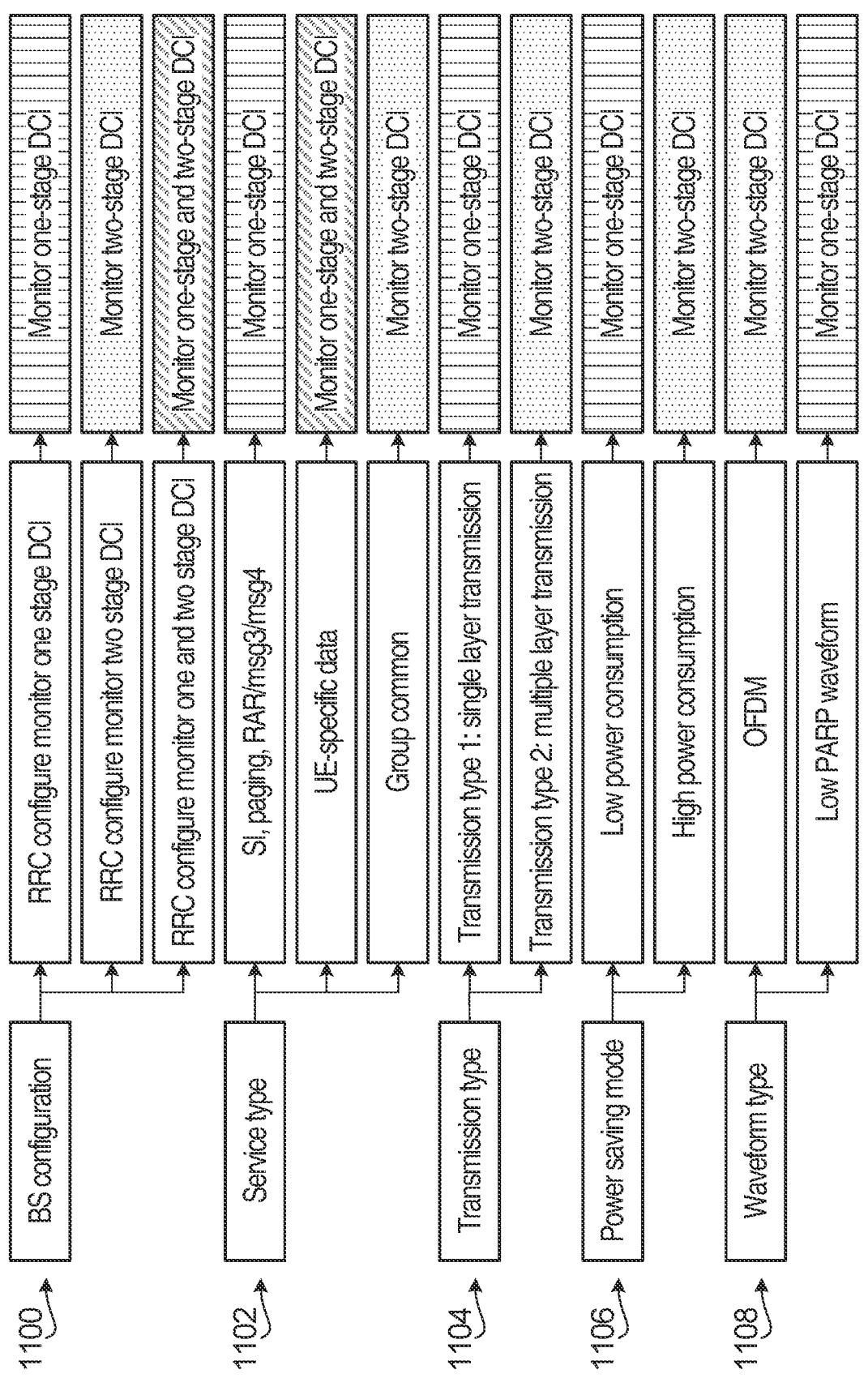
FIG. 17 is a set of examples of bases upon which the UE can be configured to monitor one stage DCI and/or two stage DCI

In some embodiments, where both one stage DCI and first stage DCI are implemented, a given UE may monitor only one stage DCI, or two stage DCI (meaning monitoring first stage DCI which may lead to second stage DCI), or both one stage DCI and two stage DCI. FIG. 17 shows a set of examples of how a given UE may determine which DCI to monitor.

In a first implementation, indicated at 1100, DCI monitoring depends on configuration by a BS. By RRC signaling/MAC-CE/DCI, BS could configure a UE to monitor one stage DCI, or two stage DCI, or both one stage and two stage DCI. For example, for a search space, BS sends the configuration to the UE.

In a second implementation, indicated at 1102, DCI monitoring depends on service (or depends on RNTI). In the illustrated example, for system information, or paging, or random access, e.g. the DCI is scrambled by SI-RNTI/P-RNTI/RA-RNTI, the UE monitors one stage DCI. For UE-specific data, e.g. the DCI is scrambled by C-RNTI, the UE monitors two stage DCI and/or one stage DCI. For group common control information, e.g. the DCI is scrambled by group common RNTI, and the UE monitors two stage DCI.

In a third implementation, indicated at 1104, DCI monitoring depends on transmission type. In the illustrated example, when a UE is configured to use single layer transmission, the UE monitors one stage DCI. When the UE is configured to use multiple layer transmission, the UE monitors two stage DCI.

In a fourth implementation, indicated at 1106, DCI monitoring depends on UE operating mode. In the illustrated example, when the UE is on power saving mode, the UE monitors one stage DCI. When the UE is on regular mode, the UE monitors two stage DCI.

In a fifth implementation, indicated at 1108, DCI monitoring depends on waveform type. In the illustrated example, for OFDM waveform, the UE monitors two stage DCI. For low peak average power ratio (PAPR) waveform, e.g. SC-FDM, the UE monitors one stage DCI.

Referring to FIGS. 7A, 7B, 7C, 7D, the following provides a specific scenario how to perform two-stage DCI to improve performance. To satisfy the low latency/high reliability requirement of some services, e.g. ultra-reliable low latency communications (URLLC), various two stage DCI designs with reduced latency are provided.

In a first provided approach, the frequency locations of the second stage DCI and UE data are the same. In addition, front loaded reference symbols (RS) are included in the first several symbols of the second stage DCI, with no additional RS for the UE data. With this approach, both the second stage DCI and UE data can use the channel estimation results based on the front-loaded RS, thus reducing the demodulation and decoding latency of the second stage DCI and UE data. Optionally, the second stage DCI does not include frequency allocation information, since the UE can know this from the frequency locations of the second stage DCI.

Figure 18:
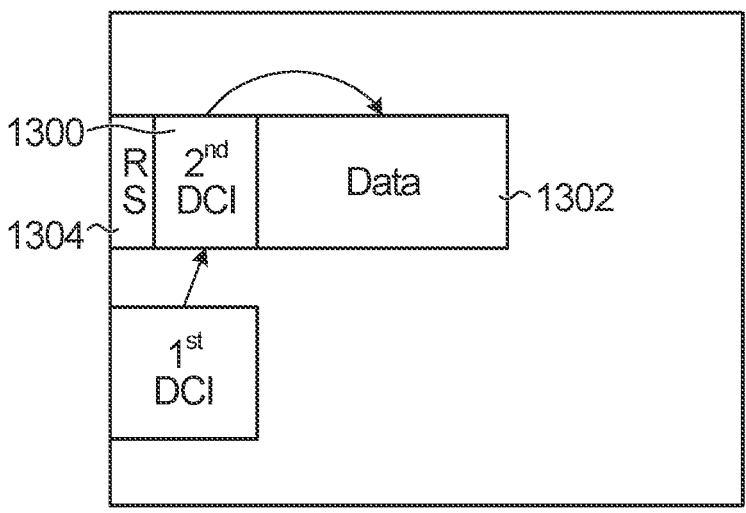
FIG. 18 is a time frequency diagram showing a two stage DCI in one carrier for low latency.

An example of this approach to reduce the latency is shown in FIG. 18, which shows the frequency locations (vertical axis) of the second stage DCI 900 and UE data 902 are the same, and shows front loaded RS 904 in the first several symbols of the second stage DCI 900.

In some implementations, the second DCI 900 and the UE data having the frequency locations can be same carrier, same BWP, or same occupied Bandwidth. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over a wireless spectrum. The spectrum may comprise one or more carriers and/or one or more BWPs. The spectrum may be referred to as frequency resources. Different carriers and/or BWPs may be on distinct frequency resources.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, e.g. sidelink transmitting and receiving resources.

A BWP may be broadly defined as a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

Figure 23:
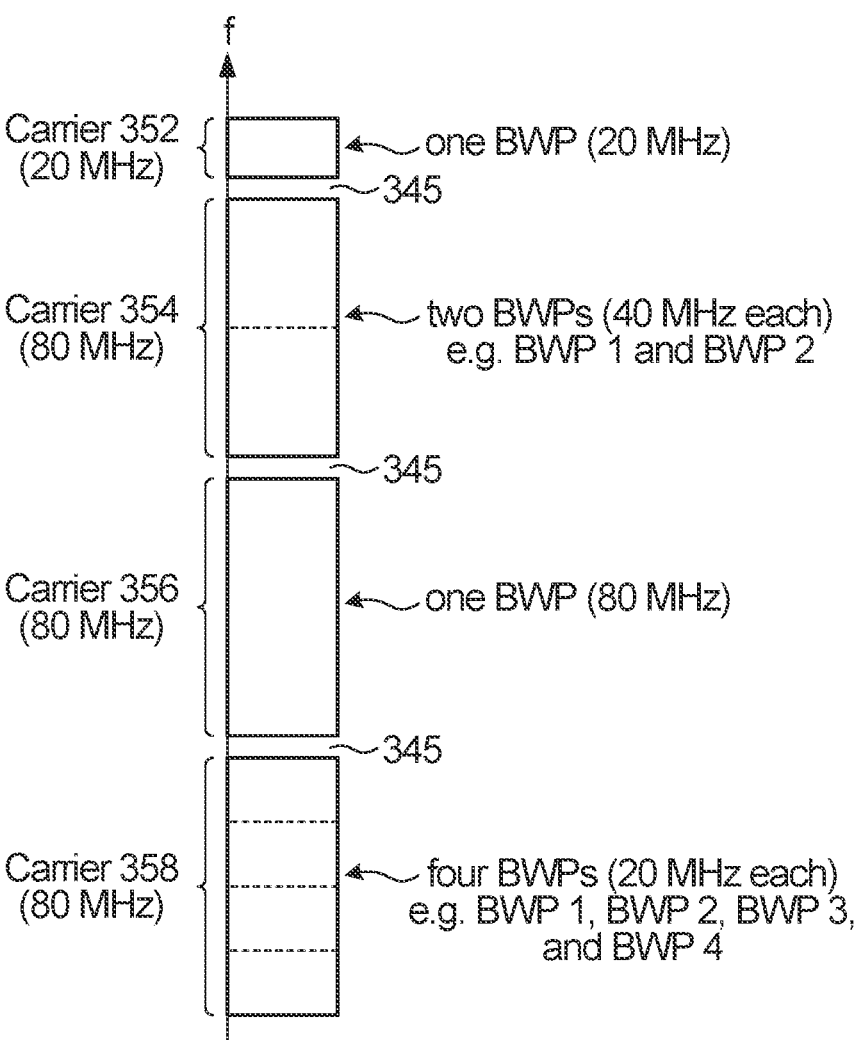
FIG. 23 shows an example involving the use of multiple carriers.

Therefore, in some embodiments, a carrier may have one or more BWPs. As an example, FIG. 23 illustrates four carriers on a frequency spectrum of a wireless medium. The four carriers are respectively labelled carriers 352, 354, 356, and 358. The four carriers are contiguous with each other, except that a guard band 345 may be interposed between adjacent pairs of contiguous carriers. Carrier 352 has a bandwidth of 20 MHz and consists of one BWP. Carrier 354 has a bandwidth of 80 MHz and consists of two adjacent contiguous BWPs, each BWP being 40 MHz, and respectively identified as BWP 1 and BWP 2. Carrier 356 has a bandwidth of 80 MHz and consists of one BWP. Carrier 358 has a bandwidth of 80 MHz and consists of four adjacent contiguous BWPs, each BWP being 20 MHz, and respectively identified as BWP 1, BWP 2, BWP 3, and BWP 4. Although not shown, a guard band may be interposed between adjacent BWPs.

Figure 24:
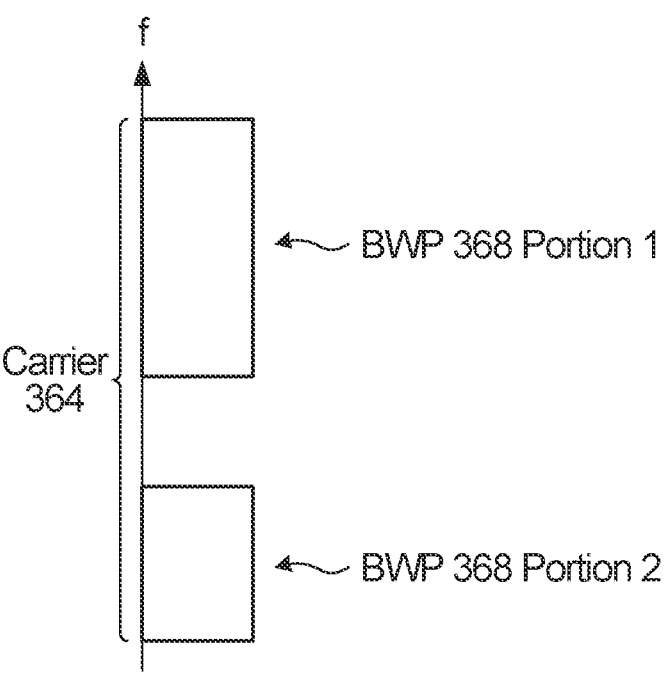
FIG. 24 shows an example involving two bandwidth part portions on a single carrier.

In some embodiments, a BWP has non-contiguous spectrum resources on one carrier. For example, FIG. 24 illustrates a single carrier 364 having a single BWP 368 consisting of two non-contiguous spectrum resources: BWP portion 1 and BWP portion 2.

Figure 25:
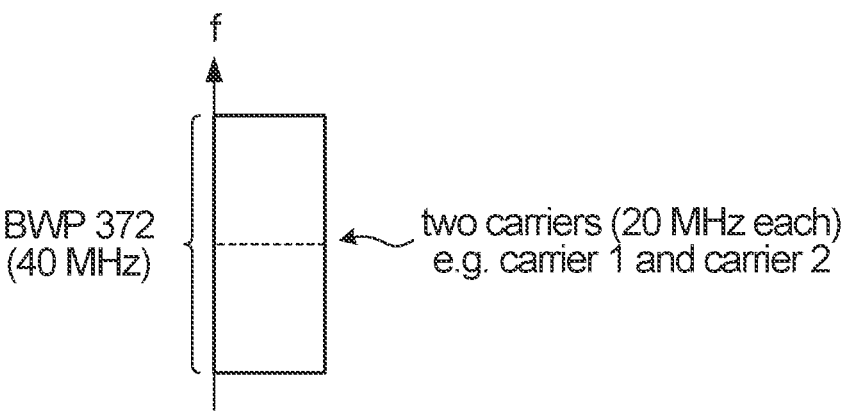
FIG. 25 shows an example involving two adjacent carriers to form a bandwidth part.

In other embodiments, rather than a carrier having one or more BWPs, a BWP may have one or more carriers. For example, FIG. 25 illustrates a BWP 372 on a frequency spectrum of a wireless medium. BWP 372 has a bandwidth of 40 MHz and consists of two adjacent carriers, labelled carrier 1 and carrier 2, with each carrier having a bandwidth of 20 MHz. Carriers 1 and 2 are contiguous, except that a guard band (not shown) may be interposed between the carriers.

Figure 26:
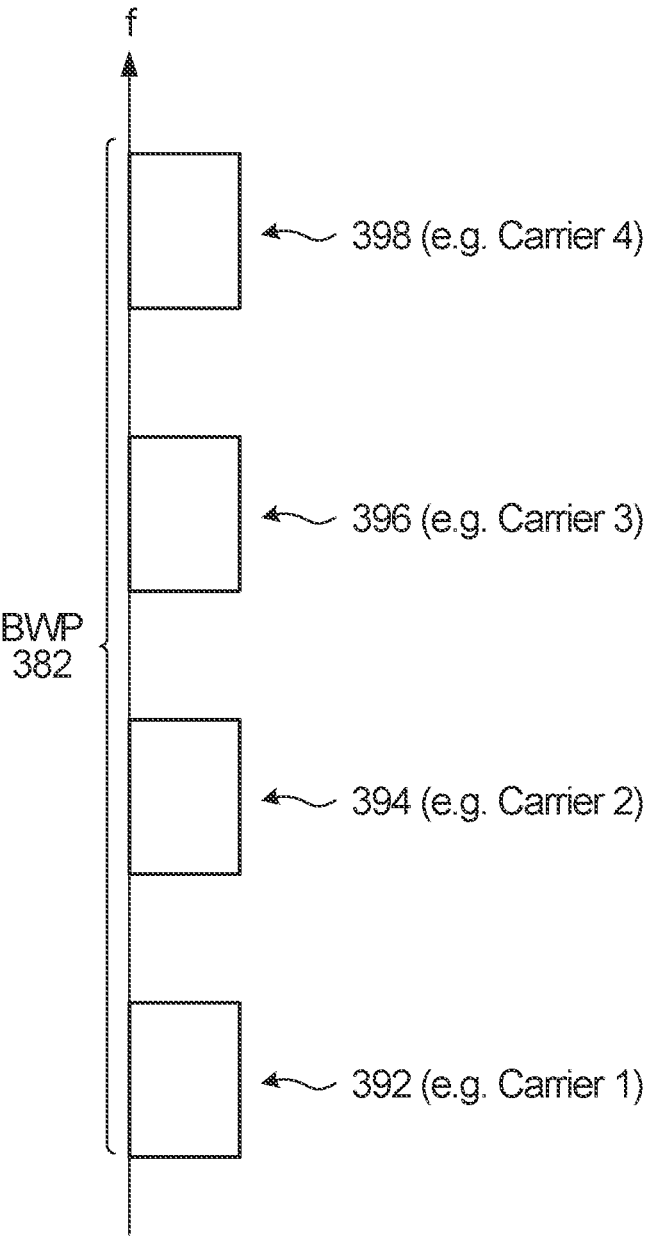
FIG. 26 shows an example involving four non-adjacent carriers in a bandwidth part.

In some embodiments, a BWP may comprise non-contiguous spectrum resources which consists of non-contiguous multiple carriers. For example, FIG. 26 illustrates a single BWP 382 having four non-contiguous spectrum resources 392, 394, 396, and 398. Each non-contiguous spectrum resource consists of a single carrier. The first spectrum resource 392 is in a low band (e.g. the 2 GHz band) and consists of a first carrier (carrier 1). The second spectrum resource 394 is in a mmW band and consists of a second carrier (carrier 2). The third spectrum resource 396 (if it exists) is in the THz band and consists of a third carrier (carrier 3). The fourth spectrum resource 398 (if it exists) is in visible light band and consists of a fourth carrier (carrier 4). Resources in one carrier which belong to the BWP may be contiguous or non-contiguous. For example, the frequency resources of carrier 1 might be contiguous or non-contiguous.

Therefore, in view of the examples described in relation to FIGS. 23 to 26, it will be appreciated that a carrier may be a contiguous spectrum block for transmission and/or reception by device, such as a base station or a UE (e.g. like in FIG. 23), or a non-contiguous spectrum block for transmission and/or reception by a device (e.g. like in FIG. 24). A BWP may be a contiguous spectrum block for transmission and/or reception (e.g. like in FIGS. 23 and 25), or a contiguous spectrum block within a carrier (e.g. like in FIG. 23), or a non-contiguous spectrum block (e.g. like in FIGS. 24 and 26). A carrier may have one or more BWPs, or a BWP may have one or more carriers. A carrier or BWP may alternatively be referred to as spectrum.

In another approach, latency is reduced through the use of multiple carriers. With this approach, the first stage DCI is on one carrier, and indicates the second stage DCI on another carrier. The second stage DCI schedules one or multiple resources for data in one or multiple carriers. By transmitting the first and second stage DCI in different carriers (e.g. like in FIGS. 23 and 24), the available resources for the second stage DCI are increased and the transmission latency of the second stage DCI is reduced.

Figure 19:
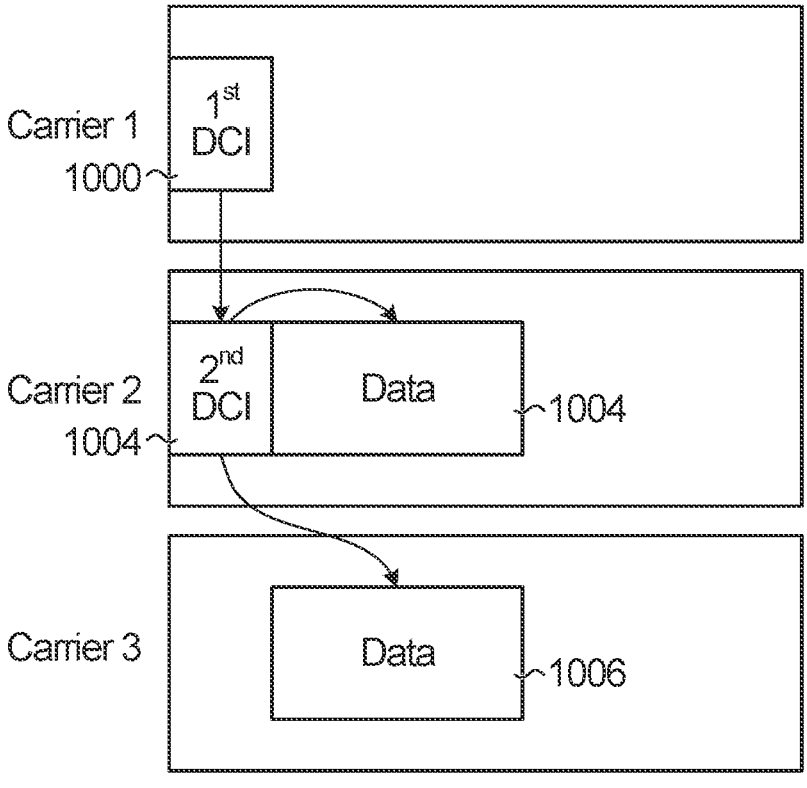
FIG. 19 is a time frequency diagram showing a two stage DCI in multiple carriers for low latency.

An example is shown in FIG. 19 which shows a first stage DCI 1000 on carrier 1 that indicates the second stage DCI 1002 on carrier 2. The second stage DCI schedules one or multiple resources for data 104,1006 in carrier 2 and carrier 3. Another example, a first stage DCI 1000 on BWP1 that indicates the second stage DCI 1002 on BWP 2. The second stage DCI schedules one or multiple resources for data 1004,1006 in BWP 2 and BWP 3.

In some embodiments, a retransmission scheme is employed to enhance the reliability of the second stage DCI. In a first approach: blind retransmission without HARQ-ACK feedback for the second stage DCI With this approach, blind retransmission of the second stage DCI is performed without HARQ-ACK feedback for the second stage DCI. The BS may use RRC or DCI signaling to configure whether the second stage DCI retransmission is enabled or not, or this may be predefined. In addition, the BS configures the number of retransmissions or the maximum number of retransmissions, RV for each retransmission, and time/frequency locations of the retransmissions. Blind retransmission could be frequency-domain repetition or time-domain repetition.

For frequency-domain repetition, the time-domain location of the retransmission is the same as first transmission. By RRC or DCI, the BS configures the retransmission frequency pattern, e.g. the frequency offset between the RBs for retransmission and the RBs for first transmission. In a specific example, the number of RBs for the first transmission and retransmissions are the same, and the BS configures the RB offset between the lowest/highest/central RB of the first transmission and corresponding RB of the retransmission. The first transmission and the retransmission(s) can be in the same or different carrier, which may be configured by the BS by RRC or DCI.

Figure 20:
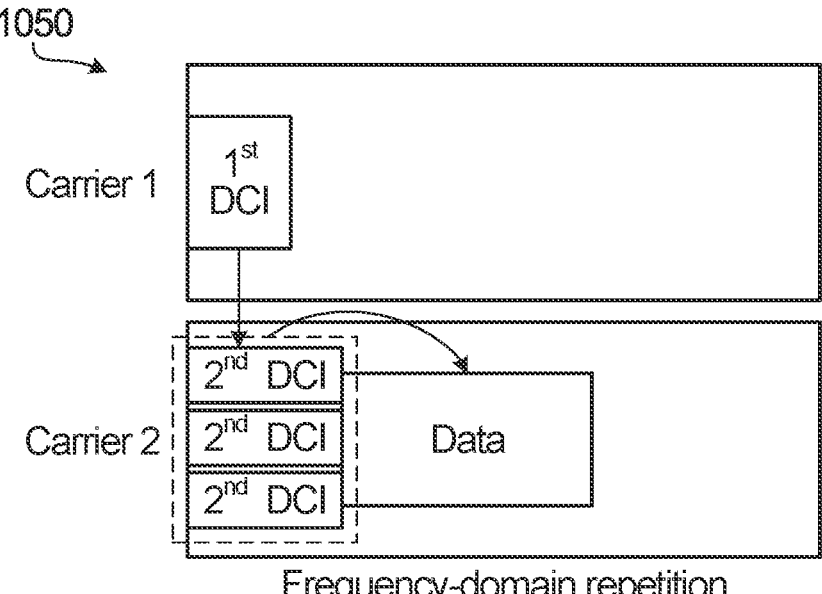
FIGS. 20 and 21 show examples of second stage DCI retransmission without HARQ-ACK feedback.
Figure 20:
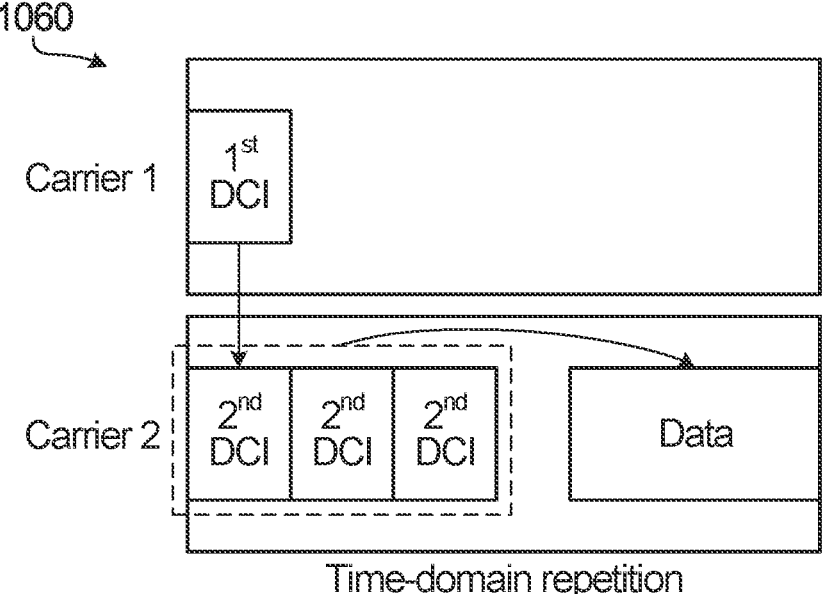
Figure 21:
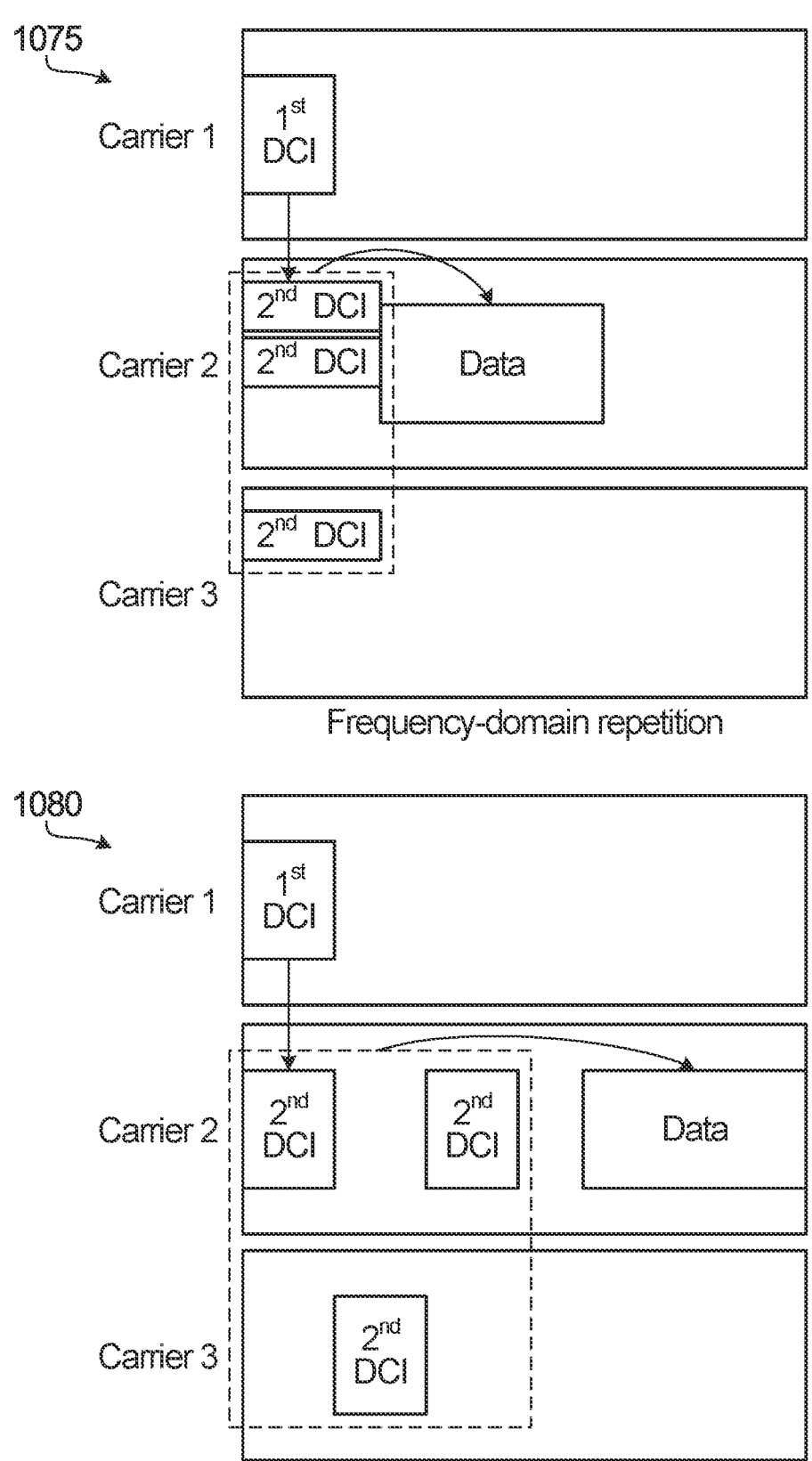

An example of frequency domain repetition is shown in FIG. 20, generally indicated at 1050, where three repetitions occur in the frequency domain on a different carrier (Carrier 2) than the carrier (Carrier 1) used for the first transmission. An example of frequency domain repetition with multiple carriers is shown in FIG. 21, generally indicated at 1075.

For time-domain repetition, the frequency-domain location of the retransmission is the same as first transmission, or configured by BS. By RRC or DCI, the BS configures the retransmission time pattern, e.g. time interval between the retransmission and the first transmission. For example, BS configures continuous N mini-slots after the first transmission for the N retransmissions. Retransmissions and the first transmission can be in the same or different carrier, which may be configured by BS by RRC or DCI.

An example of time domain repetition is shown in FIG. 20, generally indicated at 1060, where three repetitions occur in the time domain on a different carrier (Carrier 2) than the carrier (Carrier 1) used for the first transmission. An example of time domain repetition with multiple carriers is shown in FIG. 21, generally indicated at 1080.

In some embodiments, a second approach is retransmission with HARQ-ACK Feedback for the second stage DCI. With this approach, after decoding a PDSCH carrying a second stage DCI, the UE reports HARQ-ACK feedback to the BS. The HARQ related information, e.g. HARQ timing, PUCCH resource, is configured by the BS through RRC or DCI. If the UE reported NACK, the BS retransmits the second stage DCI. The retransmission resources can be dynamic or semi-statically indicated.

Figure 22:
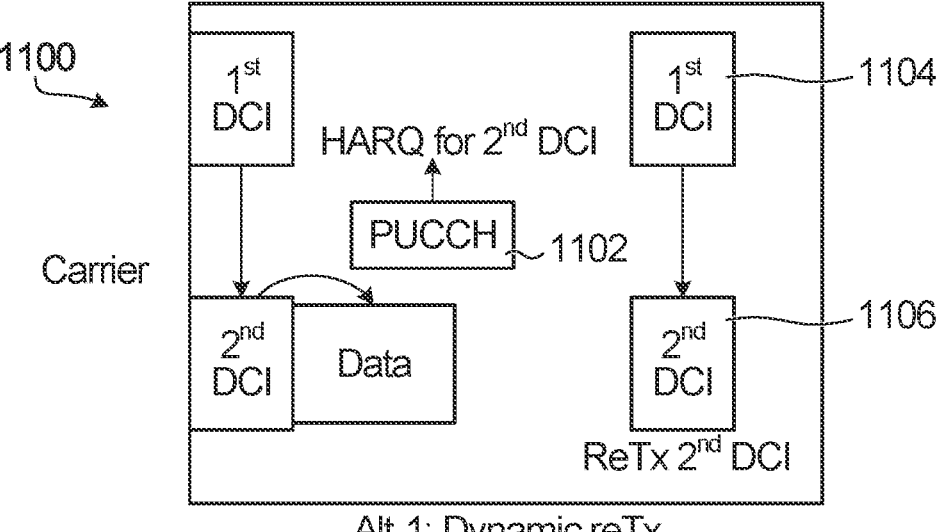
FIG. 22 show examples of second stage DCI retransmission without HARQ-ACK feedback.
Figure 22:
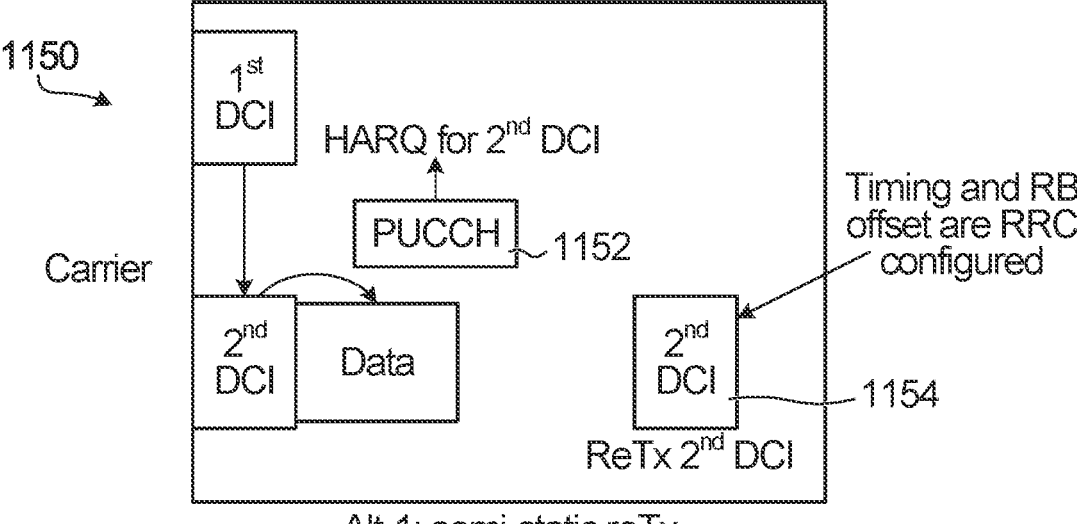

An example showing dynamic retransmission is shown in FIG. 22 generally indicated at 1100. After receiving NACK from the UE at 1102, the BS sends the first stage DCI 1104 to indicate the resources for the retransmission of the second stage DCI at 1106.

An example showing retransmission using semi-static or predefined resources is shown in FIG. 22, generally indicated at 1150. The retransmission resources are RRC configured or predefined or indicated by the first stage DCI which scheduled the first transmission. Upon receipt of a NACK from the UE at 1152, the BS can go ahead with the retransmission using the resources at 1154 without the need for another first stage DCI. The retransmission time-frequency pattern may be configured by BS. In a specific example, the timing and RB offsets between the first transmission and the retransmission are configured. In this case, having obtained the time and frequency resources of the first transmission of the second stage DCI, the UE knows the retransmission resources based on the retransmission time-frequency pattern. In this scheme, the retransmission is not dynamically scheduled by a first stage DCI.

For both approaches described above, after successfully decoding the second stage DCI following the first transmission and retransmission, for time-domain resource allocation and HARQ feedback timing in the second stage DCI, the UE may use the time location (e.g. slot) of the first transmission as the reference to determine the time location of the time domain resource allocation of PDSCH for UE data or the time domain resource location of PUSCH for UE data or the time domain resource allocation of physical uplink control channel (PUCCH) for HARQ feedback and/or CSI feedback.

For both approaches, if the second stage DCI retransmission is enabled for a UE, by RRC configuration or predefined rules, the UE knows the possible time/frequency relation between the second stage DCI and corresponding UE data. When a UE fails to decode the second stage DCI, the UE will buffer the downlink signal on the possible time/frequency resources for the corresponding UE data, e.g. buffer the downlink signal from the possible earliest symbol for the UE data, and RBs of the whole active BWP. After successfully decoding the second stage DCI by retransmission, the UE will know the exact time/frequency locations for the UE data, and will decode from the buffered data. Optionally the retransmitted second stage DCI can carry a retransmission index. By the retransmission index, UE knows the value of RV, and can perform HARQ combining for the PDSCH carrying the second stage.

For example, a BS may configure a time-domain resource allocation table, the table includes multiple rows, each row defining a slot offset between DCI and scheduled UE data, the start symbol and the allocation length.

The description above provides details of how the first stage DCI can indicate this presence, and/or position of the second stage DCI. In addition, the description above provides many details of specific examples of the contents of the second stage DCI. In addition, the description above provides many details of specific examples of the contents of the first stage DCI. A complete solution involves using a first stage DCI to indicate presence or absence of a second stage DCI, in accordance with one of the embodiments described above with reference to FIGS. 1 to 10, the use of specific contents of the second stage DCI in accordance with any one of the embodiments described above with reference to FIGS. 11 to 16, and use of specific contents of the first stage DCI, in accordance with any one of the embodiments described above with reference to FIGS. 17 to 26.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in an apparatus for receiving downlink control information (DCI), the method comprising:

receiving, by the apparatus, a first stage DCI in a physical downlink control channel (PDCCH), the first stage DCI explicitly indicating a presence or absence of a second stage DCI, and the first stage DCI including at least one indicator indicating partial retransmission information, with remaining retransmission information being radio resource control (RRC) configured or predefined; and when the first stage DCI indicates the presence of the second stage DCI, the first stage DCI explicitly indicating a scheduling information of the second stage DCI, and receiving, by the apparatus, the second stage DCI in a first physical downlink shared channel (PDSCH), wherein the first PDSCH is a physical channel without data transmission;

wherein when the first stage DCI indicates the presence of the second stage DCI, the partial retransmission information is in respect of the second stage DCI, and when the first stage DCI indicates the absence of the second stage DCI, the partial retransmission information is in respect of at least one data transmission scheduled by the first stage DCI.

2. The method of claim 1, the method further comprising:

when the first stage DCI indicates the absence of the second stage DCI, the first stage DCI indicating scheduling information for at least one data transmission on a physical uplink shared channel (PUSCH) or a PDSCH.

3. The method of claim 1, wherein:

the second stage DCI indicating scheduling information in the second stage DCI for at least one data transmission on a PUSCH and/or a PDSCH; and fields of the first stage DCI indicating scheduling information in the first stage DCI for at least one data transmission on a PUSCH and/or a PDSCH are simplified relative to fields of the second stage DCI indicating the scheduling information in the second stage DCI.

4. The method of claim 1, wherein:

when the first stage DCI indicates the presence of the second stage DCI, the first stage DCI does not include multiple input multiple output (MIMO) information for the second stage DCI; and when the first stage DCI indicates the absence of the second stage DCI, scheduling information for at least one data transmission on a PUSCH and/or a PDSCH does not include retransmission related information for the at least one data transmission.

5. The method of claim 1, wherein the first stage DCI has at least one of the following fields:

a field for explicitly indicating a presence or absence of the second stage DCI;

a field for indicating frequency domain resource assignment for the second stage DCI or data transmission;

a field for indicating time domain resource assignment for second stage DCI or data transmission;

a field for indicating a virtual resource block (VRB)-to-physical resource block (PRB) mapping or Frequency hopping;

an indication of modulation and coding scheme (MCS);

a field for indicating a carrier for the second stage DCI; and a flag for differentiating between UL and DL data scheduling.

6. The method of claim 1, wherein the partial retransmission information comprises a subset of new data indicator (NDI), redundancy version (RV), hybrid automatic repeat request (HARQ) process number, downlink allocation index (DAI), transmit power control (TPC) for PUCCH, PUCCH resource, and HARQ-ACK timing.

7. The method of claim 1, wherein:

the first stage DCI is received on a first carrier, the scheduling information of the second stage DCI indicates a second carrier for the second stage DCI; and the second stage DCI schedules resources for data transmission on one or multiple carriers.

8. A method in a network device for transmitting downlink control information (DCI), the method comprising:

transmitting, by the network device, a first stage DCI in a physical downlink control channel (PDCCH), the first stage DCI explicitly indicating a presence or absence of a second stage DCI, and the first stage DCI including at least one indicator indicating partial retransmission information with remaining retransmission information being radio resource control (RRC) configured or predefined; and when the first stage DCI indicates the presence of the second stage DCI, the first stage DCI explicitly indicating scheduling information of the second stage DCI, and transmitting, by the network device, the second stage DCI in a first physical downlink shared channel (PDSCH), wherein the first PDSCH is a physical channel without data transmission;

wherein when the first stage DCI indicates the presence of the second stage DCI, the partial retransmission information is in respect of the second stage DCI, and when the first stage DCI indicates the absence of the second stage DCI, the partial retransmission information is in respect of at least one data transmission scheduled by the first stage DCI.

9. The method of claim 8, the method further comprising:

when the first stage DCI indicates the absence of the second stage DCI, the first stage DCI indicating scheduling information for at least one data transmission on a physical uplink shared channel (PUSCH) or a PDSCH.

10. The method of claim 8, wherein:

the second stage DCI indicating a scheduling information in the second stage DCI for at least one data transmission on a PUSCH and/or a PDSCH; and fields of the first stage DCI indicating scheduling information in the first stage DCI for at least one data transmission on a PUSCH and/or a PDSCH are simplified relative to fields of the second stage DCI indicating the scheduling information in the second stage DCI.

11. The method of claim 8, wherein:

when the first stage DCI indicates the presence of the second stage DCI, the first stage DCI does not include multiple input multiple output (MIMO) information for the second stage DCI; and when the first stage DCI indicates the absence of the second stage DCI, scheduling information for at least one data transmission on a PUSCH and/or a PDSCH does not include retransmission related information for the at least one data transmission.

12. The method of claim 8, wherein the first stage DCI has at least one of the following fields:

a field for explicitly indicating a presence or absence of the second stage DCI;

a field for indicating frequency domain resource assignment for the second stage DCI or data transmission;

53 a field for indicating time domain resource assignment for the second stage DCI or data transmission;

a field for indicating a virtual resource block (VRB)-to-physical resource block (PRB) mapping or frequency hopping;

an indication of modulation and coding scheme (MCS);

a field for indicating a carrier for the second stage DCI; and a flag for differentiating between UL and DL data scheduling.

13. The method of claim 8, wherein the partial retransmission information comprises a subset of new data indicator (NDI), redundancy version (RV), hybrid automatic repeat request (HARQ) process number, downlink allocation index (DAI), transmit power control (TPC) for PUCCH, PUCCH resource, and HARQ-ACK timing.

14. An apparatus comprising:

at least one processor; and a memory storing processor-executable instructions that, when executed, cause the at least one processor to:

receive a first stage DCI in a physical downlink control channel (PDCCH), the first stage DCI explicitly indicating a presence or absence of a second stage DCI, and the first stage DCI including at least one indicator indicating partial retransmission information, with remaining retransmission information being radio resource control (RRC) configured or predefined; and when the first stage DCI indicates the presence of the second stage DCI, the first stage DCI explicitly indicating scheduling information of the second stage DCI, and receive the second stage DCI in a first physical downlink shared channel (PDSCH), wherein the first PDSCH is a physical channel without data transmission;

wherein when the first stage DCI indicates the presence of the second stage DCI, the partial retransmission information is in respect of the second stage DCI, and when the first stage DCI indicates the absence of the second stage DCI, the partial retransmission information is in respect of at least one data transmission scheduled by the first stage DCI.

15. The apparatus of claim 14, wherein when the first stage DCI indicates the absence of the second stage DCI, the first stage DCI indicating scheduling information for at least one data transmission on a physical uplink shared channel (PUSCH) or a PDSCH.

16. The apparatus of claim 14, wherein the first stage DCI has at least one of the following fields:

a field for explicitly indicating a presence or absence of the second stage DCI;

a field for indicating frequency domain resource assignment for the second stage DCI or data transmission;

a field for indicating time domain resource assignment for the second stage DCI or data transmission;

a field for indicating a virtual resource block (VRB)-to-physical resource block (PRB) mapping or Frequency hopping;

an indication of modulation and coding scheme (MCS);

54 a field for indicating a carrier for the second stage DCI; and a flag for differentiating between UL and DL data scheduling.

17. The apparatus of claim 14, wherein the partial retransmission information comprises a subset of new data indicator (NDI), redundancy version (RV), hybrid automatic repeat request (HARQ) process number, downlink allocation index (DAI), transmit power control (TPC) for PUCCH, PUCCH resource, and HARQ-ACK timing.

18. A network device comprising:

at least one processor; and a memory storing processor-executable instructions that, when executed, cause the at least one processor to:

transmit a first stage DCI in a physical downlink control channel (PDCCH), the first stage DCI explicitly indicating a presence or absence of a second stage DCI, and the first stage DCI including at least one indicator indicating partial retransmission information, with remaining retransmission information being radio resource control (RRC) configured or predefined; and when the first stage DCI indicates the presence of the second stage DCI, the first stage DCI explicitly indicating scheduling information of the second stage DCI, and transmit the second stage DCI in a first physical downlink shared channel (PDSCH), wherein the first PDSCH is a physical channel without data transmission;

wherein when the first stage DCI indicates the presence of the second stage DCI, the partial retransmission information is in respect of the second stage DCI, and when the first stage DCI indicates the absence of the second stage DCI, the partial retransmission information is in respect of at least one data transmission scheduled by the first stage DCI.

19. The network device of claim 18, wherein when the first stage DCI indicates the absence of the second stage DCI, the first stage DCI indicating scheduling information for at least one data transmission on a physical uplink shared channel (PUSCH) or a PDSCH.

20. The network device of claim 18, wherein the first stage DCI has at least one of the following fields:

a field for explicitly indicating a presence or absence of the second stage DCI;

a field for indicating frequency domain resource assignment for the second stage DCI or data transmission;

a field for indicating time domain resource assignment for the second stage DCI or data transmission;

a field for indicating a virtual resource block (VRB)-to-physical resource block (PRB) mapping or frequency hopping;

an indication of modulation and coding scheme (MCS);

a field for indicating a carrier for the second stage DCI; and a flag for differentiating between UL and DL data scheduling.

* * * * *